United States Patent
Maeda et al.

(10) Patent No.: US 10,136,142 B2
(45) Date of Patent: Nov. 20, 2018

(54) IMAGE CODING DEVICE, IMAGE CODING METHOD, STORAGE MEDIUM, IMAGE DECODING DEVICE, IMAGE DECODING METHOD, AND STORAGE MEDIUM

(71) Applicant: CANON KABUSHIKI KAISHA, Tokyo (JP)

(72) Inventors: Mitsuru Maeda, Tokyo (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 14/904,171

(22) PCT Filed: Jul. 1, 2014

(86) PCT No.: PCT/JP2014/003504
§ 371 (c)(1),
(2) Date: Jan. 11, 2016

(87) PCT Pub. No.: WO2015/004878
PCT Pub. Date: Jan. 15, 2015

(65) Prior Publication Data
US 2016/0142722 A1    May 19, 2016

(30) Foreign Application Priority Data
Jul. 12, 2013 (JP) ................................. 2013-146312

(51) Int. Cl.
*H04N 19/30* (2014.01)
*H04N 19/105* (2014.01)
(Continued)

(52) U.S. Cl.
CPC ........... *H04N 19/30* (2014.11); *H04N 19/105* (2014.11); *H04N 19/136* (2014.11);
(Continued)

(58) Field of Classification Search
CPC ...... H04N 19/105; H04N 19/30; H04N 19/17; H04N 19/167; H04N 19/33; H04N 19/136; H04N 19/187; H04N 19/44
See application file for complete search history.

(56) References Cited

U.S. PATENT DOCUMENTS

| | | | |
|---|---|---|---|
| 6,473,526 B1 * | 10/2002 | Enokida | H04N 1/41 382/232 |
| 9,230,298 B2 * | 1/2016 | Kunigita | G06T 3/40 |
| 2011/0097004 A1 * | 4/2011 | Lee | H04N 19/52 382/233 |

OTHER PUBLICATIONS

Thang, et al., "SVC CE8 report: Spatial scalability of multiple ROIs", Joint Video Team (JVT) of ISO/IEC MPEG & ITU-T VCEG (ISO/IEC JTC1/SC29/WG11 and ITU-T SG16 Q.6) 16th Meeting, No. JVT-P042, Jul. 2005.
(Continued)

*Primary Examiner* — Dave Czekaj
*Assistant Examiner* — Berteau Joisil
(74) *Attorney, Agent, or Firm* — Canon USA, Inc. I.P. Division

(57) ABSTRACT

The image quality and coding efficiency are improved in a higher hierarchical layer such as a base layer while independence of coding and decoding of a tile is ensured even during hierarchical coding.
An image coding device of the present invention that performs hierarchical coding on an image, which forms a movie, for a plurality of hierarchical layers, includes a first acquiring unit configured to acquire at least one of first and second images of different hierarchical layers from the image; a coding unit configured to code at least one of the first and second images; and a determination unit configured to determine whether or not an independent region, which is coded without reference to other region in an image, is set for each of the images of the respective hierarchical layers. The coding unit codes an image of a coding subject based on a determined result of the determination unit.

23 Claims, 21 Drawing Sheets

(51) Int. Cl.
  *H04N 19/17* (2014.01)
  *H04N 19/167* (2014.01)
  *H04N 19/33* (2014.01)
  *H04N 19/136* (2014.01)
  *H04N 19/187* (2014.01)
  *H04N 19/44* (2014.01)

(52) U.S. Cl.
  CPC ........... *H04N 19/167* (2014.11); *H04N 19/17* (2014.11); *H04N 19/187* (2014.11); *H04N 19/33* (2014.11); *H04N 19/44* (2014.11)

(56) References Cited

OTHER PUBLICATIONS

Suhring et al., "Indication of tile boundary alignment", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, Document: JCTVC-M0202, pp. 1-3.

Lu et al., "A Perceptual Deblocking Filter for ROI-based Scalable Video Coding", Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, Jan. 13-19, 2007, Document: JVT-V064, Filename: JVT-V064.doc, pp. 1-13.

Suehring et al., "Inter-layer constrained tile sets SEI message", Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, Document: JCTVC-N0087, pp. 1-3.

Schwarz et al., "Overview of the Scalable Extension of the H.264/MPEG-4 AVC Video Coding Standard", (Oct. 2006).

Wu et al., "Motion-constrained tile sets SEI message", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, Document: JCTVC-M0235, (v.2), pp. 1-3.

ITU-T Telecommunication Standardization Sector of ITU, H.265, (Apr. 2013), "Series H: Audiovisual and Multimedia Systems Infrastructure of audiovisual services—Coding of moving video", High efficiency video coding, Recommendation ITU-T H.265, p. 11: 3.154 tile: A rectangular region of coding tree blocks within a particular tile column and a particular tile row in a picture.

* cited by examiner

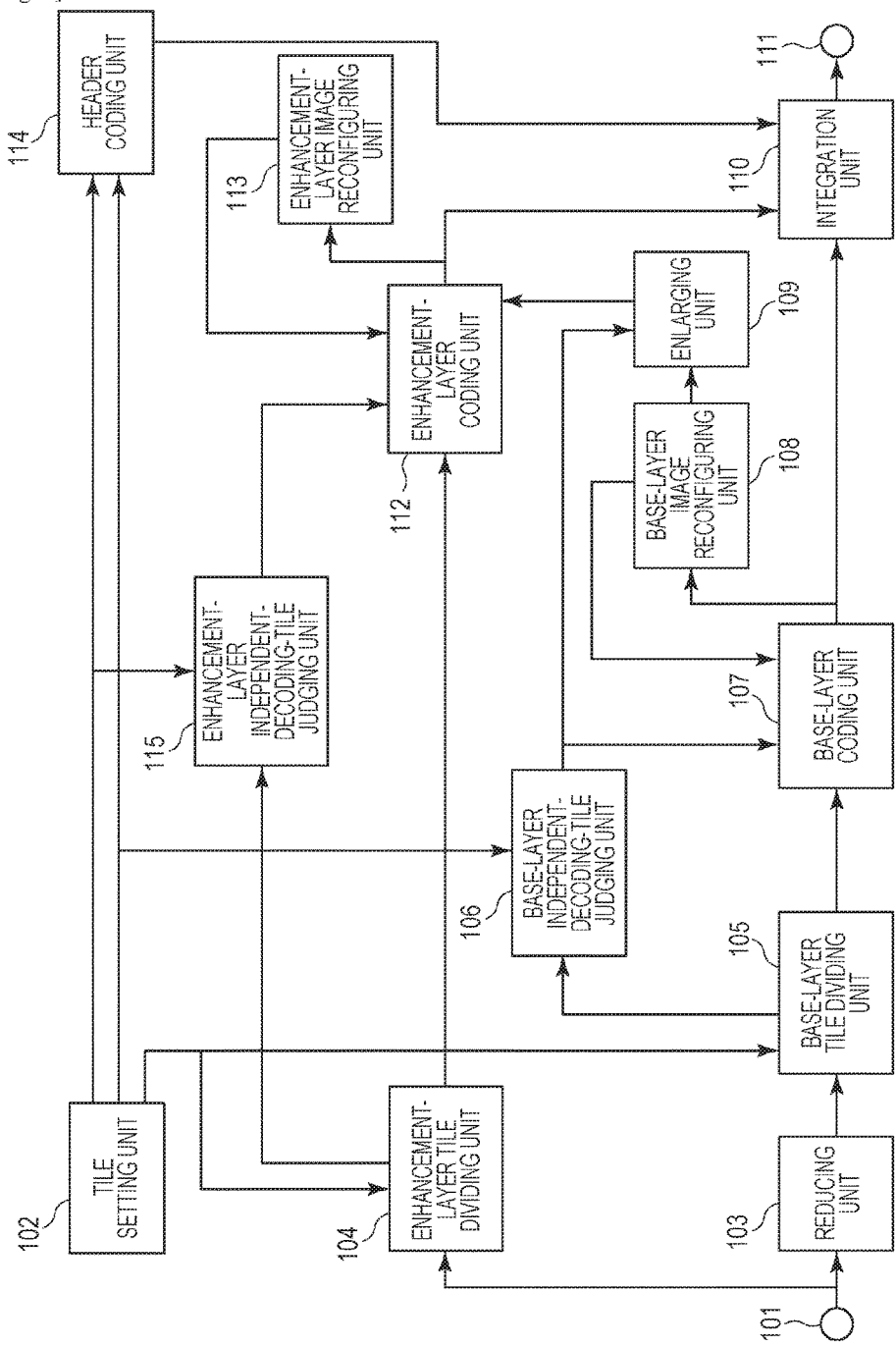
[Fig. 1]

[Fig. 2]
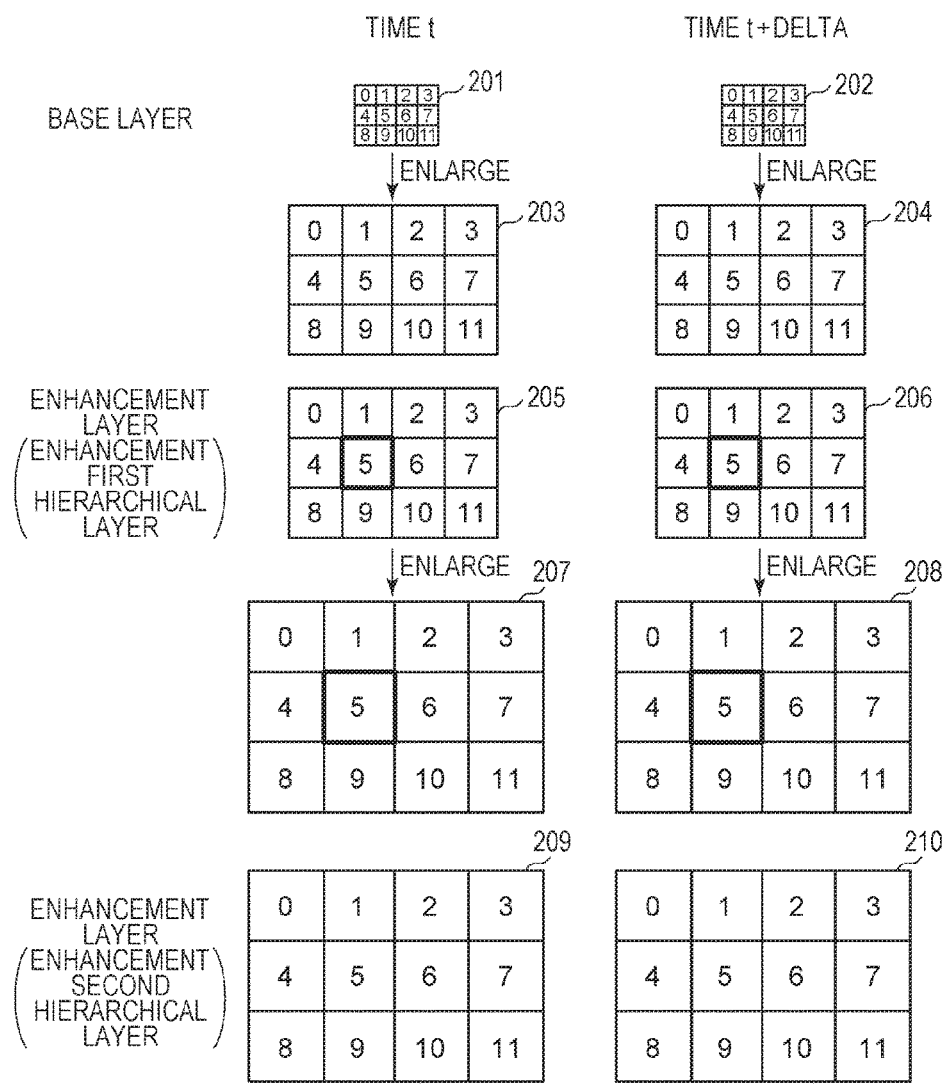

[Fig. 3A]
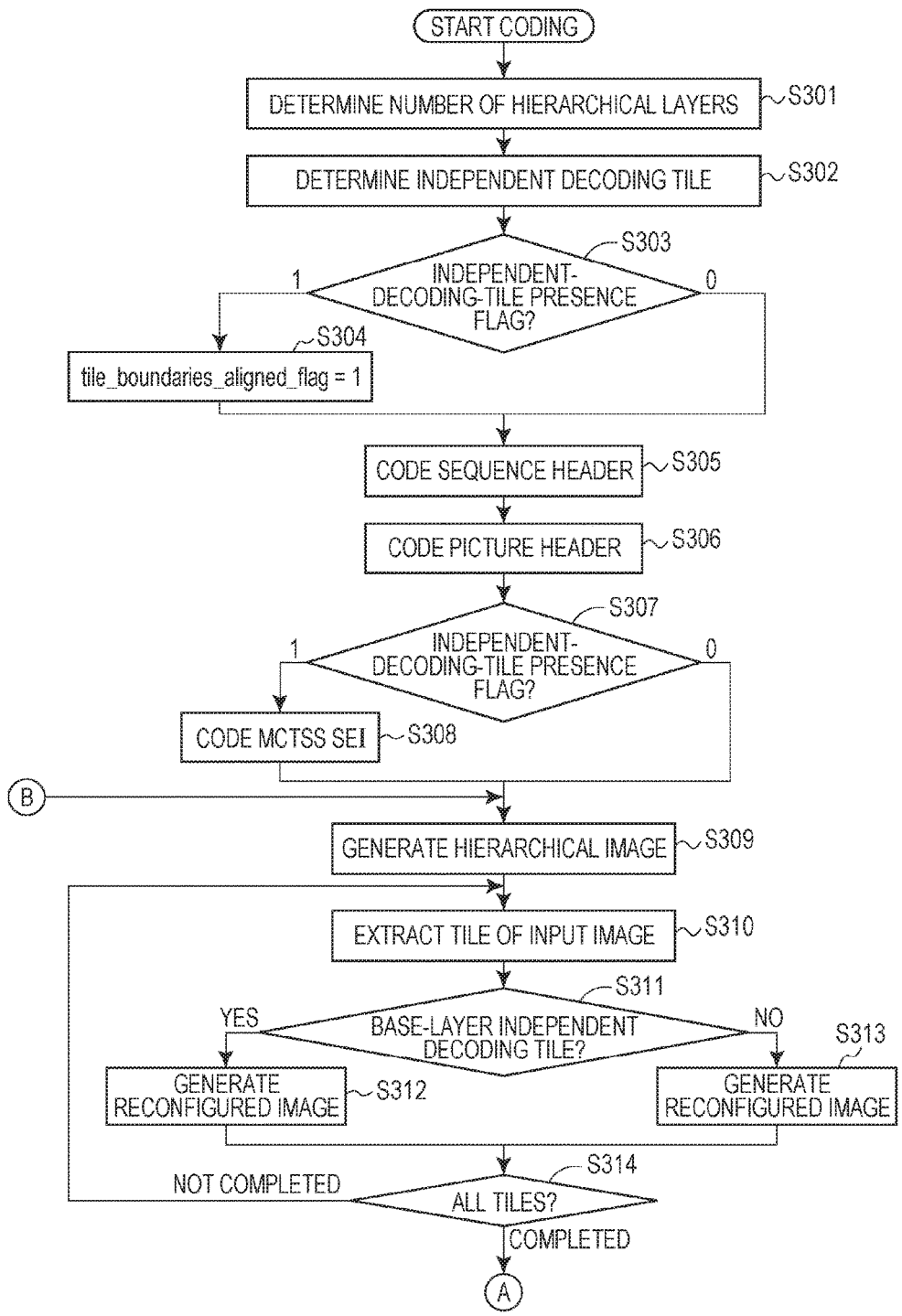

[Fig. 3B]
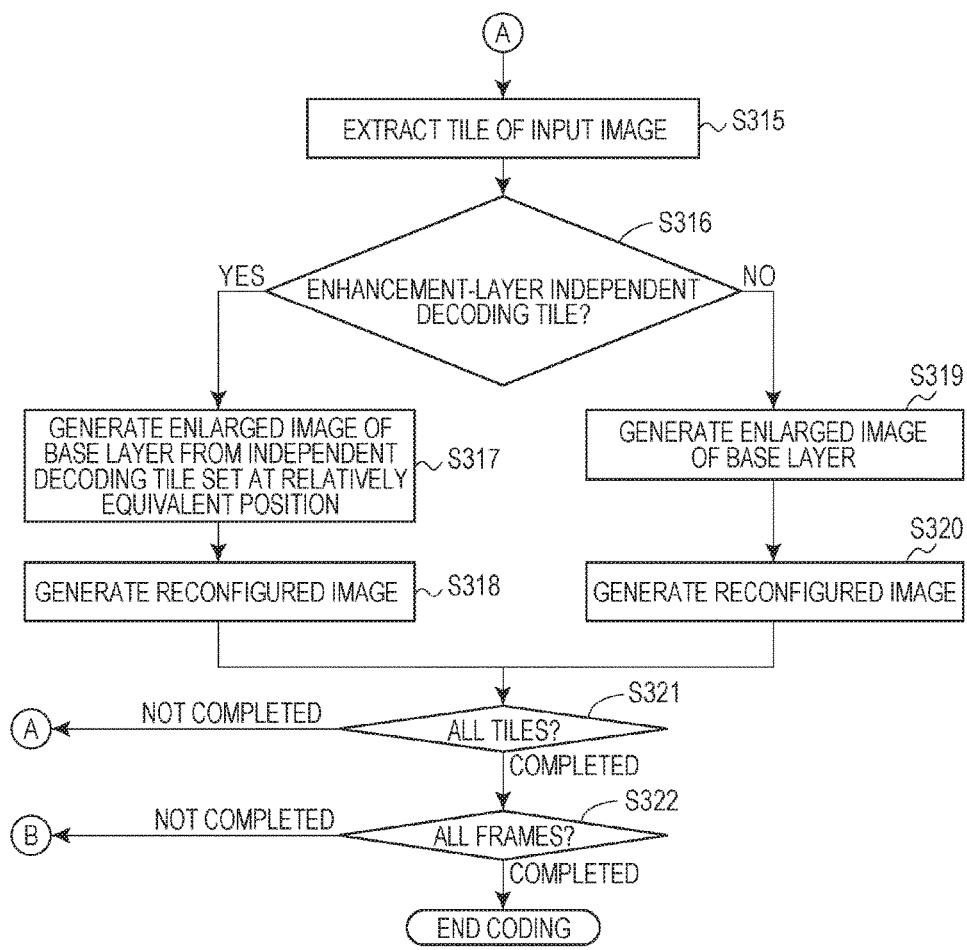

[Fig. 4A]

| motion-constrained_tile_sets_scalability(vps_max_layers_minus1) { | Descriptor |
|---|---|
|   for (k=0; k<=vps_max_layers_minus1; k++){ | |
|     num_sets_in_message [ k ] | ue(v) |
|     for( i = 0; i < num_sets_in_message [k]; i++) { | |
|       mcts_id[ k ][ i ] | ue(v) |
|       num_tile_rects_in_set_minus1[ k ] [ i ] | ue(v) |
|       for( j = 0; j <= num_tile_rects_in_set_minus1[k] [ i ]; j++) { | |
|         top_left_tile_index[k][ i ][ j ] | ue(v) |
|         bottom_right_tile_index[ k ][ i ][ j ] | ue(v) |
|       } | |
|       exact_sample_value_match_flag[ k ][ i ] | u(1) |
|     } | |
|   } | |
| } | |

[Fig. 4B]

| motion-constrained_tile_sets_scalability(vps_max_layers_minus1) { | Descriptor |
|---|---|
|   lowest_layer_MCTSS | ue(v) |
|   for (k=lowest_layer_MCTS; k<=vps_max_layers_minus1; k++){ | |
|     num_sets_in_message_minus1[ k ] | ue(v) |
|     for( i = 0; i <= num_sets_in_message_minus1[k]; i++) { | |
|       mcts_id[ k ][ i ] | ue(v) |
|       num_tile_rects_in_set_minus1[ k ][ i ] | ue(v) |
|       for( j = 0; j <= num_tile_rects_in_set_minus1[k][ i ]; j++) { | |
|         top_left_tile_index[ k ][ i ][ j ] | ue(v) |
|         bottom_right_tile_index [ k ][ i ][ j ] | ue(v) |
|       } | |
|       exact_sample_value_match_flag[ k ][ i ] | u(1) |
|     } | |
|   } | |
| } | |

[Fig. 5]
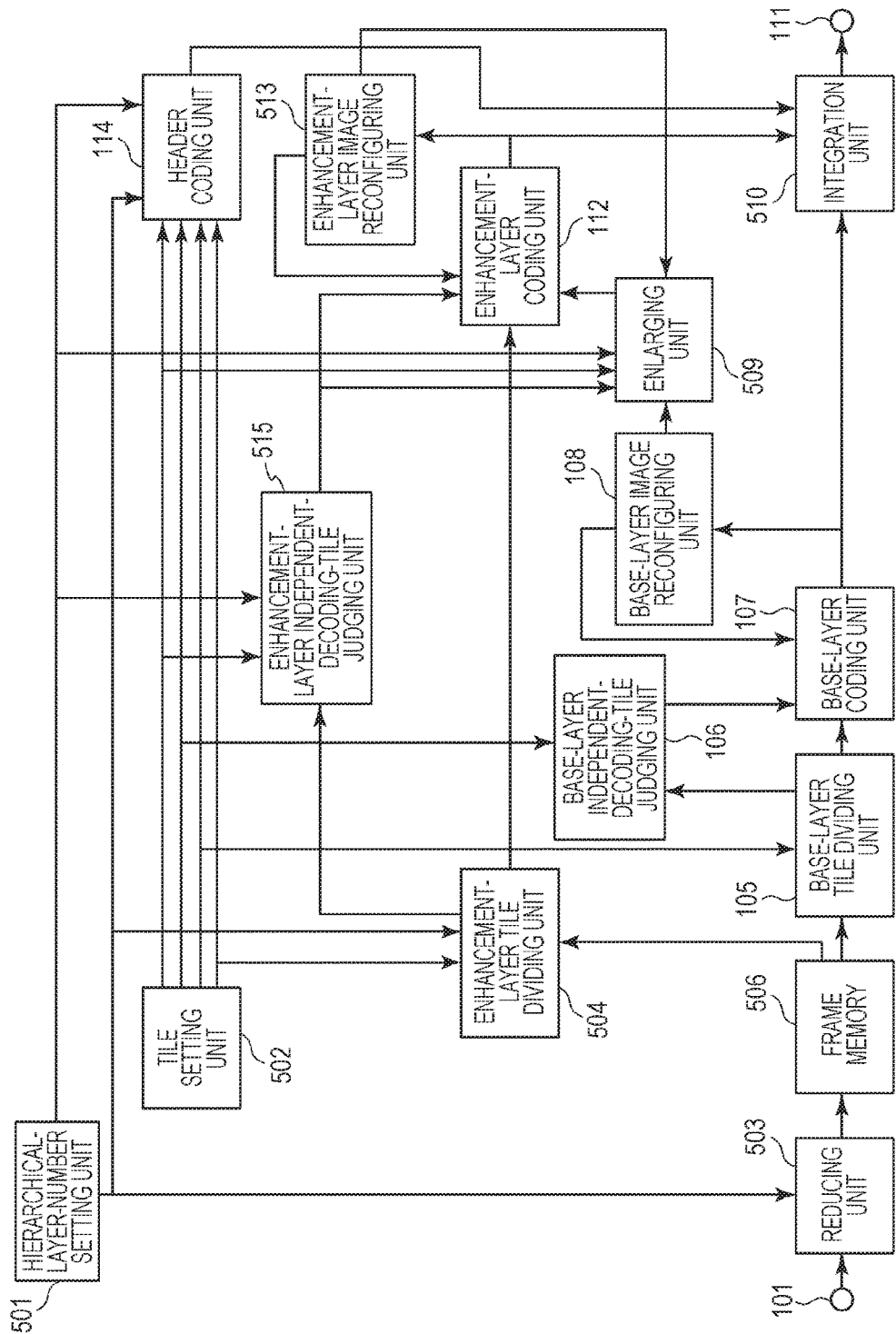

[Fig. 6A]

| motion-constrained_tile_sets_scalability(nuh_layer_id) { | Descriptor |
|---|---|
|   num_sets_in_message [nuh_layer_id] | ue(v) |
|   for( i = 0; i <= num_sets_in_message_minus1; i++) { | |
|     mcts_id[dependency_id][ i ] | ue(v) |
|     num_tile_rects_in_set_minus1[nuh_layer_id] [ i ] | ue(v) |
|     for( j = 0; j <= num_tile_rects_in_set_minus1[nuh_layer_id] [ i ]; j++) { | |
|       top_left_tile_index[nuh_layer_id] [ i ][ j ] | ue(v) |
|       bottom_right_tile_index[nuh_layer_id] [ i ][ j ] | ue(v) |
|     } | |
|     exact_sample_value_match_flag[nuh_layer_id][ i ] | u(1) |
|   } | |
| } | |

[Fig. 6B]

| motion-constrained_tile_sets(vps_max_layers_minus1) { | Descriptor |
|---|---|
|   if(vps_max_layers_minu1 == 0 ) { | |
|     num_sets_in_message_minus1 | ue(v) |
|     for( i = 0; i <= num_sets_in_message_minus1; i++) { | |
|       mcts_id[0][ i ] | ue(v) |
|       num_tile_rects_in_set_minus1[0][ i ] | ue(v) |
|       for( j = 0; j <= num_tile_rects_in_set_minus1[ i ]; j++) { | |
|         top_left_tile_index[0][ i ][ j ] | ue(v) |
|         bottom_right_tile_index[0][ i ][ j ] | ue(v) |
|       } | |
|       exact_sample_value_match_flag[0][ i ] | u(1) |
|     } | |
|   } else{ | |
|     for (k=0; k<=vps_max_layers_minus1; k++){ | |
|       num_sets_in_message [ k ] | ue(v) |
|       for( i = 0; i < num_sets_in_message [ k ]; i++) { | |
|         mcts_id[ k ] [ i ] | ue(v) |
|         num_tile_rects_in_set_minus1[ k ] [ i ] | ue(v) |
|         for( j = 0; j <= num_tile_rects_in_set_minus1[ k ] [ i ]; j++) { | |
|           top_left_tile_index[ k ] [ i ][ j ] | ue(v) |
|           bottom_right_tile_index[ k ] [ i ][ j ] | ue(v) |
|         } | |
|         exact_sample_value_match_flag[ k ] [ i ] | u(1) |
|       } | |
|     } | |
|   } | |
| } | |

[Fig. 7A]
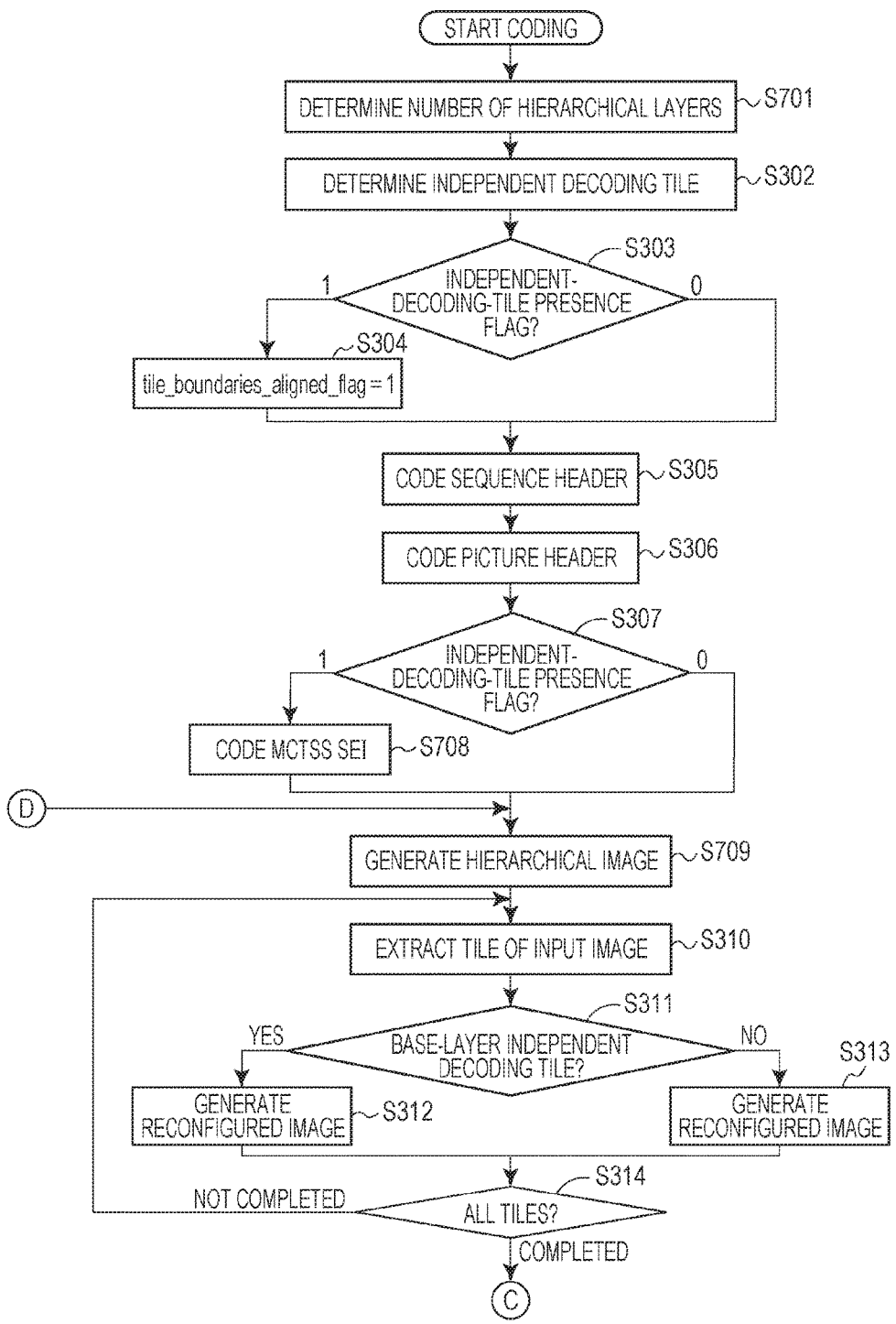

[Fig. 7B]
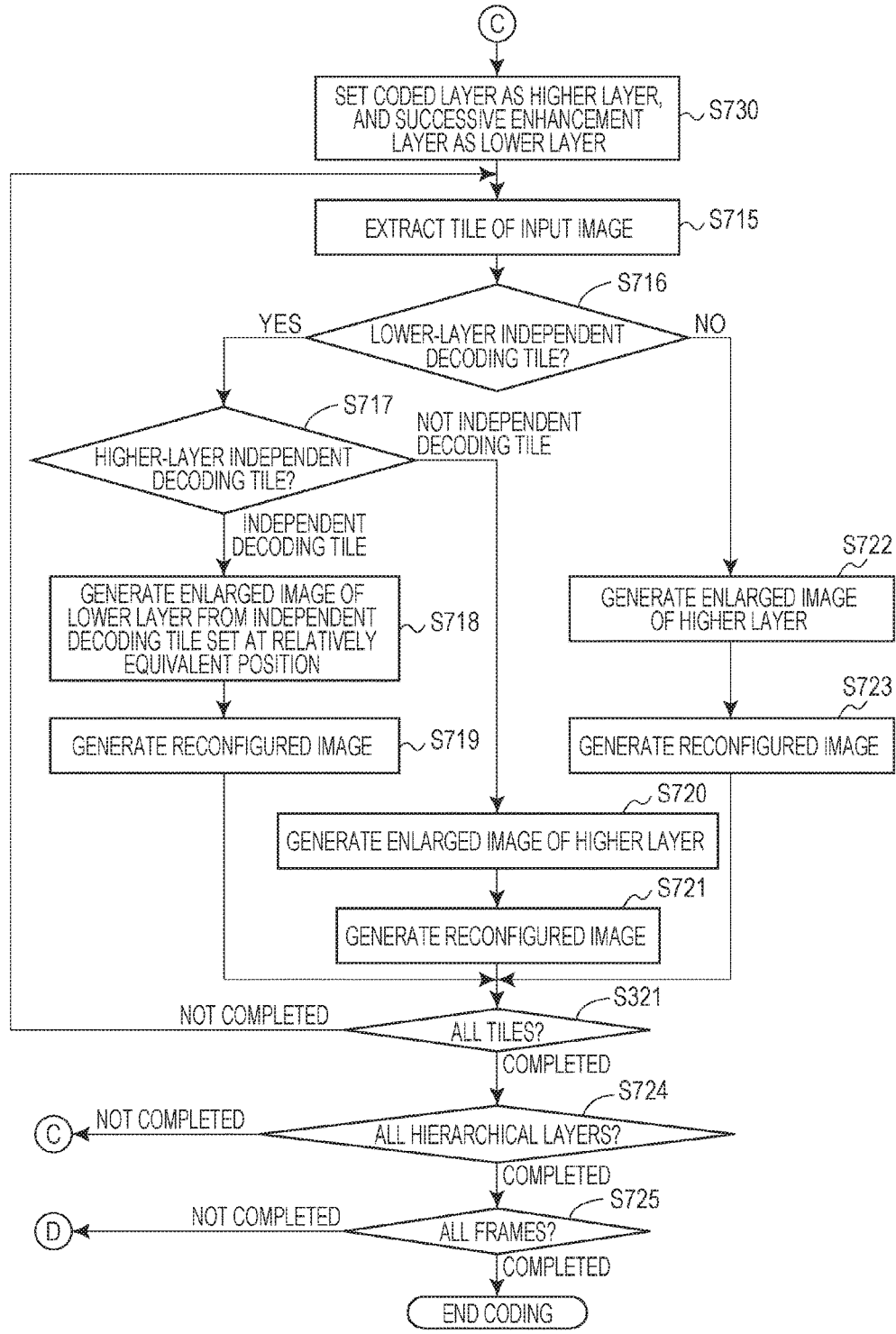

[Fig. 8]
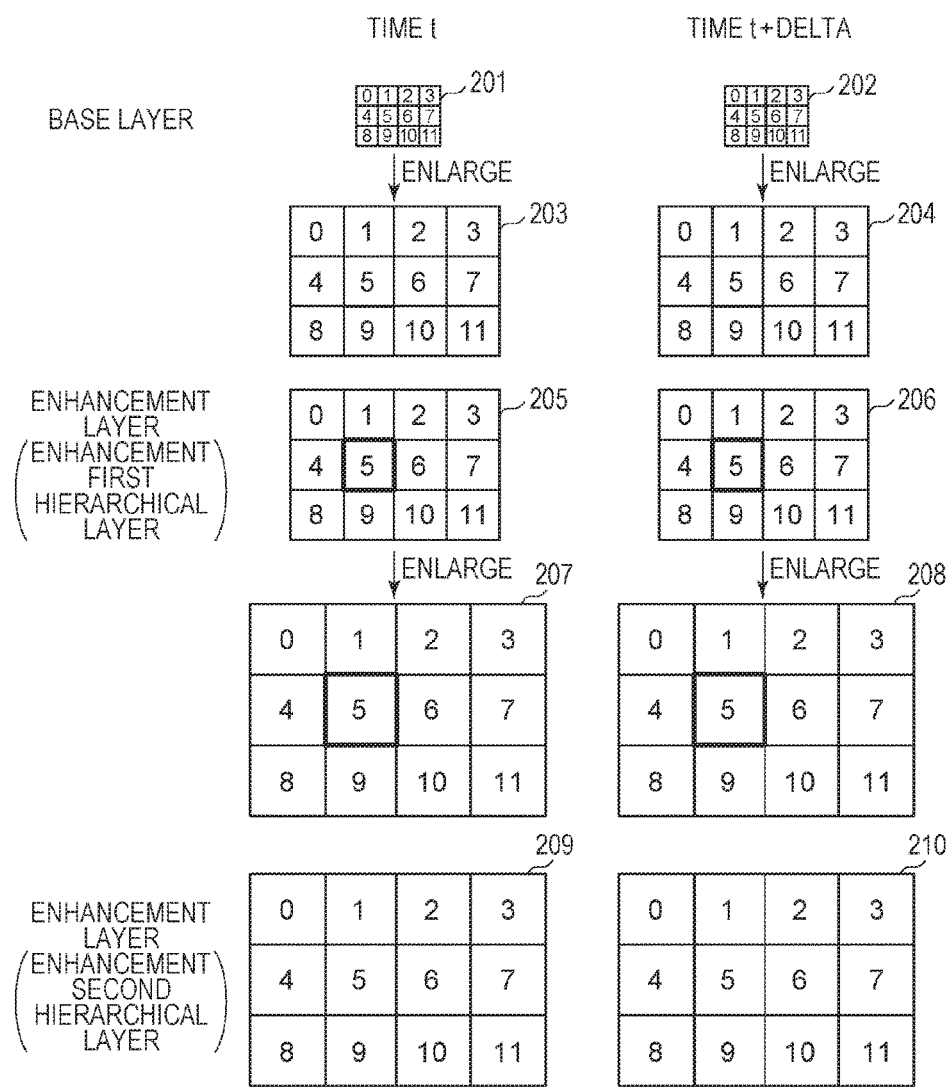

[Fig. 9]
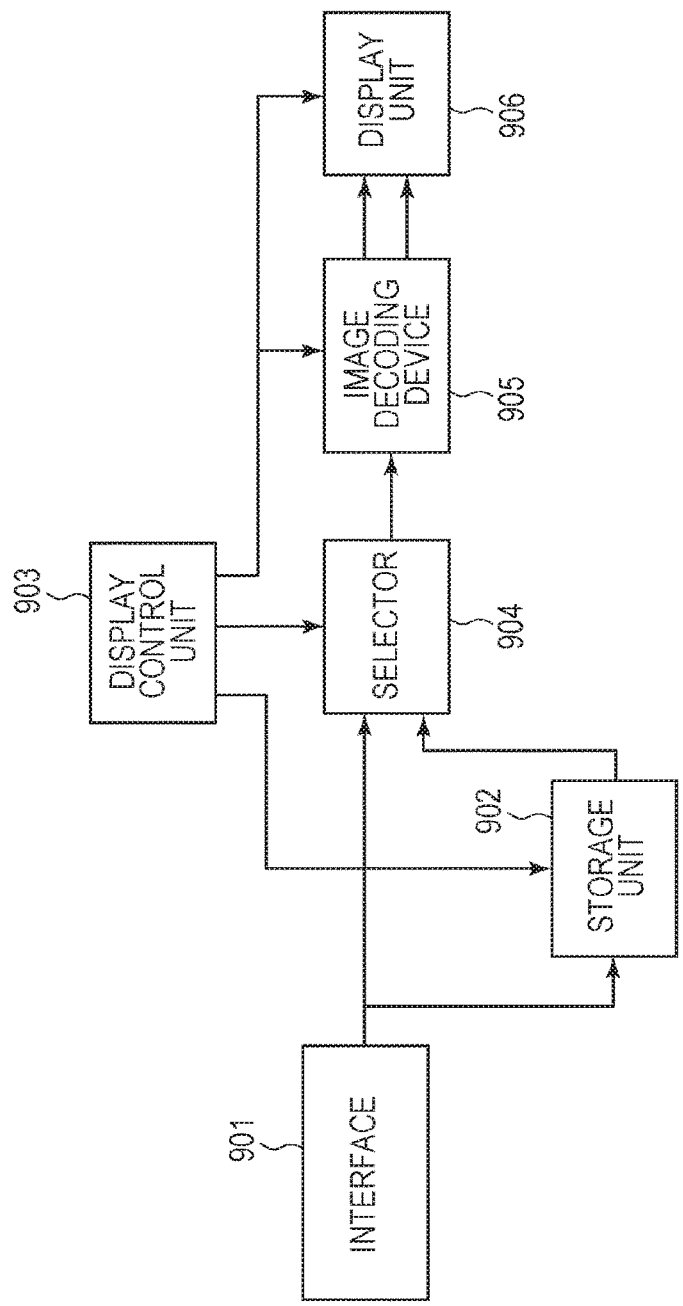

[Fig. 10]
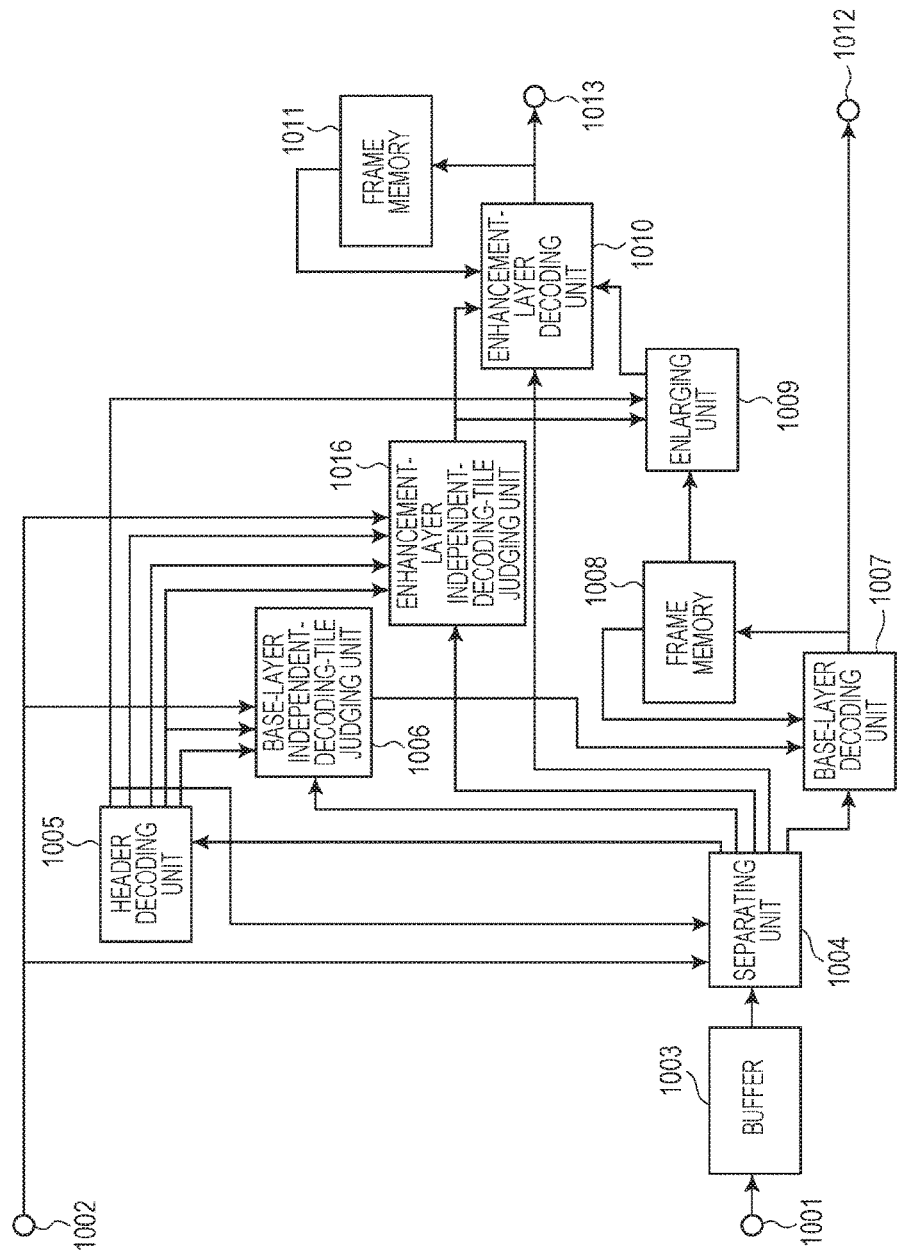

[Fig. 11A]
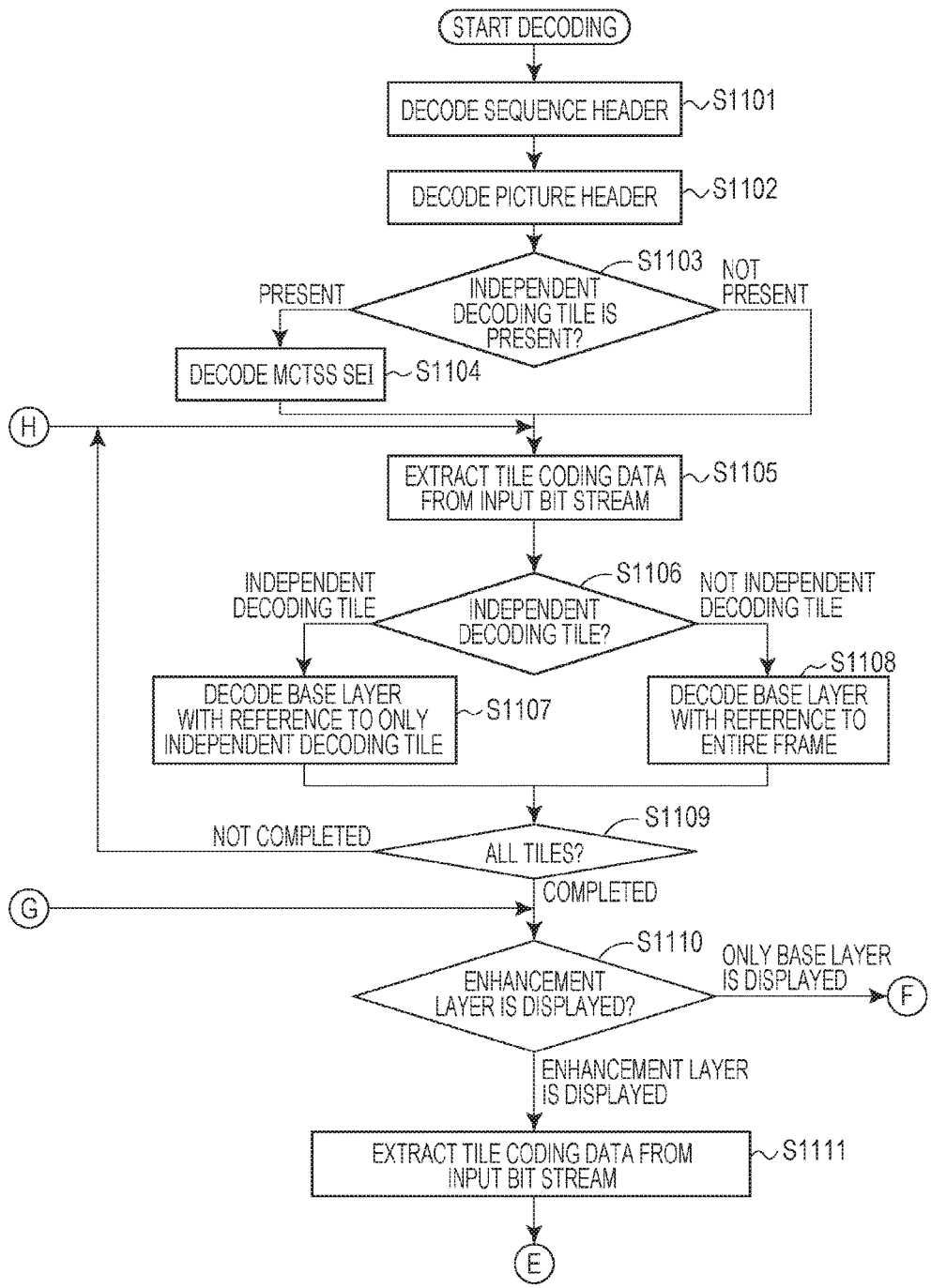

[Fig. 11B]
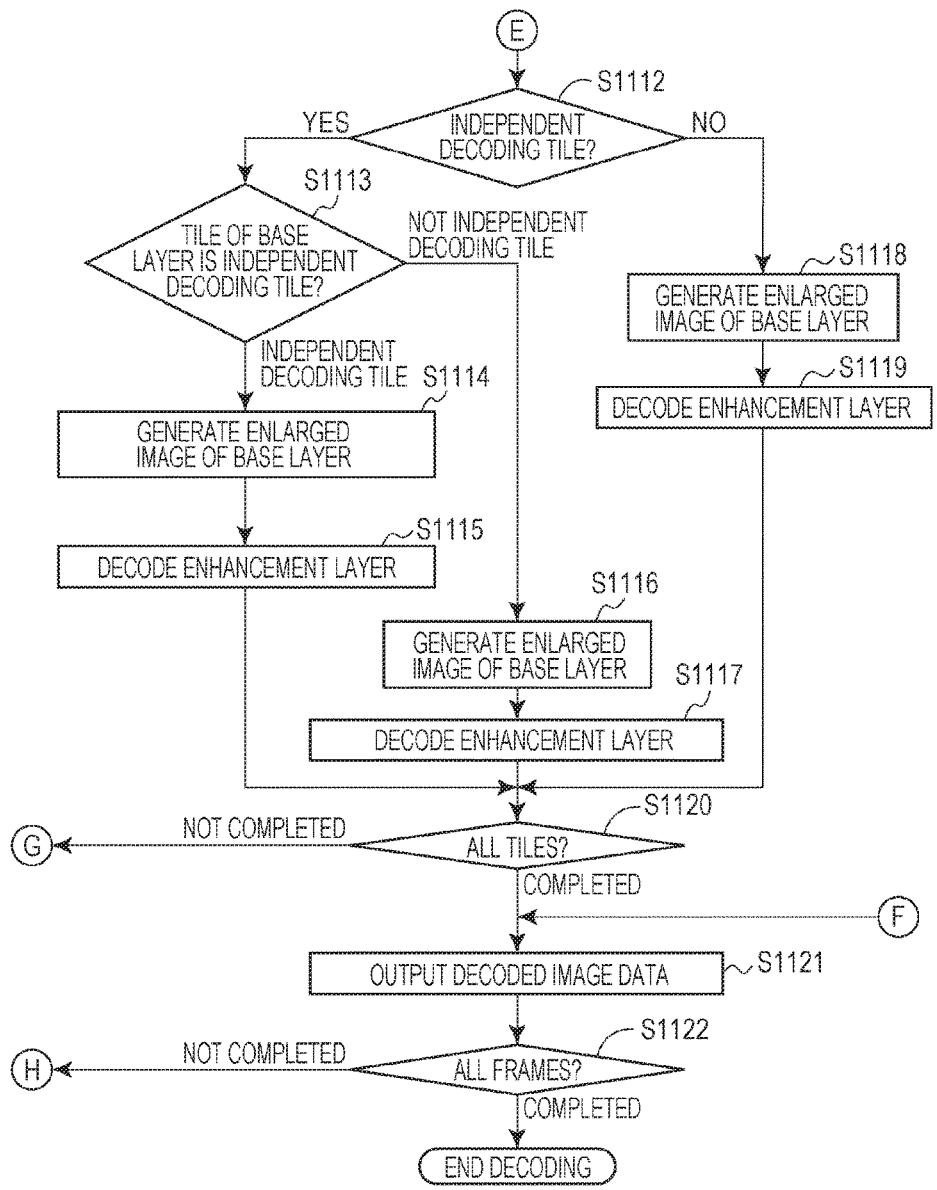

[Fig. 12]
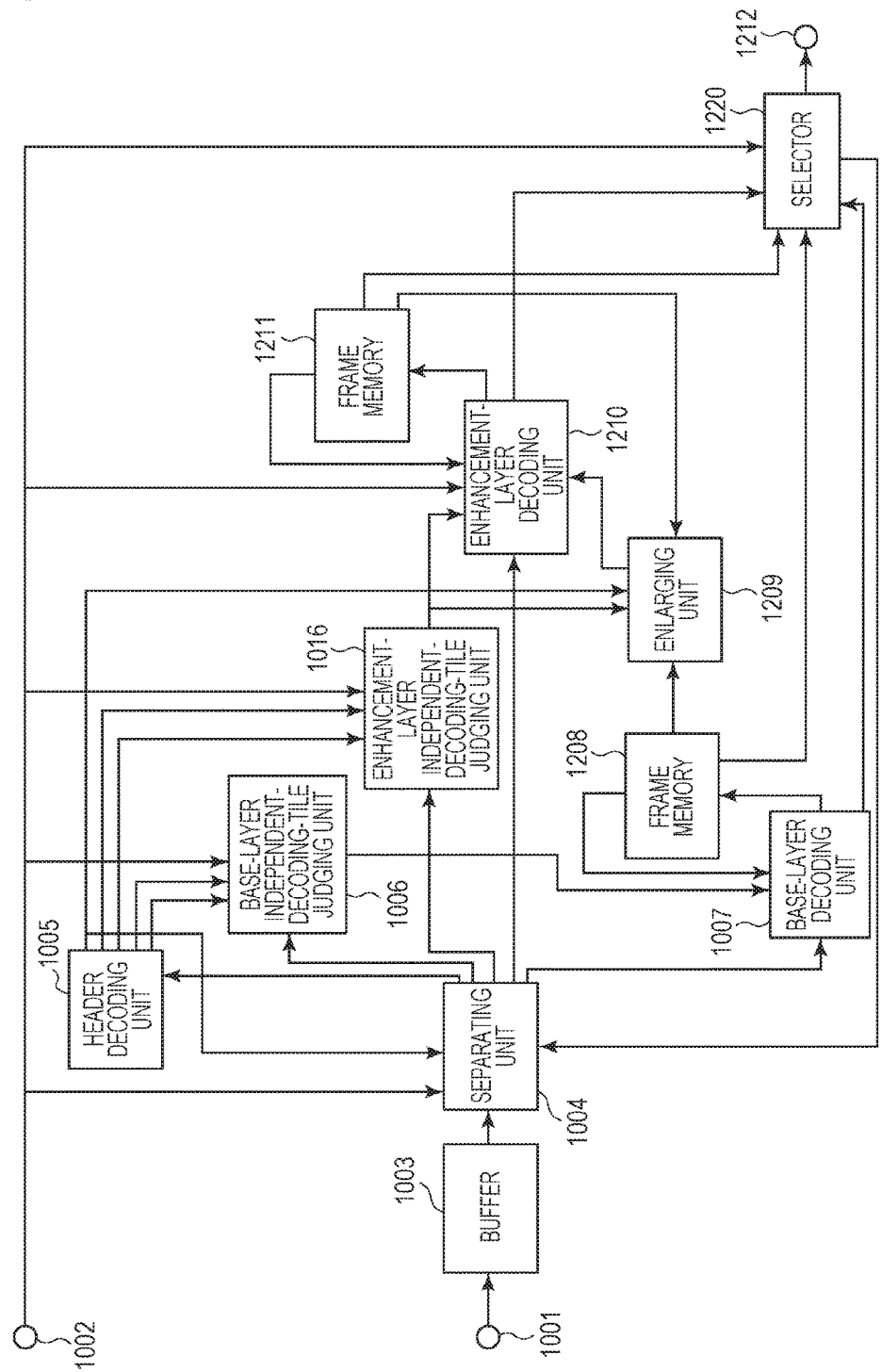

[Fig. 13A]
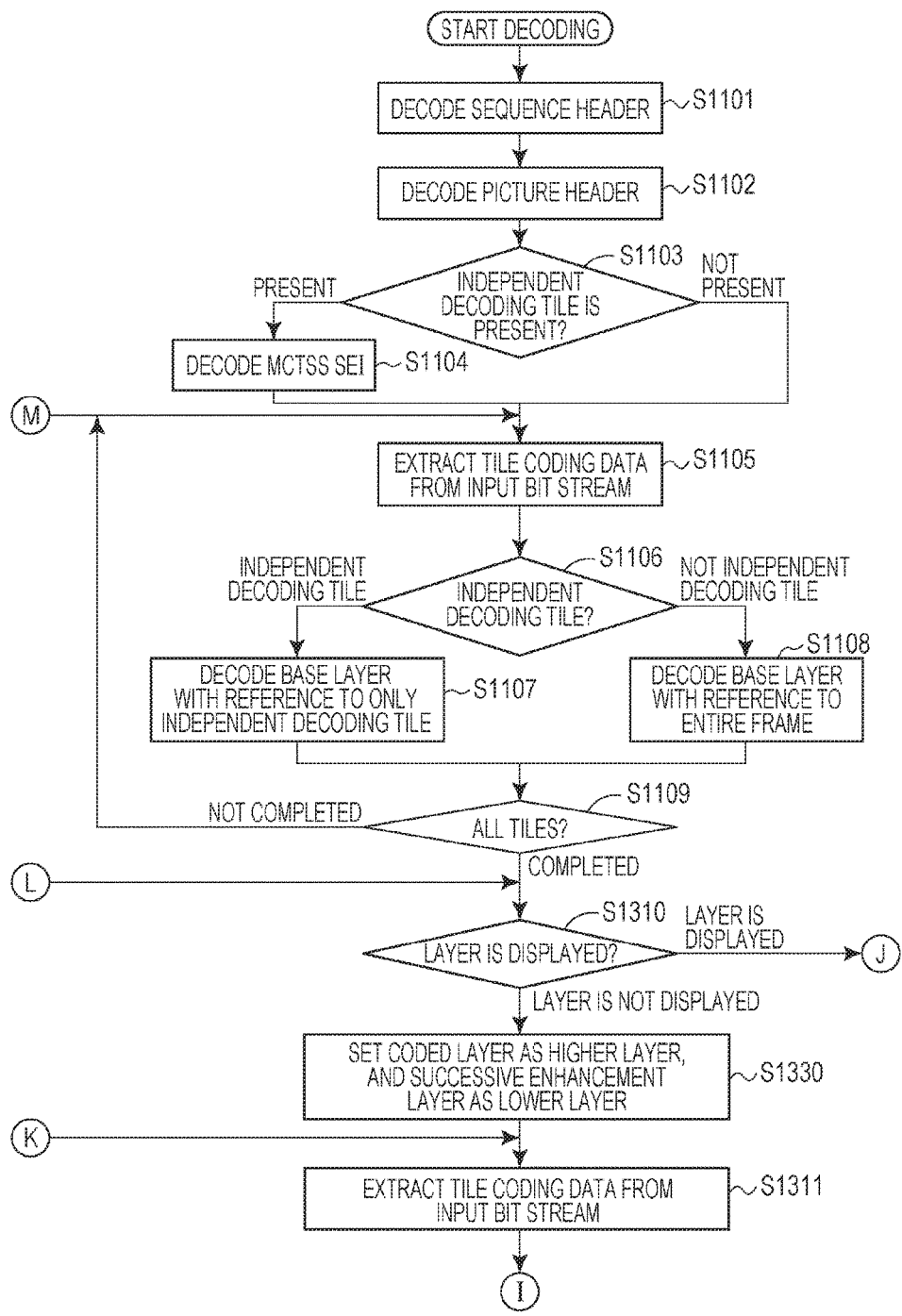

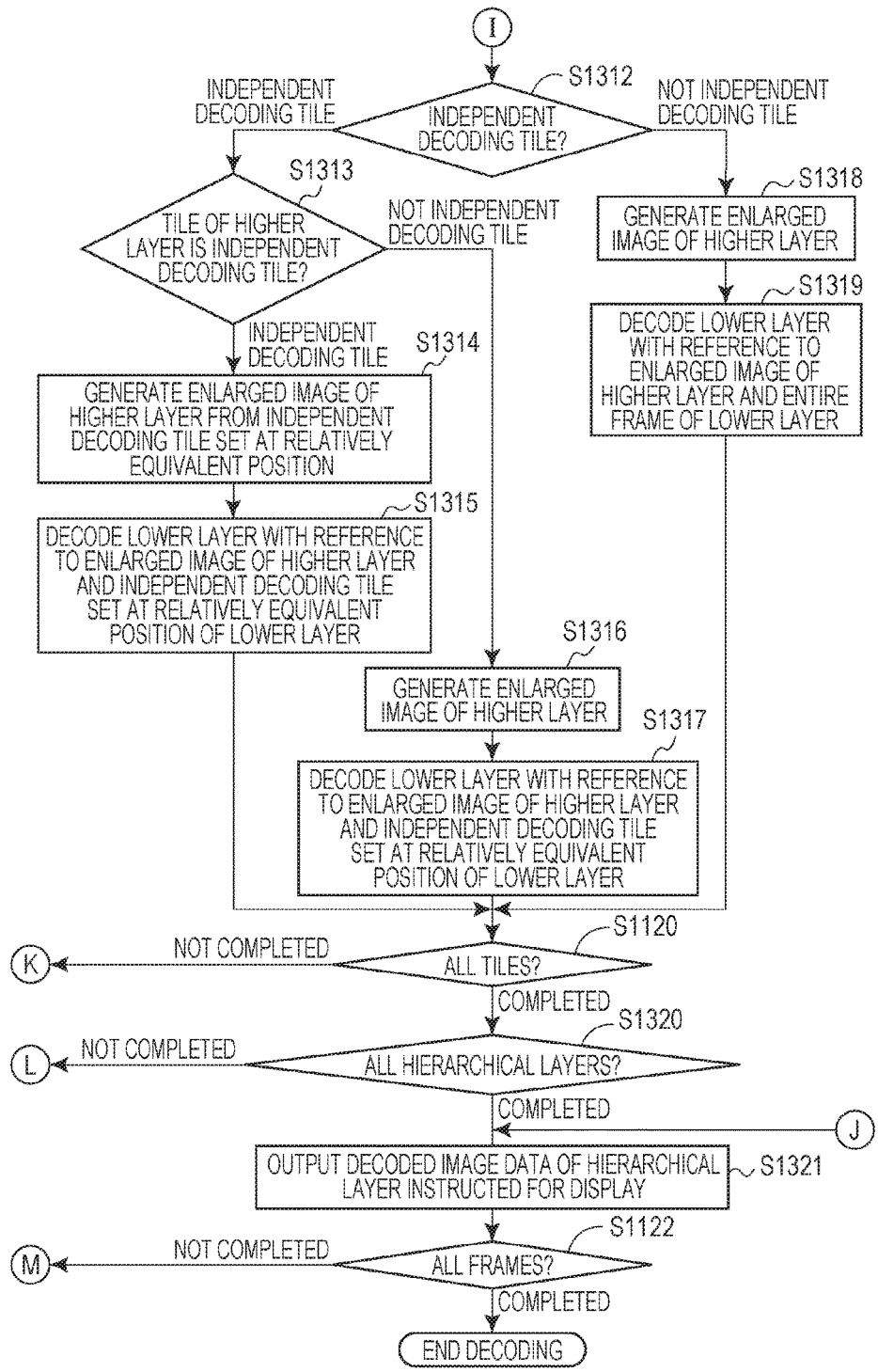
[Fig. 13B]

[Fig. 14]
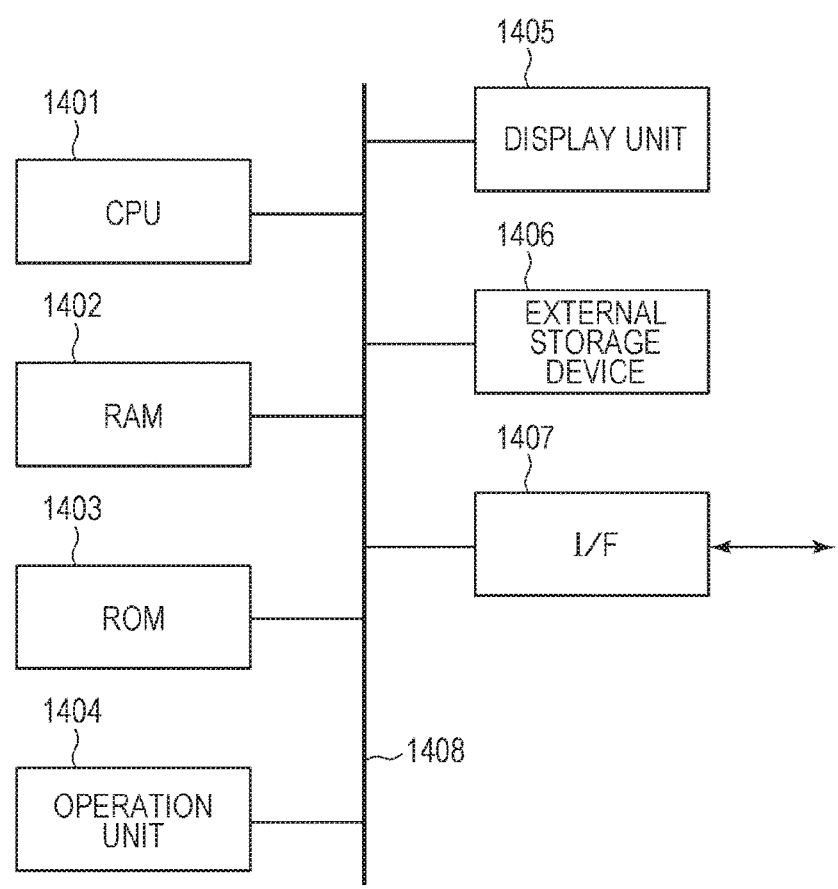

[Fig. 15]
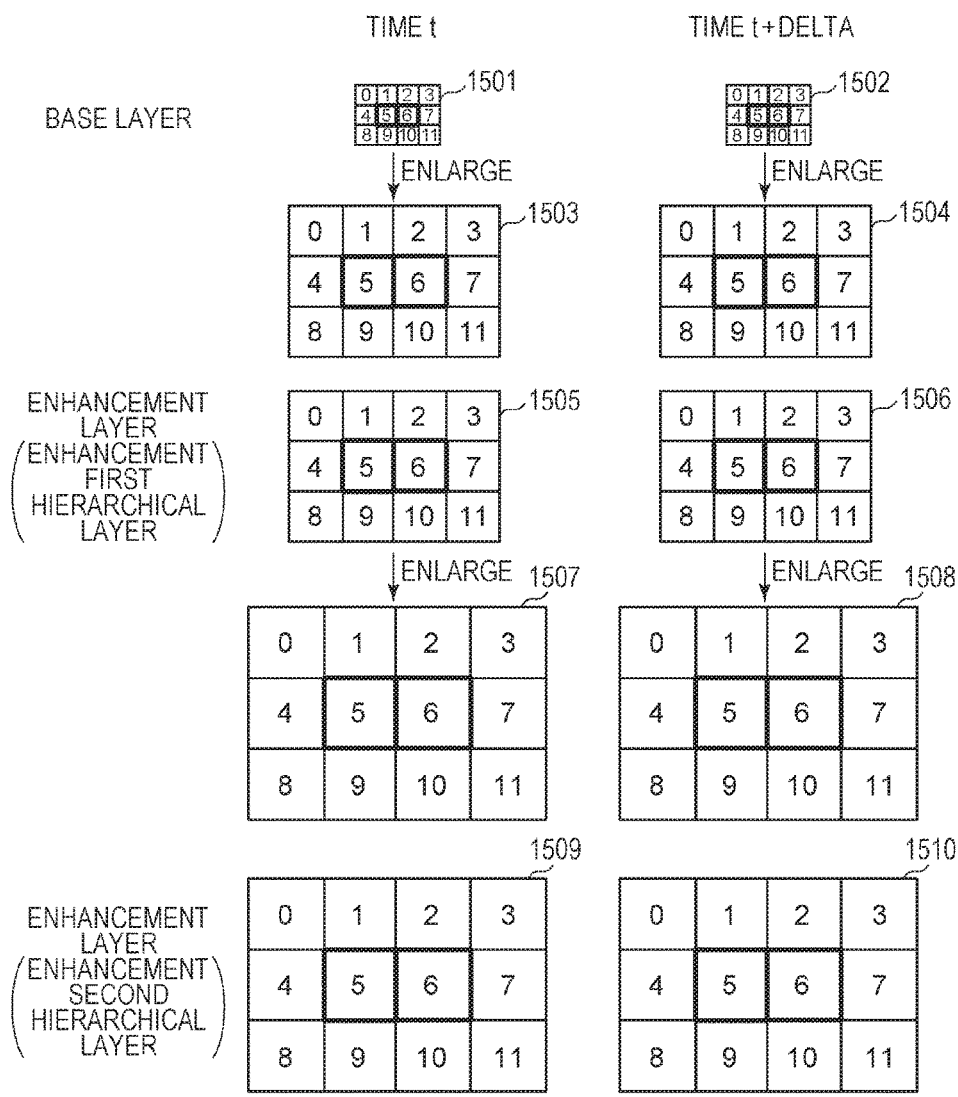

IMAGE CODING DEVICE, IMAGE CODING METHOD, STORAGE MEDIUM, IMAGE DECODING DEVICE, IMAGE DECODING METHOD, AND STORAGE MEDIUM

TECHNICAL FIELD

The present invention relates to an image coding device, an image coding method, a storage medium, an image decoding device, an image decoding method, and a storage medium. In particular, the present invention relates to coding and decoding of layers having different spatial resolutions or different image qualities.

BACKGROUND ART

In recent years, an action for international standardization of a further efficient coding method as a successor to H.264/MPEG-4 AVC (hereinafter, H.264) has been started. Hence, Joint Collaborative Team on Video Coding (JCT-VC) has been established between ISO/IEC and ITU-T. JCT-VC is pursuing standardization of High Efficiency Video Coding (hereinafter, HEVC). ITU-T has issued the standard as the H.264 coding method in June, 2013 (NPL 1: ITU-T H.265 (April 2013) High efficiency video coding). For the standardization of HEVC, addition of functions, such as hierarchical coding and range enhancement, is continuously discussed.

For the standardization of HEVC, various coding tools are developed and high coding efficiency is achieved. In particular, HEVC divides an image into rectangular tiles and coding and decoding can be performed on a tile basis as compared with H.264 of related art. As an improved method of this tile dividing method, a prediction limit is provided for a tile so that the tile can be independently coded and decoded irrespective of other tile (NPL 2: Contributed by JCT-VC, JCTVC-M0235 Internet <http://phenix.int-evry.fr/jct/doc_end_user/documents/13_Incheon/wg11/>). This technique defines a tile that can be independently coded and decoded on a sequence basis. Tile sets that can be independently coded and decoded are called motion-constrained tile sets (hereinafter, abbreviated as MCTS). Only tile sets at relatively equivalent positions are subjects of inter-frame prediction, and prediction for tiles other than the tile sets is not performed. Accordingly, independence of coding and decoding is ensured. The positions of the tiles included in MCTS are included in a Supplemental Enhancement Information (SEI) message and coded.

Meanwhile, as described above, for the standardization of HEVC, extension to hierarchical coding is also discussed. One of suggestions is a suggestion on a technique that fixes the position of tile division by spatial-resolution hierarchical coding or the like (NPL 3: Contributed by JCT-VC, JCTVC-M0202 Internet <http://phenix.int-evry.fr/jct/doc_end_user/documents/13_Incheon/wg11/>). This is providing a tile_boundaries_aligned_flag code in Video Usability Information (VUI) parameters (vui_parameters). This code represents tile-position alignment information indicative of whether or not relative positions of tiles in respective hierarchical layers are aligned. If this code is 1, it is assured that the position of the boundary of a tile in an enhancement layer is aligned with the position of a corresponding tile in a base layer. Accordingly, since the position of the image in the base layer called by decoding the tile in the enhancement layers can be specified, decoding can be performed at high speed. At this time, the base layer is the highest layer, and the successive enhancement layers are lower layers.

In hierarchical coding, by performing coding so that the tile in the enhancement layer can be independently decoded, and by performing decoding independently on a tile basis, a desirable image is required to be acquired at high speed.

However, in MCTS described in NPL 2, hierarchical coding is not considered. That is, in the present standard, MCTS is set on a sequence basis. In a coding method having a plurality of layers, such as hierarchical coding, it is not sure how MCTS is handled in each layer. Since handling of MCTS is conceived on a sequence basis, for example, it may be considered that MCTS is set only in the base layer or MCTS is set in all layers. In the former case, for the enhancement layer with a high resolution, it is difficult to satisfy the request for partial reading by using MCTS. Also, in the latter case, since the tile in the base layer and the tile in the enhancement layer are included in MCTS, tile division has to be performed even for the base layer.

Specific description is given with reference to FIG. 15. FIG. 15 shows tile division. Reference signs 1501 to 1510 are frames. The frame 1501 represents a frame in a base layer at a time t. Each layer is formed of tiles numbered 0 to 11. The frame 1505 represents a frame in an enhancement first hierarchical layer at the time t. The frame 1503 represents a frame in which decoded image data of the frame 1501 is enlarged to the resolution of the enhancement first hierarchical layer. The frame 1509 represents a frame of an enhancement second hierarchical layer at the time t. The frame 1507 represents a frame in which decoded image data of the frame 1505 is enlarged to the resolution of the enhancement second hierarchical layer. The frame 1502 represents a frame of the base layer at a time t+delta. The frame 1506 represents a frame of the enhancement first hierarchical layer at the time t+delta. The frame 1504 represents a frame in which decoded image data of the frame 1502 is enlarged to the resolution of the enhancement first hierarchical layer. The frame 1510 represents a frame of the enhancement second hierarchical layer at the time t+delta. The frame 1508 represents a frame in which decoded image data of the frame 1506 is enlarged to the resolution of the enhancement second hierarchical layer. For description, it is assumed that tile division of each frame includes division into four in the horizontal direction and division into three in the vertical direction. Thin lines in the drawing represent the boundaries of tiles.

Herein, for description, MCTS includes a tile with a tile number 5 and a tile with a tile number 6. In FIG. 15, an area surrounded by thick lines is MCTS. Hence, to decode the tile with the tile number 5 in the frame 1510 in the enhancement second hierarchical layer, the tile with the tile number 5 in the frame 1506 of the enhancement first hierarchical layer and the tile with the tile number 5 in the frame 1502 of the base layer are decoded, and the necessary tiles can be decoded at high speed.

When the technique is used for monitoring cameras or the like, in general, decoding of a base layer is performed, videos of a plurality of cameras are monitored, and if an abnormal state is detected, the abnormal area is enlarged and displayed. In MCTS, since inter-frame prediction is limited to image data in a tile set, coding efficiency is decreased. For example, if a subject, such as a person, enters from the outside of MCTS, image data outside MCTS is not referenced, and hence inter-frame prediction of the subject cannot be performed. Also, since the base layer has a sufficiently smaller image size than that of the enhancement layer and has a small code amount, processing cost for decoding is markedly lower than that of the enhancement layer. Owing to this, there is a small effect of an increase in speed by the improvement on parallel processing through tile division. Hence, a problem may arise in which the code amount is increased in a hierarchical layer with a low resolution, such as a base layer, which should have a small code amount, by setting of MCTS.

Accordingly, to address the above-described problem, the present invention improves the image quality and increases the coding efficiency in a higher hierarchical layer such as a base layer while ensuring independence of coding and decoding of a tile even during hierarchical coding. A tile that can be independently decoded, such as a tile included in MCTS, is called independent decoding tile, and a group of independent decoding tiles, such as MCTS, is called independent decoding tile set.

CITATION LIST

Non Patent Literature

NPL 1: ITU-T H.265 (April 2013) High efficiency video coding
NPL 2: Contributed by JCT-VC, JCTVC-M0235 Internet <http://phenix.int-evry.fr/jct/doc_end_user/documents/13_Incheon/wg11/>
NPL 3: Contributed by JCT-VC, JCTVC-M0202 Internet <http://phenix.int-evry.fr/jct/doc_end_user/documents/13_Incheon/wg11/>

SUMMARY OF INVENTION

As a measure to address the above-described problem, an image coding device, which is a representative aspect of the present invention, has the following configuration. An image coding device that performs hierarchical coding on an image, which forms a movie, for a plurality of hierarchical layers, includes a first acquiring unit configured to acquire at least one of a first image and a second image of different hierarchical layers from the image; a coding unit configured to code at least one of the first image and the second image; and a determination unit configured to determine whether or not an independent region, which is coded without reference to other region in an image, is set for each of the images of the respective hierarchical layers. The coding unit codes an image of a coding subject based on a determined result of the determination unit.

Also, an image decoding device, which is a representative aspect of the present invention, has the following configuration. An image decoding device that decodes coded data obtained by performing hierarchical coding on an image, which forms a movie, for a plurality of hierarchical layers, includes a first acquiring unit configured to acquire data of an image, which is generated from the coded data and corresponds to at least a hierarchical layer among the plurality of hierarchical layers; a second acquiring unit configured to acquire information relating to whether or not information relating to an independent region, which is decoded without reference to other region in an image, is set for each of the images of the respective hierarchical layers; a third acquiring unit configured to acquire information relating to a hierarchical layer of a decoding subject among the plurality of hierarchical layers, and information relating to a region of a decoding subject in an image of the hierarchical layer of the decoding subject; and a decoding unit configured to decode the data acquired by the first acquiring unit, based on the information relating to the independent region acquired by the second acquiring unit and the information relating to the hierarchical layer and the region of the decoding subject acquired by the third acquiring unit.

With the present invention, the tile that can be independently decoded can be set even during hierarchical coding. Accordingly, only a video part required for decoding can be decoded and displayed at high speed with a low power consumption while the calculation cost is decreased.

Further features of the present invention will become apparent from the following description of exemplary embodiments with reference to the attached drawings.

BRIEF DESCRIPTION OF DRAWINGS

FIG. 1 is a block diagram showing a configuration of an image coding device according to a first embodiment.
FIG. 2 is an illustration showing an example of a configuration of tiles.
FIG. 3A is a flowchart showing image coding processing according to the first embodiment.
FIG. 3B is a flowchart showing the image coding processing according to the first embodiment.
FIG. 4A is an illustration showing a configuration example of coded data according to the first embodiment.
FIG. 4B is an illustration showing a configuration example of coded data according to the first embodiment.
FIG. 5 is a block diagram showing another configuration of an image coding device according to the first embodiment.
FIG. 6A is an illustration showing another configuration example of coded data according to the first embodiment.
FIG. 6B is an illustration showing another configuration example of coded data according to the first embodiment.
FIG. 7A is a flowchart showing image coding processing of another example according to the first embodiment.
FIG. 7B is a flowchart showing the image coding processing of the example according to the first embodiment.
FIG. 8 is an illustration showing an example of a configuration of tiles.
FIG. 9 is a block diagram showing a configuration of an image display device according to a second embodiment.
FIG. 10 is a block diagram, showing a configuration of an image decoding device according to the second embodiment.
FIG. 11A is a flowchart showing image decoding processing according to the second embodiment.
FIG. 11B is a flowchart showing the image decoding processing according to the second embodiment.
FIG. 12 is a block diagram showing another configuration of an image decoding device according to the second embodiment.
FIG. 13A is a flowchart showing image decoding processing of another example according to the second embodiment.
FIG. 13B is a flowchart showing the image decoding processing of the example according to the second embodiment.
FIG. 14 is a block diagram showing a configuration example of hardware of a computer that can be applied to the image coding device and the image decoding device of the present invention.
FIG. 15 is an illustration showing an example of related art of a configuration of tiles.

DESCRIPTION OF EMBODIMENTS

Hereinafter, the invention of the subject application is described in detail based on desirable embodiments thereof with reference to the attached drawings. The configurations shown in the following embodiments are merely examples, and the invention of the subject application is not limited to the illustrated configurations.

First Embodiment

An embodiment of the invention is described below with reference to the drawings. FIG. 1 is a block diagram showing an image coding device according to this embodiment. For description, in this embodiment, hierarchical coding is performed in a case in which the number of hierarchical layers is two only including a base layer and an enhancement layer; however, the number of hierarchical layers is not limited thereto. Also, the hierarchical layer is a hierarchical layer based on a spatial resolution. In FIG. 1, reference sign 101 is a terminal to which image data is input. The image data forms a movie. It is assumed that the image data is input on a frame basis.

Reference sign 102 is a tile setting unit that determines the number of division and positions of tiles in a frame, and further determines whether one of tiles is coded as an independent decoding tile, for each hierarchical layer. It is assumed that information indicative of the number of division of the tiles in the horizontal direction, the number of division of the tiles in the vertical direction, and the positions of the tiles set herein is tile division information. Also, information relating to an independent decoding tile in the base layer is called base-layer independent decoding tile information, and information relating to an independent decoding tile in the enhancement layer is called enhancement-layer independent decoding tile information.

Description is given with reference to FIG. 2 as an example. FIG. 2 shows tile division. Reference signs 201 to 210 are frames. In this embodiment, since the number of hierarchical layers is two, description is given with reference to the frames 201 to 206. The frame 201 represents a frame in the base layer at a time t. Each layer is formed of tiles numbered 0 to 11. The frame 205 represents a frame of an enhancement first hierarchical layer at the time t. Thin lines in the drawing represent the boundaries of tiles. In this embodiment, description is given based on an assumption that an image of a coding subject is 4K2K (4096 pixels× 2160 pixels). Hence, a tile has a size of 1024 pixels×720 pixels. Division information of tiles is written in the description of Picture Parameter Set (PPS) which is header data of a picture described in NPL 1. Hence, the description is omitted here. Also, an independent-decoding-tile presence flag, which represents information of whether or not an independent decoding tile is included on a sequence basis, is generated. The value of the independent-decoding-tile presence flag becomes 1 if the independent decoding tile is included, and becomes 0 if not. Further, when the independent decoding tile is coded, the position of the independent decoding tile is determined in each hierarchical layer, and independent-decoding-tile position information is generated for the determined position. In this case, the independent-decoding-tile position information is expressed by the tile number of a tile to be coded; however, it is not limited thereto. The tile division information is input to an enhancement-layer tile dividing unit 104, a base-layer tile dividing unit 105, a base-layer independent-decoding-tile judging (determination) unit 106, an enhancement-layer independent-decoding-tile judging (determination) unit 115, and a header coding unit 114, which are located at the downstream side.

Further, in FIG. 2, it is assumed that a tile with a tile number 5 indicated by a thick line in each of the frames 205 to 208 is an independent decoding tile, and forms an independent decoding tile set. Hereinafter, it is assumed that a frame at a time t+delta is a frame of a coding subject.

Reference sign 103 is a reducing unit. The reducing unit 103 reduces the input image data by using a predetermined filter or the like, and generates an image with a low resolution. However, the reducing method is not particularly limited. The reducing unit 103 holds the input image data of the frame and the reduced image obtained by reducing the image data until the next frame is input.

Reference sign 104 is the enhancement-layer tile dividing unit that divides input image data of the enhancement layer into tiles based on the tile division information. The enhancement-layer tile dividing unit 104 divides the input frame 206 into tiles from a tile with a tile number 0 to a tile with a tile number 11. After division into the tiles, the enhancement-layer tile dividing unit 104 outputs the tiles from the tile with the tile number 0 in the order of the numbers to the downstream side.

Reference sign 114 is the header coding unit. The header coding unit 114 generates header coded data on a sequence or picture basis. In particular, the header coding unit 114 receives inputs of the independent-decoding-tile presence flag and the independent-decoding-tile position information generated by the tile setting unit 102, generates MCTS SEI by coding these pieces of independent decoding tile information, and codes vui_parameters.

Reference sign 105 is the base-layer tile dividing unit. The base-layer tile dividing unit 105 divides the reduced image data into tiles based on the tile division information. The reduced image data is divided into the tiles so that the positions of the tiles set by the tile setting unit 102 meet the relatively equivalent positions in the reduced image data. In FIG. 2, the base-layer tile dividing unit 105 divides the input frame 202 into tiles from a tile with a tile number 0 to a tile with a tile number 11. After division into the tiles, the base-layer tile dividing unit 105 outputs the tiles from the tile with the tile number 0 in the order of the numbers to the downstream side. Also, the base-layer tile dividing unit 105 notifies the base-layer independent-decoding-tile judging unit 106 about the numbers at this time.

Reference sign 106 is the base-layer independent-decoding-tile judging unit that judges whether a tile in the base layer to be coded is an independent decoding tile or not. The base-layer independent-decoding-tile judging unit 106 compares the independent-decoding-tile presence flag and the independent-decoding-tile position information of the base layer generated by the tile setting unit 102, with the tile number of the tile of the coding subject input from the base-layer tile dividing unit 105. By the comparison, the base-layer independent-decoding-tile judging unit 106 judges whether the coding subject tile in the base layer is an independent decoding tile or not. The judgment result serves as a base-layer independent-decoding-tile coding flag, the value of which becomes 1 if the coding subject tile in the base layer is the independent decoding tile, and becomes 0 if not.

Reference sign 115 is the enhancement-layer independent-decoding-tile judging unit that judges whether a tile in the enhancement layer to be coded is an independent decoding tile or not. The enhancement-layer independent-decoding-tile judging unit 115 compares the independent-decoding-tile presence flag and the independent-decoding-tile position information of the enhancement layer generated by the tile setting unit 102, with the tile number of the coding subject tiles input from the enhancement-layer tile dividing unit 104. By the comparison, the enhancement-layer independent-decoding-tile judging unit 115 judges whether the coding subject tile in the enhancement layer is an independent decoding tile or not. The judgment result serves as an enhancement-layer independent-decoding-tile coding flag, the value of which becomes 1 if the coding subject tile in the base layer is the independent decoding tile, and becomes 0 if not.

Reference sign 107 is a base-layer coding unit. The base-layer coding unit 107 codes the image data of a tile input from the base-layer tile dividing unit 105. In addition to the image data, the base-layer coding unit 107 receives an input of the base-layer independent-decoding-tile coding flag. According to this flag, if the coding subject tile in the base layer is the independent coding tile, prediction and coding are performed from only a portion, which has been the independent decoding tile in the same tile set, in the decoded image of the base layer that can be referenced. In FIG. 2, if the tile with the tile number 5 in the frame 202 is an independent decoding tile, to code this, coding is performed with reference to only the tile with the tile number 5 in the tile set of the frame 201. If the base-layer independent-decoding-tile coding flag is 0, that is, if the tile is not the independent decoding tile, prediction is performed from the decoded image of the base layer that can be referenced without limiting to the independent decoding tile in the base layer, and coding is performed for a prediction error etc. Base-layer coded data obtained by coding is output to the downstream side.

Reference sign 108 is a base-layer image reconfiguring unit that reconfigures a reconfigured image of the base layer by using a coefficient etc. generated by the base-layer coding unit 107. The base-layer image reconfiguring unit 108 holds the reconfigured image data so that image data, which is enlarged by an enlarging unit 109 (described later), is referenced when coding is performed by the base-layer coding unit 107 and an enhancement-layer coding unit 112 (described later).

Reference sign 109 is the enlarging unit that enlarges the decoded image of the base layer to the size of the enhancement layer. In FIG. 2, the enlarging unit 109 enlarges the reconfigured image data of each of the frame 201 and the frame 202, and generates the frame 203 and the frame 204.

Reference sign 112 is the enhancement-layer coding unit. The enhancement-layer coding unit 112 codes the image data of a tile input from the enhancement-layer tile dividing unit 104. In addition to the image data, the enhancement-layer coding unit 112 receives an input of the enhancement-layer independent-decoding-tile coding flag from the enhancement-layer independent-decoding-tile judging unit 115. According to this flag, the enhancement-layer coding unit 112 selects a reference image and performs coding. That is, if the tile of the coding subject of the enhancement layer is the independent decoding tile, the enlarged image data of the reconfigured image of the base layer and the reconfigured image data of the enhancement layer are referenced. That is, the portion of the independent decoding tile set of each image data is referenced and coded. Describing with reference to FIG. 2, when the tile with the tile number 5 in the frame 206 is coded, coding is performed with reference to the tile with the tile number 5 in the frame 204 and the tile with the tile number 5 in the frame 206. Also, if the enhancement-layer independent-decoding-tile coding flag is 0, that is, if the tile is not the independent decoding tile, prediction is performed from the reconfigured image data of the enhancement layer without limiting to the enlarged image data or the independent decoding tile of the decoded base layer, and coding for a prediction error etc. is performed. Enhancement-layer coded data obtained by coding is output to the downstream side.

Reference sign 113 is an enhancement-layer image reconfiguring unit. The enhancement-layer image reconfiguring unit 113 generates a reconfigured image of the enhancement layer by using information, for example, a quantization coefficient and a prediction mode, which are generated in the middle of coding by the enhancement-layer coding unit 112. The enhancement-layer image reconfiguring unit 113 holds the reconfigured image to be referenced during coding by the enhancement-layer coding unit 112.

Reference sign 110 is an integration unit that integrates the base-layer coded data generated by the base-layer coding unit 107, the enhancement-layer coded data generated by the enhancement-layer coding unit 112, and the header coded data generated by the header coding unit 114, and generates a bit stream. Reference sign 111 is a terminal that outputs the generated bit stream to the outside.

A coding operation of an image by the image coding device is described below. The coding operation is described with reference to a flowchart in FIGS. 3A and 3B.

In step S301, a user determines the number of hierarchical layers of hierarchical coding by using a hierarchical-layer setting unit (not shown). In this embodiment, with regard to its configuration, the enhancement layer is one hierarchical layer, and hierarchical coding is performed with two hierarchical layers in total.

In step S302, before coding, the tile setting unit 102 determines the number of division of the tiles and the positions of the tiles in a frame, and further determines whether or not coding is performed on a tile in any of the hierarchical layers, as the independent decoding tile. Also, in this embodiment, the tile with the tile number 5 in the enhancement layer is the independent decoding tile, and forms one independent decoding tile set. However, the tile with the tile number 5 in the base layer is not the independent decoding tile. Hence, in this embodiment, the independent-decoding-tile presence flag is 1. In other case, if the independent decoding tile is not included, the independent-decoding-tile presence flag is 0. The size of the image, the number of division of the tiles, and the position of the independent decoding tile are not limited thereto. The independent-decoding-tile presence flag is input to the enhancement-layer tile dividing unit 104, the base-layer tile dividing unit 105, the base-layer independent-decoding-tile judging unit 106, the enhancement-layer independent-decoding-tile judging unit 115, and the header coding unit 114.

In step S303, the header coding unit 114 judges the independent-decoding-tile presence flag. If the independent-decoding-tile presence flag is 1, the process goes to step S304, and if not, the process goes to S305.

In step S304, the header coding unit 114 sets a tile_boundaries_aligned_flag code of vui_parameters, which is tile-position alignment information, at 1.

In step S305, the header coding unit 114 first codes video_parameter_set, which is one of sequence headers. This includes a vps_max_layers_minus1 code, which represents the number of hierarchical layers of hierarchical coding. In this embodiment, the vps_max_layers_minus1 code is 1. Then, Sequence parameter set is coded. Sequence parameter set includes vui_parameters. In this case, vui_parameters includes the tile_boundaries_aligned_flag code set in step S304. These pieces of coded data are input to the integration unit 110, and are output from the terminal 111 as a bit stream.

In step S306, the header coding unit 114 codes Pictureparameter set, which is a picture header. The coded data of the picture header is input to the integration unit 110, and is output from the terminal 111 as a bit stream.

In step S307, the header coding unit 114 judges the independent-decoding-tile presence flag. If the independent-decoding-tile presence flag is 1, the process goes to step S308, and if not, the process goes to S309.

In step S308, since the sequence of the coding subject includes the independent decoding tile, the header coding unit 114 codes motion-constrained_tile_sets_scalability SEI (abbreviated as MCTSS SEI). An example of MCTSS SEI coded data, which is independent decoding tile information, is shown in FIG. 4A. In this embodiment, as described above, the vps_max_layers_minus1 code is 1. The value 0 of a variable k represents the base layer, and the value 1 represents the enhancement layer.

First, when k=0, information of the independent decoding tile in the base layer is coded. Since an included independent decoding tile set is not present, a num_sets_in_message[0] code indicative of the number of independent decoding tile sets is 0. Hence, a successive code is not generated, and k=1 is established. Information of the independent decoding tile in the enhancement layer is coded. Since one included independent decoding tile set is present, the num_sets_in_message[1] code indicative of the number of independent decoding tile sets becomes 1. Then, a mcts_id[1][0] code is set at 0. Since the number of rectangular regions of the independent decoding tiles belonging to the independent decoding tile set is 1, a num_tile_rects_in_set_minus1[1][0] code becomes 0. To express the position of this rectangular region, a combination of the tile number of the upper left tile and the tile number of the lower right tile is used. That is, a top_left_tile_index[1][0][0] code and a bottom_right_tile_index[1][0][0] code represent the position of the independent decoding tile. Herein, since the independent decoding tile is only the tile with the tile number 5, either value is 5. Since NPL 1 describes an exact_sample_value_match_flag code, the description thereof is omitted. These are coded, and coded data of MCTSS SEI is generated. The MCTSS SEI coded data is input to the integration unit 110, and is output from the terminal 111 as a bit stream.

In step S309, the reducing unit 103 reduces the input image, and generates an input image of the base layer. In this embodiment, since the enhancement layer is one hierarchical layer, the reducing unit 103 generates the base layer. However, if the number of hierarchical layers is one or more, the reducing unit 103 may be increased by the number of hierarchical layers, or image data may be generated by the required number of hierarchical layers in the reducing unit 103 in accordance with the number of hierarchical layers input from the tile setting unit 102.

In step S310, the base-layer tile dividing unit 105 extracts the image data of the tile in the base layer, which is successively coded according to the tile number from the upper left of the reduced image data, from the reducing unit 103. The image data of the tile in the base layer extracted by the base-layer tile dividing unit 105 is input to the base-layer coding unit 107. Also, the position information of the tile to be coded, that is, the tile number is output to the base-layer independent-decoding-tile judging unit 106.

In step S311, the base-layer independent-decoding-tile judging unit 106 receives an input of the tile number of the tile serving as the coding subject from the base-layer tile dividing unit 105. Simultaneously, the base-layer independent-decoding-tile judging unit 106 receives an input of the independent-decoding-tile position information of the base layer from the tile setting unit 102. The base-layer independent-decoding-tile judging unit 106 compares the tile number of the tile of the coding subject with the tile number of the base-layer independent-decoding-tile position information. If the tile numbers match, it is judged that the coding subject tile is the independent decoding tile in the base layer, the base-layer independent-decoding-tile coding flag becomes 1, and the process goes to step S312. If the tile numbers do not match, it is judged that the coding subject tile is not the independent decoding tile in the base layer, the base-layer independent-decoding-tile coding flag becomes 0, and the process goes to step S313. In this embodiment, since the independent decoding tile is not present, independent-decoding-tile position information of the base layer is not input. Hence, the base-layer independent-decoding-tile coding flag becomes 0, and the process goes to step S313, In step S312, regarding the coding subject tile, the tile in the base layer is the independent decoding tile. The base-layer coding unit 107 performs inter-frame prediction with reference to the reconfigured image data included in the independent decoding tile set at the relatively equivalent position of the reconfigured image of the base layer, performs prediction with reference to the reconfigured pixels in the tile being coded, and performs coding. In FIG. 2, described below is a case in which the tile number 5 in the frame 202 is the independent decoding tile, and the tile is coded is described. Coding is performed with reference to the reconfigured image data of the coded pixels of the tile with the tile number 5 and the tile with the tile number 6 in the frame 201, and the tile with the tile number 5 in the frame 202 stored in the base-layer image reconfiguring unit 108. The coded data of the tile in the base layer is output to the integration unit 110 as the base-layer coded data. The integration unit 110 integrates the base-layer coded data with the other coded data, and generates a bit stream. The generated bit stream is output from the terminal 111. Further, the base-layer image reconfiguring unit 108 successively generates tile reconfigured image data of the base layer by using a coefficient etc. generated in the middle of coding by the base-layer coding unit 107, and holds the tile reconfigured image data.

In step S313, regarding the coding subject tile, the tile in the base layer is not the independent decoding tile. The base-layer coding unit 107 performs inter-frame prediction for all image data of the reconfigured frame of the base layer as a reference subject, and performs coding. In FIG. 2, when the tile with the tile number 5 in the frame 202 is performed, coding is performed with reference to the coded pixels of all tiles in the frame 201 and the tile with the tile number 5 in the frame 202 stored in the base-layer image reconfiguring unit 108. The generated base-layer coded data is output to the integration unit 110. The integration unit 110 integrates the base-layer coded data with the other coded data, and generates a bit stream. The generated bit stream is output from the terminal 111. Further, the base-layer image reconfiguring unit 108 successively generates tile reconfigured image data of the base layer by using a coefficient etc. generated in the middle of coding by the base-layer coding unit 107, and holds the tile reconfigured image data.

In step S314, the base-layer coding unit 107 judges whether or not coding of all tile data of the base layer is completed. If coding processing on all tile data of the base layer is not completed, the process returns to step S310. The base-layer tile dividing unit 105 extracts and outputs the next tile, and continues the processing. If the coding processing on image data of all tiles in the base layer is completed, the process goes to step S315.

In step S315, the enhancement-layer tile dividing unit 104 extracts the image data of the tile in the enhancement layer, which is coded according to the tile number successively from the upper left of the input image data, which is in the reducing unit 103 and is not reduced. The image data of the tile in the enhancement layer extracted by the enhancement-layer tile dividing unit 104 is input to the enhancement-layer coding unit 112. Also, the position information of the tile to be coded, that is, the tile number is output to the enhancement-layer independent-decoding-tile judging unit 115.

In step S316, the enhancement-layer independent-decoding-tile judging unit 115 receives an input of the tile number of the tile as the coding subject from the enhancement-layer tile dividing unit 104. Simultaneously, the enhancement-layer independent-decoding-tile judging unit 115 receives an input of the independent-decoding-tile position information of the enhancement layer from the tile setting unit 102. In this embodiment, the independent-decoding-tile position information is 5. The enhancement-layer independent-decoding-tile judging unit 115 compares the tile number of the tile of the coding subject with the tile number of the enhancement-layer independent-decoding-tile position information. If the tile numbers match, it is judged that the coding subject tile is the independent decoding tile in the enhancement layer, the enhancement-layer independent-decoding-tile coding flag becomes 1, and the process goes to step S317. If the tile numbers do not match, it is judged that the coding subject tile is not the independent decoding tile, the enhancement-layer independent-decoding-tile coding flag becomes 0, and the process goes to step S319. In this embodiment, since the tile with the tile number 5 in the enhancement layer is the independent decoding tile, the process goes to step S317, and otherwise, the process goes to step S319.

In step S317, the tile of the coding subject is the independent decoding tile in the enhancement layer. The enlarging unit 109 receives an input of the reconfigured image data of the tile at the relatively equivalent position from the reconfigured image data of the base layer stored in the base-layer image reconfiguring unit 108. The enlarging unit 109 performs enlarging by, for example, filtering, by using the reconfigured image data of the tile at the relatively equivalent position from the input reconfigured image data of the base layer, and generates enlarged image data. To be specific, enlarging is performed by using the image data of the tile with the tile number 5 in the frame 202 in FIG. 2 and the image data of its periphery. The enlarged image data is input to the enhancement-layer coding unit 112.

In step S318, the enhancement-layer coding unit 112 codes the image data of the tile of the coding subject input from the enhancement-layer tile dividing unit 104 with reference to the reconfigured image data. That is, the enhancement-layer coding unit 112 performs inter-layer prediction with reference to the enlarged image data generated in step S317. Also, the enhancement-layer coding unit 112 performs interlayer prediction with reference to the reconfigured image data of the independent decoding tile set at the relatively equivalent position of the reconfigured enhancement layer stored in the enhancement-layer image reconfiguring unit 113. Further, the enhancement-layer coding unit 112 performs intra-prediction with reference to the coded reconfigured image data in the tile of the coding subject tile. The enhancement-layer coding unit 112 codes information relating to prediction of a motion vector etc. and a prediction error obtained by the above-described prediction and inter-frame prediction. Further, the enhancement-layer image reconfiguring unit 113 successively generates tile reconfigured image data of the enhancement layer by using a coefficient etc. generated in the middle of coding by the enhancement-layer coding unit 112, and holds the tile reconfigured image data.

In step S319, the tile of the coding subject is not the independent decoding tile in the enhancement layer. The enlarging unit 109 performs enlarging by, for example, filtering, by using the entire reconfigured image data of the base layer stored in the base-layer image reconfiguring unit 108, and generates enlarged image data. The enlarged image data is input to the enhancement-layer coding unit 112.

In step S320, the enhancement-layer coding unit 112 codes the image data of the tile of the coding subject input from the enhancement-layer tile dividing unit 104 with reference to the coded image data. That is, the enhancement-layer coding unit 112 performs inter-layer prediction with reference to the enlarged image data generated in step S319. Also, the enhancement-layer coding unit 112 performs inter-frame prediction with reference to the reconfigured image data of the reconfigured enhancement layer stored in the enhancement-layer image reconfiguring unit 113. Further, the enhancement-layer coding unit 112 performs intra-prediction with reference to the coded reconfigured image data in the tile of the coding subject tile. The enhancement-layer coding unit 112 codes information relating to prediction of a motion vector etc, and a prediction error obtained by the above-described prediction and inter-frame prediction. Further, the enhancement-layer image reconfiguring unit 113 successively generates tile reconfigured image data of the enhancement layer by using a coefficient etc. generated in the middle of coding by the enhancement-layer coding unit 112, and holds the tile reconfigured image data.

In step S321, the enhancement-layer coding unit 112 judges whether or not coding of all tile data of the enhancement layer is completed. If the coding processing on all tile data of the enhancement layer is not completed, the process returns to step S315. The enhancement-layer tile dividing unit 104 extracts and outputs the next tile, and continues the processing. If the coding processing on image data of all tiles in the enhancement layer is completed, the process goes to step S322.

In step S322, the integration unit 110 judges whether or not the coding processing of image data for all frames included in the sequence input from the terminal 101 is completed. If a frame before the coding processing is present, the process goes to step S309, and performs the processing on the next frame. If a frame before the coding processing is not present, the coding processing is ended.

With the above-described configuration, the independent decoding tile set can be individually set in each hierarchical layer. Accordingly, the independent decoding tile and the independent decoding tile set can be set in the middle of the hierarchical layers. Also, an increase in code amount of the base layer can be restricted. In addition, for a certain hierarchical layer or higher, by applying a limitation to a reference image relating to a code, coded data in which the portion can be decoded at high speed can be generated.

Also, an interest region or the like may be changed from the enhancement layer to the independent decoding tile set, and in the hierarchical layer in which the independent decoding tile set is present, the boundaries of the tiles may be aligned. Accordingly, the independent decoding tile set can be independently coded without reference to other tile in the enhancement layer with a large code amount and a high decoding cost. Hence, high-speed processing can be performed on a required portion.

In this embodiment, as shown in FIG. 2, the example is given in which coding is performed while only a temporarily previous frame serves as a reference frame. However, it is not limited thereto. Even in a case of coding with reference to a plurality of frames, reference is similarly made as it is understood from the above description.

Also, the reducing unit 103 or the enlarging unit 109 may not be used, or a reduction ratio or an enlargement ratio may be 1, so that a quantization parameter set by the enhancement-layer coding unit 112 is smaller than a quantization parameter set by the base-layer coding unit 107. Accordingly, SNR hierarchical coding can be performed.

Also, in this embodiment, the enlarged image data, which is referenced by the enhancement layer of the tile in the independent decoding tile set, is generated only by using the image data of the tile in the base layer at the relatively equivalent position. However, it is not limited thereto. Like step S319, image data of the periphery of the independent decoding tile of the base layer may be referenced.

Also, the example is described, in which the base layer and the single enhancement layer are provided. However, it is not limited thereto. The reducing unit 103, the enhancement-layer tile dividing unit 104, the enhancement-layer coding unit 112, the enhancement-layer image reconfiguring unit 113, and the enlarging unit 109 may form a set. By additionally providing the sets by the number of hierarchical layers, a large number of hierarchical layers can be handled.

Also, since the enhancement-layer coding unit 112, the enhancement-layer image reconfiguring unit 113, the enlarging unit 109, and the reducing unit 103 have the same internal processing, these units may be integrated and may perform coding of each enhancement layer. For example, if the number of hierarchical layers is three, in FIG. 2, the frame 203 represents a frame obtained by enlarging the decoded image data of the frame 201 to have a resolution of an enhancement first hierarchical layer. The frame 209 represents a frame of an enhancement second hierarchical layer at the time t. The frame 207 represents a frame in which decoded image data of the frame 205 is enlarged to have a resolution of the enhancement second hierarchical layer. The frame 202 represents a frame of the base layer at a time t+delta. The frame 206 represents a frame of the enhancement first hierarchical layer at the time t+delta. The frame 204 represents a frame obtained by enlarging the decoded image data of the frame 202 to have the resolution of the enhancement first hierarchical layer. The frame 210 represents a frame of the enhancement second hierarchical layer at the time t+delta. The frame 208 represents a frame obtained by enlarging the decoded image data of the frame 206 to have the resolution of the enhancement second hierarchical layer. Hereinafter, hierarchical coding with three hierarchical layers is described. Regarding the enhancement first hierarchical layer, as described above, the tile with the tile number 5 is the enhancement-layer independent decoding tile, and the tiles with the tile number 5 in the frame 205 and the frame 206 are the enhancement-layer independent decoding tiles indicated by thick lines. Also, regarding the enhancement second hierarchical layer, the tile with the tile number 5 and the tile with the tile number 6 are the enhancement-layer independent decoding tiles, and the enhancement-layer independent decoding tile set is formed for each of the enhancement-layer independent decoding tiles. The tiles with the tile number 5 and the tiles with the tile number 6 in the frame 209 and the frame 210 form the enhancement-layer independent decoding tile set indicated by the thick lines.

FIG. 5 shows a block diagram of a coding device in this case. In FIG. 5, the same number is applied to a unit that has the same function as that in the block of the image coding device in FIG. 1, and the description thereof is omitted. Reference sign 501 is a hierarchical-layer-number setting unit that sets the number of hierarchical layers. Reference sign 502 is a tile setting unit. The tile setting unit 502 differs from the tile setting unit 102 in FIG. 1 in that the number of hierarchical layers is three, and an independent decoding tile is set in each of the base layer, the enhancement first hierarchical layer, and the enhancement second hierarchical layer. Reference sign 503 is a reducing unit. The reducing unit 503 differs from the reducing unit 103 in FIG. 1 in that the reducing unit 503 receives an input of the number of hierarchical layers to be generated from the hierarchical-layer-number setting unit 501, and generates a plurality of hierarchical images by reducing, i.e., generates a plurality of pieces of reduced image data. Reference sign 506 is a frame memory that stores the reduced image data of each hierarchical layer generated by the reducing unit 503. Reference sign 504 is an enhancement-layer tile dividing unit. The enhancement-layer tile dividing unit 504 differs from the enhancement-layer tile dividing unit 104 in FIG. 1 in that the enhancement-layer tile dividing unit 504 receives an input of the number of hierarchical layers from the hierarchical-layer-number setting unit 501, and recognizes the hierarchical layer to be processed. Reference sign 509 is an enlarging unit. The enlarging unit 509 differs from the enlarging unit 109 in FIG. 1 in that the enlarging unit 509 receives an input of the number of hierarchical layers to be generated from the hierarchical-layer-number setting unit 501, and generates enlarged image data of the hierarchical layers with a plurality of different resolutions by enlarging. Reference sign 513 is an enhancement-layer image reconfiguring unit. The enhancement-layer image reconfiguring unit 513 differs from the enhancement-layer image reconfiguring unit 113 in FIG. 1 in that the enhancement-layer image reconfiguring unit 513 receives an input of the number of hierarchical layers to be generated from the hierarchical-layer-number setting unit 501, and the enlarging unit 509 is added as the output target. Reference sign 510 is an integration unit that differs from the integration unit 110 in FIG. 1 in that the integration unit 510 receives an input of the number of hierarchical layers from the hierarchical-layer-number setting unit 501, and integrates coded data for the number of hierarchical layers to a bit stream. Reference sign 515 is an enhancement-layer independent-decoding-tile judging unit. The enhancement-layer independent-decoding-tile judging (determination) unit 515 differs from the enhancement-layer independent-decoding-tile judging unit 115 in FIG. 1 in that the enhancement-layer independent-decoding-tile judging unit 515 can handle up to the enhancement second hierarchical layer, and compares the independent decoding tile information of the enhancement first hierarchical layer and the enhancement second hierarchical layer with the tile position information input for each of the hierarchical layers.

FIGS. 7A and 7B show a coding method in this case. In the same drawing, the same number as that in FIGS. 3A and 3B is applied to a step that has the same function as that in FIGS. 3A and 3B, and the description thereof is omitted.

In step S701, the hierarchical-layer-number setting unit 501 sets the number of hierarchical layers. In this case, the number of hierarchical layers is three. Unlike step S301 in FIG. 3A, the number of hierarchical layers can be desirably set. Also, in step S305, the vps_max_layers_minus1 code is set at 2 and header coded data is generated.

In step S708, since the sequence of the coding subject includes the independent decoding tile in one of the hierarchical layers, the header coding unit 114 codes MCTSS SEI. The MCTSS SEI coded data has the configuration shown in FIG. 4A. In this embodiment, as described above, the vps_max_layers_minus1 code is 2. The value 0 of the variable k represents the base layer, the value 1 represents the enhancement first hierarchical layer, and the value 2 represents the enhancement second hierarchical layer.

First, when k=0, information of the independent decoding tile in the base layer is coded. Since no independent decoding tile set is included, the num_sets_in_message[0] code indicative of the number of independent decoding tile sets is 0. Hence, a successive code is not generated.

Then, k=1 is established, and information of the independent decoding tile in the enhancement layer (enhancement first hierarchical layer) is coded. Since one independent decoding tile set is included, the num_sets_in_message[1] code indicative of the number of independent decoding tile sets becomes 1. Then, the mcts_id[1] code is set at 0. Since the number of independent decoding tiles belonging to the independent decoding tile set of the enhancement layer (enhancement first hierarchical layer) is 1, the num_tile_rects_in_set_minus1[1][0] code becomes 0. The top_left_tile_index[1][0][0] code and the bottom_right_tile_index[1][0][0] code represent the position of the independent decoding tile. In this embodiment, since the independent decoding tile of the enhancement layer (enhancement first hierarchical layer) is only the tile with the tile number 5, either value is 5.

Finally, when k=2 (enhancement second hierarchical layer), the information of the independent decoding tile of the enhancement layer (enhancement second hierarchical layer) is coded. Since two independent decoding tile sets are included, the num_sets_in_message[2] code indicative of the member of independent decoding tile sets of the enhancement layer (enhancement second hierarchical layer) becomes 2. Then, the independent decoding tile set with the tile number 5 is coded. Then, the mcts_id[2] [0] code is set at 0. Since the number of rectangular regions of independent decoding tiles belonging to the independent decoding tile set including the tile with the tile number 5 of the enhancement layer (enhancement second hierarchical layer) is 1, the num_tile_rects_m_set_minus1[2][0] code becomes 0. Both the top_left_tile_index[2][0][0] code and the bottom_right_tile_index[2][0][0] code become 5. Further, the independent decoding tile set with the tile number 6 is coded. The mcts_id[2][1] code is 1 to distinguish the independent decoding tile set with the tile number 6 from the independent decoding tile set with the tile number 5. Since the number of rectangular regions of independent decoding tiles belonging to the independent decoding tile set including the tiles with the tile number 6 of the enhancement layer (enhancement second hierarchical layer) is 1, the num_tile_rects_in_set_minus1[2][1] code becomes 0. Both the top_left_tile_index[2][1][0] code and the bottom_right_tile_index[2][1][0] code become 6.

Since NPL 1 describes the exact_sample_value_match_flag code, the description thereof is omitted. These are coded, and coded data of MCTSS SEI is generated. The MCTSS SEI coded data is input to the integration unit 110, and is output from the terminal 111 as a bit stream.

In step S709, the reducing unit 503 generates reduced image data by the number of hierarchical layers of one frame. In this embodiment, the two enhancement layers set in step S701 are generated. For example, enhancement first-hierarchical-layer image data is obtained by halving the length and width of the input image, and image data of the base layer is further generated by halving the length and width of the enhancement first-hierarchical-layer image data. At this time, the image with the input resolution is output to the frame memory 506 without being changed, as enhancement second-hierarchical-layer image data.

In step S310 to step S314, as described above, the base-layer coding unit 107 codes the image data of the base layer output from the frame memory 506. The base-layer image reconfiguring unit 108 reconfigures a decoded image of an image, which has been coded. The base-layer image reconfiguring unit 108 holds the reconfigured image.

In step S730, the hierarchical-layer-number setting unit 501 sets the base layer coded in step S312 or step S313 or the enhancement layer of the hierarchical layer coded in step S719, step S721, or step S723 (described later), as a higher layer. Further, the hierarchical-layer-number setting unit 501 sets the successive enhancement layer of the coding subject, as a lower layer. First, the base layer coded in step S312 or step S313 is set as the higher layer, and the enhancement first hierarchical layer is set as the lower layer.

In step S715, the enhancement-layer tile dividing unit 104 extracts image data of the tile in the lower layer to be coded in accordance with the tile number in the order from the upper left of the image data of the lower layer of the coding subject. The image data of the tile in the lower layer extracted by the enhancement-layer tile dividing unit 104 is input to the enhancement-layer coding unit 112. At this time, the image data of the tile to be coded of the image data of the enhancement first hierarchical layer image is extracted as the coding subject of the lower layer, and the extracted image data is input to the enhancement-layer coding unit 112.

In step S716, the enhancement-layer independent-decoding-tile judging unit 115 receives an input of the tile number of the lower layer (enhancement first hierarchical layer) of the tile as the coding subject from the enhancement-layer tile dividing unit 104. Simultaneously, the enhancement-layer independent-decoding-tile judging unit 115 receives an input of the independent-decoding-tile position information of the lower layer (enhancement first hierarchical layer) from the tile setting unit 102. In this embodiment, the independent-decoding-tile position information is 5. The enhancement-layer independent-decoding-tile judging unit 115 compares the tile number of the tile of the coding subject with the tile number of the independent-decoding-tile position information of the higher layer (base layer). If the tile numbers match, it is judged that the coding subject tile is the independent decoding tile in the lower layer (enhancement first hierarchical layer), the enhancement-layer independent-decoding-tile coding flag becomes 1, and the process goes to step S717. If the tile numbers do not match, it is judged that the coding subject tile is not the independent decoding tile, the independent-decoding-tile coding flag of the lower layer (enhancement first hierarchical layer) becomes 0, and the process goes to step S720. In this embodiment, since the tile with the tile number 5 in the enhancement layer is the independent decoding tile, the process goes to step S717, and otherwise, the process goes to step S720.

In step S717, the enlarging unit 509 judges whether or not the block in the higher layer (base layer) at the relatively equivalent position to the tile of the coding subject in the lower layer (enhancement first hierarchical layer) of the coding subject is the independent decoding tile. Hence, independent-decoding-tile position information of the higher layer (base layer) fed from the tile setting unit 502 is compared with the position of the coding subject tile in the lower layer (enhancement first hierarchical layer). If the tile numbers match and it is judged that the tile in the higher layer (base layer) at the relatively equivalent position to the coding subject tile is the independent decoding tile, the process goes to S718, and if not, the process goes to step S720. As shown in FIG. 2, in this embodiment, since the tile with the tile number 5 in the higher layer (base layer) is not the independent decoding tile, the process goes to step S720.

In step S718, the tile of the coding subject in the lower layer (enhancement first hierarchical layer) is the independent decoding tile, and the tile of the coding subject in the higher layer (base layer) is the independent decoding tile. The enlarging unit 509 receives an input of reconfigured image data of the tile at the relatively equivalent position from the reconfigured image data of the higher layer (base layer) stored in the base-layer image reconfiguring unit 108 or the enhancement-layer image reconfiguring unit 513. The enlarging unit 509 performs enlarging by, for example, filtering, by using only the reconfigured image data of the input independent decoding tile set, and generates enlarged image data. The enlarged image data is input to the enhancement-layer coding unit 112. In this case, the enlarged image data is generated from the reconfigured image data of the base-layer image reconfiguring unit 108. To be specific, if the tile with the tile number 5 in the frame 202 in FIG. 2 is the independent decoding tile, enlarging is performed by using only the image data of the tile with the tile number 5 in the frame 202. The generated enlarged image data (enlarged image data of the tile with the tile number 5 in the frame 204) is input to the enhancement-layer coding unit 112.

In step S719, the enhancement-layer coding unit 112 codes the image data of the tile in the lower layer (enhancement first hierarchical layer) of the coding subject input from the enhancement-layer tile dividing unit 104 with reference to the reconfigured image data. That is, the enhancement-layer coding unit 112 performs inter-layer prediction with reference to the enlarged image data of the higher layer (base layer) generated in step S718. Also, the enhancement-layer coding unit 112 performs inter-frame prediction with reference to the image data of the independent decoding tile set at the relatively equivalent position in the reconfigured lower layer (enhancement first hierarchical layer) stored in the enhancement-layer image reconfiguring unit 513. Further, the enhancement-layer coding unit 112 performs intra-prediction with reference to the coded reconfigured image data in the tile of the coding subject tile. The enhancement-layer coding unit 112 codes information relating to prediction of a motion vector etc. and a prediction error obtained by the above-described prediction and inter-frame prediction. Further, the enhancement-layer image reconfiguring unit 513 successively generates tile reconfigured image data of the enhancement layer by using a coefficient etc. generated in the middle of coding by the enhancement-layer coding unit 112, and holds the tile reconfigured image data.

In step S720, the tile of the coding subject in the lower layer is the independent decoding tile, whereas the tile of the coding subject in the higher layer is not the independent decoding tile. The enlarging unit 509 performs enlarging by, for example, filtering, by using the reconfigured image data of the base layer stored in the base-layer image reconfiguring unit 108 or the reconfigured image data of the higher layer stored in the enhancement-layer image reconfiguring unit 513, and generates enlarged image data. The enlarged image data is input to the enhancement-layer coding unit 112. In this case, since the higher layer is the base layer, enlarged image data of the higher layer is generated from the reconfigured image data of the base-layer image reconfiguring unit 108. To be specific, enlarging is performed by using the image data of the tile with the tile number 5 in the frame 202 in FIG. 2 and the image data of its periphery.

In step S721, the enhancement-layer coding unit 112 codes the image data of the tile in the lower layer (enhancement first hierarchical layer) of the coding subject input from the enhancement-layer tile dividing unit 104 with reference to the coded image data of the lower layer (enhancement first hierarchical layer). That is, the enhancement-layer coding unit 112 performs inter-layer prediction with reference to the enlarged image data of the higher layer (base layer) generated in step S720. Also, the enhancement-layer coding unit 112 performs inter-frame prediction with reference to the reconfigured image data of the lower layer (enhancement first hierarchical layer) stored in the enhancement-layer image reconfiguring unit 513. Further, the enhancement-layer coding unit 112 performs intra-prediction with reference to the coded reconfigured image data in the tile of the coding subject tile in the lower layer (enhancement first hierarchical layer). The enhancement-layer coding unit 112 codes information relating to prediction of a motion vector etc. and a prediction error obtained by the above-described prediction and inter-frame prediction. Further, the enhancement-layer image reconfiguring unit 513 successively generates tile reconfigured image data of the lower layer (enhancement first hierarchical layer) by using a coefficient etc. generated in the middle of coding by the enhancement-layer coding unit 112, and holds the tile reconfigured image data.

In step S722, the tile of the coding subject in the lower layer (enhancement first hierarchical layer) is not the independent decoding tile. The enlarging unit 509 performs enlarging by using the entire reconfigured image data of the base layer stored in the base-layer image reconfiguring unit 108 or the reconfigured image data of the higher enhancement layer stored in the enhancement-layer image reconfiguring unit 513, and generates enlarged image data. The enlarged image data is input to the enhancement-layer coding unit 112. In this case, since the higher layer is the base layer, enlarged image data of the higher layer is generated from the reconfigured image data of the base-layer image reconfiguring unit 108.

In step S723, the enhancement-layer coding unit 112 codes the image data of the tile in the lower layer (enhancement first hierarchical layer) of the coding subject input from the enhancement-layer tile dividing unit 104 with reference to the coded image data of the lower layer (enhancement first hierarchical layer). That is, the enhancement-layer coding unit 112 performs inter-layer prediction with reference to the enlarged image data of the higher layer (base layer) generated in step S722. Also, the enhancement-layer coding unit 112 performs inter-frame prediction with reference to the reconfigured image data of the lower layer (enhancement first hierarchical layer) stored in the enhancement-layer image reconfiguring unit 113. Further, the enhancement-layer coding unit 112 performs intra-prediction with reference to the coded reconfigured image data in the tile of the coding subject tile in the lower layer (enhancement first hierarchical layer). The enhancement-layer coding unit 112 codes information relating to prediction of a motion vector etc. and a prediction error obtained by the above-described prediction and inter-frame prediction. Further, the enhancement-layer image reconfiguring unit 513 successively generates tile reconfigured image data of the lower layer (enhancement first hierarchical layer) by using a coefficient etc. generated in the middle of coding by the enhancement-layer coding unit 112, and holds the tile reconfigured image data.

In step S724, the integration unit 510 judges whether or not coding is completed for all hierarchical layers set in the hierarchical-layer-number setting unit 501. If the coding processing on tile data for all hierarchical layers is not completed, the process returns to step S730, in which the hierarchical-layer-number setting unit 501 sets the next hierarchical layer as the lower layer, and the processing is continued. If the coding processing on the image data of all tiles in the enhancement layer is completed, the process goes to step S725. In this case, since coding of the enhancement second hierarchical layer is not completed, the process returns to step S730.

In step S725, the integration unit 510 judges whether or not the coding processing of image data for all frames included in the sequence input from the terminal 101 is completed. If a frame before the coding processing is present, the process goes to step S709, and performs the processing on the next frame. If a frame before the coding processing is not present, the coding processing is ended.

Hereinafter, coding of the enhancement second hierarchical layer is performed. That is, in step S730, the hierarchical-layer-number setting unit 501 sets the enhancement first hierarchical layer coded in step S719 or step S721 as the higher layer, and sets the enhancement second hierarchical layer as the lower layer. In step S715, the enhancement-layer tile dividing unit 104 extracts image data of a tile to be coded of the image data of the lower layer (enhancement second hierarchical layer), and inputs the extracted image data to the enhancement-layer coding unit 112. It is to be noted that the tile with the tile number 6 newly becomes the independent decoding tile from the enhancement second hierarchical layer, and forms the independent decoding tile set together with the tile with the tile number 5. The image data of the tile with the tile number 5 in the lower layer (enhancement second hierarchical layer) is input first.

In step S716, the enhancement-layer independent-decoding-tile judging unit 115 receives an input of the tile number of the lower layer (enhancement second hierarchical layer) of the tile as the coding subject from the enhancement-layer tile dividing unit 104. Simultaneously, the enhancement-layer independent-decoding-tile judging unit 115 receives an input of the independent-decoding-tile position information of the lower layer (enhancement second hierarchical layer) from the tile setting unit 102. In this case, the independent-decoding-tile position information is 5. The enhancement-layer independent-decoding-tile judging unit 115 compares the tile number of the tile of the coding subject with the tile number of the independent-decoding-tile position information of the higher layer (enhancement first hierarchical layer). If the tile numbers match, it is judged that the coding subject tile is the independent decoding tile in the lower layer (enhancement second hierarchical layer), the enhancement-layer independent-decoding-tile coding flag becomes 1, and the process goes to step S717. If the tile numbers do not match, it is judged that the coding subject tile is not the independent decoding tile, the enhancement-layer independent-decoding-tile coding flag of the lower layer (enhancement second hierarchical layer) becomes 0, and the process goes to step S720. Regarding the tile with the tile number 5 in the enhancement second hierarchical layer, since the tile with the tile number 5 in the enhancement layer is the independent decoding tile, the process goes to step S717, and otherwise, the process goes to step S720.

In step S717, the enlarging unit 509 judges whether or not a block in the higher layer (enhancement first hierarchical layer) at the relatively equivalent position to the tile of the coding subject in the lower layer (enhancement second hierarchical layer) of the coding subject is the independent decoding tile. Hence, the independent-decoding-tile position information of the higher layer (enhancement first hierarchical layer) fed from the tile setting unit 502 is compared with the position of the coding subject tile in the lower layer (enhancement second hierarchical layer). If the tile numbers match and it is judged that the tile in the higher layer (enhancement first hierarchical layer) at the relatively equivalent position to the coding subject tile is the independent decoding tile, the process goes to S718, and if not, the process goes to step S720. As shown in FIG. 2, regarding the tile with the tile number 5 in the enhancement second hierarchical layer, the tile with the tile number 5 in the higher layer (enhancement first hierarchical layer) is the independent decoding tile, the process goes to step S718.

In step S718, the tile of the coding subject in the lower layer (enhancement second hierarchical layer) is the independent decoding tile, and the tile of the coding subject in the higher layer (enhancement first hierarchical layer) is the independent decoding tile. The enlarging unit 509 receives an input of the reconfigured image data of the tile at the relatively equivalent position from the reconfigured image data of the higher layer (enhancement first hierarchical layer) stored in the enhancement-layer image reconfiguring unit 513. The enlarging unit 509 performs enlarging by, for example, filtering, by using only the input reconfigured image data of the independent decoding tile set in the higher layer (enhancement first hierarchical layer), and generates enlarged image data of the higher layer (enhancement first hierarchical layer). It is to be noted that as long as adjacent tiles are independent decoding tiles of the same independent decoding tile set, enlarging may be performed by using reconfigured image data of the adjacent independent decoding tile. The enlarged image data of the higher layer (enhancement first hierarchical layer) is input to the enhancement-layer coding unit 112. The tile with the tile number 5 in the enhancement second hierarchical layer is the tile with the tile number 5 in the frame 210 in FIG. 2. Regarding the tile with the tile number 5 in the frame 210, since the tile with the tile number 5 in the frame 208 is the independent decoding tile, an enlarged image is generated by using only the reconfigured image data of the tile with the tile number 5 in the frame 208.

In step S719, the enhancement-layer coding unit 112 codes the image data of the tile in the lower layer (enhancement second hierarchical layer) of the coding subject input from the enhancement-layer tile dividing unit 104. For coding, the enlarged image data of the higher layer (enhancement first hierarchical layer) and the reconfigured image data of the lower layer (enhancement second hierarchical layer) are referenced. That is, the enhancement-layer coding unit 112 performs inter-layer prediction with reference to the enlarged image data of the higher layer (enhancement first hierarchical layer) generated in step S718. Also, the enhancement-layer coding unit 112 performs inter-frame prediction with reference to the reconfigured image data of the independent decoding tile set at the relatively equivalent position in the lower layer (enhancement second hierarchical layer) stored in the enhancement-layer image reconfiguring unit 513. Further, the enhancement-layer coding unit 112 performs intra-prediction with reference to the coded reconfigured image data of the lower layer (enhancement second hierarchical layer) in the tile of the coding subject tile. The enhancement-layer coding unit 112 codes information relating to prediction of a motion vector etc. and a prediction error obtained by the above-described prediction. Further, the enhancement-layer image reconfiguring unit 513 successively generates tile reconfigured image data of the lower layer (enhancement second hierarchical layer) by using a coefficient etc. generated in the middle of coding by the enhancement-layer coding unit 112, and holds the tile reconfigured image data. A state of reference for coding is described with reference to FIG. 2. The tile with the tile number 5 in the frame 210 references the enlarged image of the tile with the tile number 5 in the frame 208, the reconfigured image data of the tile with the tile number 5 of the independent decoding tile set in the frame 209, and the reconfigured image data of the tile with the tile number 5 in the frame 210.

In step S321, since coding of the tile with the tile number 6 is not performed, the process goes to step S715. In step S715, the enhancement-layer tile dividing unit 104 extracts image data of the tile to be coded with the tile number 6 in the frame 210 in FIG. 2 of the image data of the lower layer (enhancement second hierarchical layer), and inputs the extracted image data to the enhancement-layer coding unit 112.

In step S716, the enhancement-layer independent-decoding-tile judging unit 115 receives an input of the tile number of the lower layer (enhancement second hierarchical layer) of the tile as the coding subject from the enhancement-layer tile dividing unit 104. Simultaneously, the enhancement-layer independent-decoding-tile judging unit 115 receives an input of the independent-decoding-tile position information of the lower layer (enhancement second hierarchical layer) from, the tile setting unit 102. In this case, the independent-decoding-tile position information is 6. The enhancement-layer independent-decoding-tile judging unit 115 compares the tile number of the tile of the coding subject with the tile number of the independent-decoding-tile position information of the higher layer (enhancement first hierarchical layer). Since the tile with the tile number 6 is not the independent decoding tile in the lower layer (enhancement second hierarchical layer), the process goes to step S720.

In step S720, the tile (tile number 6) of the coding subject in the lower layer (enhancement second hierarchical layer) is the independent decoding tile, however the tile of the coding subject in the higher layer (enhancement first hierarchical layer) is not the independent decoding tile. The enlarging unit 509 performs enlarging by, for example, filtering, by using the reconfigured image data of the higher layer (enhancement first hierarchical layer) stored in the enhancement-layer image reconfiguring unit 513, and generates enlarged image data. The reconfigured image data of the higher layer (enhancement first hierarchical layer) also uses a pixel in the periphery of the tile with the tile number 6 required for enlarging tile data. The enlarged image data is input to the enhancement-layer coding unit 112. To be specific, enlarging is performed by using the image data of the tile with the tile number 6 in the frame 206 in FIG. 2 and the image data of its periphery.

In step S721, the enhancement-layer coding unit 112 codes the image data of the tile in the lower layer (enhancement second hierarchical layer) of the coding subject input from the enhancement-layer tile dividing unit 104. For coding, the enlarged image data of the higher layer (enhancement first hierarchical layer) and the coded image data of the lower layer (enhancement second hierarchical layer) are referenced. That is, the enhancement-layer coding unit 112 performs inter-layer prediction with reference to the enlarged image data of the higher layer (enhancement first hierarchical layer) generated in step S720. Also, the enhancement-layer coding unit 112 performs inter-frame prediction with reference to the reconfigured image data of the lower layer (enhancement second hierarchical layer) stored in the enhancement-layer image reconfiguring unit 513. Further, the enhancement-layer coding unit 112 performs intra-prediction with reference to the coded reconfigured image data in the tile with the tile number 6 in the tile of the coding subject tile in the lower layer (enhancement second hierarchical layer). The enhancement-layer coding unit 112 codes information relating to prediction of a motion vector etc. and a prediction error obtained by the above-described prediction. Further, the enhancement-layer image reconfiguring unit 513 successively generates tile reconfigured image data of the lower layer (enhancement second hierarchical layer) by using a coefficient etc. generated in the middle of coding by the enhancement-layer coding unit 112, and holds the tile reconfigured image data. A state of reference for coding is described with reference to FIG. 2. The tile with the tile number 5 in the frame 210 references the enlarged image of the tile with the tile number 5 in the frame 208, the reconfigured image data of the tile with the tile number 5 of the independent decoding tile set in the frame 209, and the reconfigured image data of the tile with the tile number 5 in the frame 210.

In step S722, the tile (tile number 6) of the coding subject in the lower layer (enhancement second hierarchical layer) is not the independent decoding tile. The enlarging unit 509 performs enlarging by, for example, filtering, by using the reconfigured image data of the higher enhancement layer (enhancement first hierarchical layer) stored in the enhancement-layer image reconfiguring unit 513, and generates enlarged image data. The enlarged image data is input to the enhancement-layer coding unit 112.

In step S723, the enhancement-layer coding unit 112 codes the image data of the tile in the lower layer (enhancement second hierarchical layer) of the coding subject input from the enhancement-layer tile dividing unit 104. That is, the enhancement-layer coding unit 112 performs inter-layer prediction with reference to the enlarged image data of the higher layer (enhancement first hierarchical layer) generated in step S722. Also, the enhancement-layer coding unit 112 performs inter-frame prediction with reference to the reconfigured image data of the lower layer (enhancement second hierarchical layer) stored in the enhancement-layer image reconfiguring unit 413. Further, the enhancement-layer coding unit 112 performs intra-prediction with reference to the coded reconfigured image data in the tile of the coding subject tile in the lower layer (enhancement second hierarchical layer). The enhancement-layer coding unit 112 codes information relating to prediction of a motion vector etc. and a prediction error obtained by the above-described prediction and inter-frame prediction. Further, the enhancement-layer image reconfiguring unit 513 successively generates tile reconfigured image data of the lower layer (enhancement second hierarchical layer) by using a coefficient etc. generated in the middle of coding by the enhancement-layer coding unit 112, and holds the tile reconfigured image data.

In step S724, the integration unit 510 judges whether or not coding is completed for all hierarchical layers set in the hierarchical-layer-number setting unit 501. In this case, since coding of the enhancement second hierarchical layer is completed, the process goes to step S725. In step S724, if coding of all frames is completed, the coding processing is ended.

With the above-described operation, even in enhancement layers with a plurality of hierarchical layers, the independent decoding tile set can be individually set in each hierarchical layer.

Also, if MCTSS SEI is present in a bit stream, the tile_boundaries_aligned_flag code of vui_parameters, which is the tile-position alignment information, is always set at 1. Hence, regarding vui_parameters, if MCTSS SEI is present in a bit stream, the tile_boundaries_aligned_flag code may be omitted. If MCTSS SEI is not present, the tile_boundaries_aligned_flag code is coded, and the coded data is included in the bit stream. If MCTSS SEI is present, the tile_boundaries_aligned_flag code is not coded, and the value of 1 is always set at the decoding side. In this way, the tile_boundaries_aligned_flag code being redundant may be omitted.

Also, if MCTSS SEI is present in a bit stream, the tile_boundaries_aligned_flag code of vui_parameters, which is the tile-position alignment information, is always set at 1. However, alignment of the boundaries of tiles may be applied to only a layer in which the independent decoding tile is present. For example, in FIG. 2, the base layer may be divided into two tiles. That is, the tile numbers 0, 1, 4, 5, 8, and 9 of each of the frames 201 and 202 may form one new tile, and the tile number may be 0. Also, the tile numbers 2, 3, 6, 7, 10, and 11 may form one new tile, and the tile number may be 1. However, since the independent decoding tile is present in the enhancement first hierarchical layer or higher, in a hierarchical layer lower than the enhancement first hierarchical layer, the tile boundary has to be aligned with the boundary of the frame 205. Accordingly, desirable tile division can be provided in a higher layer with a low resolution.

In hierarchical coding, by extracting an important region and performing coding so that the independent decoding tile set is applied to the portion, coded data, from which the important region can be read at high speed, can be generated.

While the reducing unit 103 can generate reduced image data by, for example, filtering, regardless of the boundary of a tile, the reducing method may be properly-changed for the independent decoding tile and the other tile. For example, since image data outside the independent decoding tile is not used during enlarging, the file size is properly changed, or image data outside the tile is compensated by image data in the tile. Even during reducing, when pixels outside the independent decoding tile set are used at an end portion, the change in filter size and the image data compensation can be performed similarly to during enlarging. Accordingly, the image quality can be prevented from being deteriorated because of mismatch of the reducing method and the enlarging method.

Also, MCTSS SEI coded data is not limited to the configuration in FIG. 4A. For example, a configuration shown in FIG. 4B may be employed. The case with the three hierarchical layers is described. That is, the vps_max_layers_minus1 code is 2. The value 0 of the variable k represents the base layer, the value 1 represents the enhancement first hierarchical layer, and the value 2 represents the enhancement second hierarchical layer. Also, the independent decoding tile is described according to an example shown in FIG. 2. First, a lowest_layer_MCTSS code is coded. The lowest_layer_MCTSS code represents a number of the highest hierarchical layer in which the independent decoding block set is set. Hence, in this case, since the enhancement first hierarchical layer is the highest hierarchical layer in which the independent decoding block set is set, the lowest_layer_MCTSS code becomes 1. Accordingly, the initial value of a successive loop becomes the value of the lowest_layer_MCTSS code of 1. The initial value of the code set below is 0, and the value of the code is 0 unless updated by the following processing.

First, when k=1, the information of the independent decoding tile in the enhancement layer (enhancement first hierarchical layer) is coded. Since one included independent decoding tile set (including the tile with the tile number 5) is included, the num_sets_in_message_minus1[1][0] code indicative of the number of independent decoding tile sets becomes 0. Then, the mcts_id[1][0] code is set at 0. Since the number of the independent decoding tiles belonging to the independent decoding tile set is 1, the num_tile_rects_in_set_minus1[1][0] code becomes 0. The top_left_tile_index[1][0][0] code and the bottom_right_tile_index[1][0][0] code represent the position of the independent decoding tile. Herein, since the independent decoding tile is only the tile with the tile number 5, either value is 5. Since NPL 1 describes the exact_sample_value_match_flag code, the description thereof is omitted.

Then, when k=2, information of the independent decoding tile in the enhancement layer (enhancement second hierarchical layer) is coded. Since one independent decoding tile set (including the tile with the tile number 5) is included, the num_sets_in_message_minus1[2][0] code indicative of the number of independent decoding tile sets becomes 0. Then, the mcts_id[2][0] code is set at 0. Since the number of the independent decoding tiles belonging to the independent decoding tile set is 1, the num_tile_rects_in_set_minus1[2][0] code becomes 0. The top_left_tile_index[2][0][0] code and the bottom_right_tile_index[2][0][0] code represent the position of the independent decoding tile. In this case, since the independent decoding tile set includes the tile with the tile number 5 and the tile with the tile number 6, the former value is 5, and the latter value is 6. These are coded, and coded data of MCTSS SEI is generated.

By forming the MCTSS SEI coded data as described above, as compared with the codes shown in FIG. 4A, a code is not generated for a layer without the independent decoding tile. Accordingly, the coding efficiency is improved.

Also, a configuration shown in FIG. 6A may be employed. That is, in each layer, setting can be made in each hierarchical layer by motion-constrained_tile_sets_scalability (nuh_layer_id). The nuh_layer_id code is coded data indicative of a hierarchical layer included in nal_unit_header( ) described in Section 7.3.1.2 of NPL 1. The nuh_layer_id code sets the base layer at 0, and properly assigns values to the other enhancement layers. That is, if the value is other than 0, hierarchical coding is performed. However, the code indicative of the hierarchical layer is not limited thereto. In FIG. 6A, first, when nuh_layer_id=0, information of the independent decoding tile in the base layer is coded. Since no independent decoding tile set is included, the num_sets_in_message[0] code indicative of the number of independent decoding tile sets is 0. Hence, a successive code is not generated. When nuh_layer_id=1, information of the independent decoding tile in the enhancement layer (enhancement first hierarchical layer) is coded. Since one independent decoding tile set is included, the num_sets_in_message[1] code indicative of the number of independent decoding tile sets becomes 1. Then, the mcts_id[1][0] code is set at 0. Since the number of independent decoding tiles belonging to the independent decoding tile set is 1, the num_tile_rects_in_set_minus1 [1] [0] code becomes 0. The top_left_tile_index[1][0][0] code and the bottom_right_tile_index[1][0][0] code represent the position of the independent decoding tile. Herein, since the independent decoding tile is only the tile with the tile number 5, either value is 5. Since NPL 1 describes the exact_sample_value_match_flag code, the description thereof is omitted. When nuh_layer_id=2, information of the independent decoding tile in the enhancement layer (enhancement second hierarchical layer) is coded. Since one independent decoding tile set is included, the num_sets_in_message[2] code indicative of the number of independent decoding tile sets becomes 1. Then, the mcts_id[2] [0]code is set at 0. Since the number of the independent decoding tiles belonging to the independent decoding tile set is 1, the num_tile_rects_in_set_minus1[2][0] code becomes 0. The top_left_tile_index[2][0][0] code and the bottom_right_tile_index[2][0][0] code represent the position of the independent decoding tile. In this case, the independent decoding tiles are the tile with the tile number 5 and the tile with the tile number 6. Hence, the former value is 5, and the latter value is 6.

Also, a configuration shown in FIG. 6B may be employed. That is, with reference to the vps_max_layers_minus1 code, it may be determined whether its value is larger than 0 or not, and whether the value is defined as a normal independent decoding tile set or a tile set on a hierarchical layer basis. Accordingly, the processing may be properly switched. If the profile of hierarchical coding in HEVC is defined, the profile may be determined in MCTS SEI and information of an independent decoding tile in each layer can be coded.

Also, as shown in FIG. 8, an independent decoding tile, which is increased in an intermediate hierarchical layer may be added to the existing independent decoding tile set. In FIG. 8, the independent decoding tile set in the enhancement second hierarchical layer is one, and the tile with the tile number 6 is handled as the same independent decoding tile set in addition to the tile with the tile number 5 in the independent tile set. At this time, in step S304, the content of the code of MCTSS SEI is changed. The codes of the base layer and the enhancement first hierarchical layer when k=0 and k=1 are as described above. When k=2 (enhancement second hierarchical layer), the information of the independent decoding tile of the enhancement layer (enhancement second hierarchical layer) is coded. Since two independent decoding tile sets are included, the num_sets_in_message[2] code indicative of the number of independent decoding tile sets of the enhancement layer (enhancement second hierarchical layer) becomes 1. The mcts_id[2][0] code is 0, which is the same as the independent decoding tile set including the tile with the tile number 5 of the enhancement first hierarchical layer. Since the number of rectangular regions of independent decoding tiles belonging to the independent decoding tile set including the tile with the tile number 5 and the tile with the tile number 6 of the enhancement layer (enhancement second hierarchical layer) is 1, the num_tile_rects_in_set_minus1[2][0] code becomes 0. The top_left_tile_index[2][0][0] code becomes 5, and the bottom_right_tile_index[2][0][0] code becomes 6. Also, reference of image data during coding is different from the above-described method. In step S719, the enhancement-layer coding unit 112 codes the image data of the tile in the lower layer (enhancement second hierarchical layer) of the coding subject input from, the enhancement-layer tile dividing unit 104. For coding, the enlarged image data of the higher layer (enhancement first hierarchical layer) and the reconfigured image data of the lower layer (enhancement second hierarchical layer) are referenced. In this case, in inter-frame prediction, the reconfigured image data of the independent decoding tile set in the lower layer (enhancement second hierarchical layer) stored in the enhancement-layer image reconfiguring unit 513 may be referenced. That is, the tile with the tile number 5 and the tile with the tile number 6 in the frame 210 can reference the reconfigured image data of the tile with the tile number 5 and the tile with the tile number 6 in the frame 209 during coding. As described above, the content of the independent decoding tile set may be changed at an intermediate hierarchical layer.

Further, the configuration shown in FIG. 6B may be employed. That is, setting can be made in each hierarchical layer by motion-ccmstrained_tile_sets_scalability (vps_max_layers_minus1). The vps_max_layers_minus1 code indicates the number of hierarchical layers. If 0, it represents that only the base layer is present. In FIG. 6B, at first, it is judged whether or not vps_max_layers_minus1 is 0. If the value is 0, hierarchical coding is not made, and hence line 3 to line 12 are formed of normal MCTS SEI codes. If the value is other than 0, hierarchical coding is made, and hence line 15 to line 26 are formed of the same codes as MCTSS SEI in FIG. 4A. However, line 15 to line 26 may have the configuration in FIG. 4B, and is not limited thereto. As described above, the code may be formed of motion-constrained_tile_sets( ).

Second Embodiment

FIG. 9 is a block diagram showing an image display device using an image decoding device according to this embodiment. In this embodiment, an example, in which the bit stream generated in the first embodiment is decoded, is described.

Reference sign 901 is an interface to which a bit stream is input through communication etc. Reference sign 902 is a storage unit that stores an input bit stream or a previously recorded bit stream. Reference sign 903 is a display control unit by which a user instructs a bit stream to be displayed, and designates a display method of the bit stream. The display control unit 903 outputs a hierarchical layer to be decoded and a region to be decoded as a display control signal to the image decoding device. The hierarchical layer to be decoded is expressed by the number of hierarchical layers, and the display region is expressed by the position of a tile to be displayed. However, it is not limited thereto.

Reference sign 904 is a selector that designates an input target of a bit stream to be input. Reference sign 905 is an image decoding device relating to the present invention. Reference sign 906 is a display unit that displays decoded image data generated by the image decoding device 905.

A display operation of an image by the image display device is described below. Described below is a case in which the user makes an instruction on the display control unit 903 for decoding and displaying a base layer by using a bit stream input from the interface 901. This case corresponds to a case in which the overview is monitored with an input of a monitoring camera or the like. A bit stream, which is input from the monitoring camera or the like on a frame basis, is received from the interface 901, and the bit stream is output to the selector 904 while being recorded in the storage unit 902. The selector 904 is instructed from the display control unit 903 so as to output the bit stream input from the interface 901 to the image decoding device 905. The image decoding device 905 receives an input of information about a layer to be displayed and a tile to be displayed as a display control signal from the display control unit 903. In this case, decoding of a base layer and decoding of all tiles as a region are instructed.

FIG. 10 is a block diagram showing the details of the image decoding device 905. In FIG. 10, reference sign 1001 is a terminal that receives an input of a bit stream. For easier description, it is assumed that, as the bit stream, header data and coded data per frame are input. It is assumed that the data per frame includes all hierarchical coded data forming a frame. However, it is not limited thereto, and an input may be made on a slice etc. basis. Also, the data configuration of the frame is not limited thereto. Reference sign 1002 is a terminal that receives an input of the display control signal relating to decoding input from the display control unit 903 in FIG. 9. As the display control signal, a layer to be decoded and position information of a tile to be decoded are input. The input display control signal is input to a separating unit 1004, a base-layer decoding unit 1007, and an enhancement-layer decoding unit 1010. Reference sign 1003 is a buffer that stores input hierarchical coded data for one frame. Reference sign 1004 is the separating unit. The separating unit 1004 separates header coded data, base-layer coded data, each piece of enhancement-layer coded data from the input coded data. The separating unit 1004 further divides the input hierarchical coded data for one frame into coded data on a tile basis, and outputs the coded data. If the output is on a tile basis, the number of the corresponding tiles is output to a base-layer independent-decoding-tile judging unit 1006 and an enhancement-layer independent-decoding-tile judging unit 1016, as position information of the tile. The respective pieces of separated coded data are output to a header decoding unit 1005, the base-layer decoding unit 1007, and the enhancement-layer decoding unit 1010.

Reference sign 1005 is the header decoding unit. The header decoding unit 1005 decodes the header coded data on a sequence or picture basis, and acquires a parameter required for decoding. In particular, if MCTSS SEI is present, MCTSS SEI is also decoded. In particular, the independent-decoding-tile presence flag and independent-decoding-tile position information are decoded and acquired.

Reference sign 1006 is the base-layer independent-decoding-tile judging unit that receives inputs of the independent-decoding-tile presence flag and the base-layer independent-coding-tile position information from the header decoding unit 1005, and receives an input of position information of a tile as a decoding subject from the separating unit 1004. These pieces of information are compared, and it is judged whether or not the tile in the base layer of the decoding subject is an independent decoding tile. The judgment result is input to the base-layer decoding unit 1007.

Reference sign 1016 is the enhancement-layer independent-decoding-tile judging unit that receives inputs of the independent-decoding-tile presence flag and the enhancement-layer independent-decoding-tile position information from the header decoding unit 1005, and receives an input of position information of a tile as a decoding subject from the separating unit 1004. These pieces of information are compared, and it is judged whether or not the tile in the enhancement layer of the decoding subject is an independent decoding tile. The judgment result is input to the enhancement-layer decoding unit 1010.

Reference sign 1007 is the base-layer decoding unit. The base-layer decoding unit 1007 decodes the coded data of the tile in the base layer separated by the separating unit 1004, and generates decoded image data of the base layer. The base-layer decoding unit 1007 selects a reference subject for performing prediction based on information indicative of whether or not the tile in the base layer of the decoding subject input from the base-layer independent-decoding-tile judging unit 1006 is the independent decoding tile, performs prediction, and decodes image data of the base layer. Reference sign 1008 is a frame memory. The frame memory 1008 holds decoded image data, obtained by decoding the coded data of each tile in the base layer and reconfiguring the coded data. Reference sign 1009 is an enlarging unit. The enlarging unit 1009 generates enlarged image data by enlarging the decoded and reconfigured image data to have the resolution of the enhancement layer. Also, the enlarging unit 1009 receives an input of the judgment result from the enhancement-layer independent-decoding-tile judging unit 1016, and properly selects image data to be used for enlarging depending on whether the tile in the enhancement layer of the decoding subject is the independent decoding tile or not.

Reference sign 1010 is the enhancement-layer decoding unit. The enhancement-layer decoding unit 1010 decodes the coded data of the tile in the enhancement layer separated by the separating unit 1004, and generates decoded image data of the enhancement layer. The enhancement-layer decoding unit 1010 selects a reference subject for performing prediction based on information indicative of whether or not the tile in the enhancement layer of the decoding subject input from the enhancement-layer independent-decoding-tile judging unit 1016 is the independent decoding tile, performs prediction, and decodes image data of the enhancement layer. Reference sign 1011 is a frame memory. The frame memory 1011 holds decoded image data, obtained by decoding the coded data of each tile in the enhancement layer and reconfiguring the coded data. Reference sign 1012 is a terminal that outputs the decoded image data of the base layer to the outside. Reference sign 1013 is a terminal that outputs the decoded image data of the enhancement layer to the outside.

A decoding operation of an image by the image decoding device is described below. The decoding operation is described with reference to a flowchart in FIGS. 11A and 11B. In this embodiment, an example of a bit stream generated by the coding device shown in FIG. 1 according to the first embodiment is described. The bit stream is formed of two hierarchical layers including the base layer and the enhancement layer. At this time, it is assumed that MCTSS SEI has the configuration in FIG. 4A.

First, a case, in which the layer of the decoding subject is only the base layer, is described. A user (not shown) instructs start of decoding and displaying of the entire base layer from the display control unit 903 by using the bit stream input from the interface 901.

In step S1101, the header coded data input from the terminal 1001 first is input to the header decoding unit 1005 through the buffer 1003 and the separating unit 1004. The header decoding unit 1005 first decodes video_parameter_set, which is one of sequence headers. This includes the vps_max_layers_minus1 code, which represents the number of hierarchical layers of hierarchical coding. In this embodiment, the vps_max_layers_minus1 code is 1. Then, Sequence parameter set is decoded. Sequence parameter set includes vui_parameters. In this case, vui_parameters includes the tile_boundaries_aligned_flag code, which is the tile-position alignment information. In this embodiment, the tile_boundaries_aligned_flag code is 1.

In step S1102, Picture parameter set is decoded. Decoding of the header coded data is described in detail in NPL 1, and hence the description thereof is omitted.

In step S1103, the header decoding unit 1005 judges the presence of the independent decoding tile. The result serves as the independent-decoding-tile presence flag. Actually, the presence of MCTSS SEI is judged. If MCTSS SEI is present, the independent-decoding-tile presence flag is set at 1, and the process goes to step S1104. If MCTSS SEI is not present, the independent-decoding-tile presence flag is set at 0, and the process goes to step S1105. In this embodiment, the process goes to step S1104. The independent-decoding-tile presence flag is input to the base-layer independent-decoding-tile judging unit 1006 and the enhancement-layer independent-decoding-tile judging unit 1016. If the independent decoding tile is present, tile_boundaries_aligned_flag code of the vui_parameters, which is the tile-position alignment information, is required to be 1. In not, a reply of an error may be made and decoding may be stopped. The independent-decoding-tile presence flag is input to the base-layer independent-decoding-tile judging unit 1006, and then also input to the base-layer decoding unit 1007 and the enhancement-layer decoding unit 1010.

In step S1104, the header decoding unit 1005 decodes MCTSS SEI, and acquires the independent-decoding-tile presence flag and the independent-decoding-tile position information. When the num_sets_in_message[0] code is decoded, the value 0 is obtained. Hence, it is found that the base layer does not have an independent decoding tile or an independent decoding tile set. In this case, a code relating to the independent decoding tile set for the base layer is not present. Therefore, the header decoding unit 1005 outputs the absence of the corresponding tile number as independent tile position information to the base-layer independent-decoding-tile judging unit 1006. Then, when the num_sets_in_message[1] code of the enhancement layer, which is the second hierarchical layer, is decoded, the value 1 is obtained. Hence, one independent decoding tile set is present in the enhancement layer. Hence, the successive mcts_id[1][0] code is decoded, and the value 0 is obtained. This becomes a number of an independent decoding tile set including an independent decoding tile, which is successively decoded. Further, the num_tile_rects_in_set_minus1[1][0] code is decoded, and the value 0 is obtained. This represents that one block of a rectangular region of an independent decoding tile is present. Then, this represents that one combination of a tile number of an upper left tile and a tile number of a lower right tile of the block is present. Based on the result, the top_left_tile_index[1][0][0] code and the bottom_right_tile_index[1][0][0] code are decoded, and values of 5 are obtained. That is, it is found that the independent decoding tile of the independent decoding tile set is formed of the tile with the tile number 5. Hence, the header decoding unit 1005 outputs the tile number 5 of the independent decoding tile as enhancement-layer independent-decoding-tile position information to the enhancement-layer independent-decoding-tile judging unit 1016.

In step S1105, the separating unit 1004 receives an input of position information of tiles corresponding to a displaying portion input from the terminal 1002. Displaying of the entire base layer is instructed. Hence, the tiles corresponding to the displaying portion are all tiles. Therefore, the separating unit 1004 extracts coded data of the decoding subject tile in the base layer in the order of the tile number from the tile number 0 from the buffer 1003, and outputs the coded data to the base-layer decoding unit 1007.

In step S1106, the base-layer independent-decoding-tile judging unit 1006 receives an input of the tile number of the tile as the decoding subject from the separating unit 1004. Simultaneously, the base-layer independent-decoding-tile judging unit 1006 receives an input of the independent-decoding-tile position information from the header decoding unit 1005. The base-layer independent-decoding-tile judging unit 1006 compares the tile number of the tile of the decoding subject with the tile number of the independent-decoding-tile position information. If the tile numbers match, it is judged that the decoding subject tile is the independent decoding tile, and the process goes to step S1107. If the tile numbers do not match, it is judged that the decoding subject tile is not the tile of the independent decoding tile set, and the process goes to step S1108. In this case, since there is no independent decoding tile set, either of the tiles in the base layer is not the independent decoding tile. Hence, the process goes to step S1108.

In step S1107, the decoding subject tile in the base layer is the independent decoding tile. The base-layer decoding unit 1007 performs decoding with reference to only the independent decoding tile in the independent decoding tile set at the relatively equivalent position of the decoded image of the base layer and the decoded pixels in the tile of the decoding subject tile. That is, inter-frame prediction is performed with reference to the decoded image data of the independent decoding tile in the independent decoding tile set at the relatively equivalent position stored in the frame memory 1008. Further, infra-prediction is performed with reference to the decoded image data in the tile of the decoding subject tile stored in the frame memory 1008. The decoded image data of the tile in the base layer, which has been decoded and reconfigured, is stored in the frame memory 1008, and is referenced when decoding is subsequently performed.

In step S1108, the decoding subject tile is not the tile of the independent decoding tile set. The base-layer decoding unit 1007 performs decoding with reference to the decoded image data of the base layer in the decoded frame and the decoded pixels in the frame of the base layer of the frame of the decoding subject. That is, inter-frame prediction is performed with reference to the decoded image data stored in the frame memory 1008. Further, intra-prediction is performed with reference to the coded reconfigured image data in the tile of the coding subject tile. In this case, for example, in FIG. 2, when the tile with the tile number 5 in the frame 202 is decoded, inter-frame prediction is performed by using the entire image data of the frame 201, and intra-prediction is performed by using the decoded image data of the tile number 5 in the frame 202. The decoded image data of the tile in the base layer, which has been decoded and reconfigured, is stored in the frame memory 1008, and is referenced when decoding is performed.

In step S1109, the base-layer decoding unit 1007 judges whether or not the input coded data of all tiles in the base layer corresponding to the displaying portion has been decoded. In this case, since the base layer does not include the independent decoding tile, it is judged whether or not the coded data of all tiles for one frame in the base layer has been decoded. If decoding processing on the coded data of all tiles for one frame in the base layer is not completed, the process returns to step S1105, the separating unit 1004 extracts the next tile, outputs the tile, and the processing is continued. If the decoding processing of the coded data of all tiles for one frame in the base layer is completed, the process goes to step S1110.

In step S1110, the separating unit 1004 judges whether or not the layer indicated by the display control signal input from the display control unit 903 in FIG. 9 through the terminal 1002 has been decoded. In this case, since there are two hierarchical layers, it is judged whether the subject is the base layer or the enhancement layer. If decoding and displaying of the enhancement layer are instructed, the process goes to step S1111, and if not, the process goes to step S1121. In this case, decoding is performed on only the base layer, the process goes to step S1121, and the enhancement-layer decoding unit 1010 is not operated.

In step S1121, since the decoded base layer is the hierarchical layer to be displayed, the decoded image is sent to the display unit 906 in FIG. 9 through the terminal 1012, and is displayed.

In step S1122, the base-layer decoding unit 1007 or the enhancement-layer decoding unit 1010 judges whether or not the decoding processing on the coded data of the base layer or the coded data of the enhancement layer for all frames included in a sequence input from the terminal 1001 is completed. In this case, the base-layer decoding unit 1007 judges whether or not decoding of the coded data of the base layer for all frames is completed. If there is the coded data of the base layer or the enhancement layer before the decoding processing, the process goes to step S1105, and the processing is performed on the next frame. If there is not the coded data of the frame before the decoding processing, the decoding processing is ended.

Referring back to FIG. 9, the display unit 906 receives an instruction for displaying the image data of the base layer from the display control unit 903. In response to this instruction, the display unit 906 displays the entire decoded image of the base layer.

If the user makes an instruction on the display control unit 903 for displaying of the base layer of a recorded video, the input of the selector 904 serves as the storage unit 902. Then, the display control unit 903 selects a required bit stream from the storage unit 902, and outputs the bit stream to the selector 904.

Then, a case, in which the layer of the decoding subject is the enhancement layer, is described. Described below is a case in which the user makes an instruction on the display control unit 903 for decoding and partially displaying of the enhancement layer by using a bit stream input from the interface 901. This case corresponds to a case of partly detailed monitoring with the input of a monitoring camera or the like. The image decoding device 905 receives an instruction of decoding for the base layer and the enhancement layer and the number of the tiles included in the region to be displayed from the display control unit 903. In this embodiment, for easier description, it is assumed that the tile included in the region to be displayed is the tile with the tile number 5 and the tile with the tile number 6 in FIG. 2. The decoding operation is described based on the flowchart shown in FIGS. 11A and 11B like the case of decoding and displaying for only the base layer. Also, the same operation part as that of decoding for only the base layer is only briefly described.

In step S1101, video_parameter_set and Sequence parameter set are decoded, like the case of displaying only the base layer. Among these, the vps_max_layers_minus1 code and the tile_boundaries_aligned_flag are decoded.

In step S1102, Picture parameter set is decoded, like the case of displaying only the base layer. In step S1103, the header decoding unit 1005 judges the presence of the independent decoding tile, like the case of displaying only the base layer. In step S1104, the header decoding unit 1005 decodes MCTSS SEI, like the case of displaying only the base layer.

In step S1105, the separating unit 1004 receives an input of position information of tiles corresponding to a displaying portion input from the terminal 1002. In this description, it is assumed that the positions of tiles to be displayed are the tile numbers 5 and 6. Coded data of the tile with the tile number 5, which is the decoding subject tile, in the base layer is extracted from input position information. The extracted coded data is output to the base-layer decoding unit 1007. Also, its tile position information is input to the base-layer independent-decoding-tile judging unit 1006.

In step S1106, the base-layer independent-decoding-tile judging unit 1006 compares the tile number of the tile of the decoding subject with the tile number of the independent-decoding-tile position information. Since the decoding subject tile in the base layer is not the independent decoding tile, the process goes to step S1108.

If the decoding subject tile in the base layer is the independent decoding tile, in step S1107, the base-layer decoding unit 1007 decodes the decoding subject tile in the base layer and stores decoded image data in the frame memory 1008, like the case of displaying only the base layer.

In step S1108, the decoding subject tile in the base layer is not the independent decoding tile. Like the case of displaying only the base layer, the base-layer decoding unit 1007 decodes the decoding subject tile in the base layer and stores the decoded image data in the frame memory 1008.

In step S1109, the base-layer decoding unit 1007 judges whether or not the coded data of all tiles in the base layer corresponding to the displaying portion input from the separating unit 1004 has been decoded. In this case, since the base layer does not include the independent decoding tile, it is judged whether or not the coded data of all tiles for one frame in the base layer has been decoded. In this case, if decoding of the coded data of all tiles is not completed, the process returns to step S1106, and if completed, the process goes to step S1110.

In step S1110, the separating unit 1004 judges whether or not the layer indicated by the display control signal input from the display control unit 903 in FIG. 9 through the terminal 1002 includes the enhancement layer. In this case, since the enhancement layer is also displayed, the process goes to step S1111.

In step S1111, the separating unit 1004 receives an input of position information of tiles corresponding to the displaying portion input from the terminal 1002, like step S1105. In this case, the positions of tiles to be displayed are the tile numbers 5 and 6. The separating unit 1004 extracts coded data of the tile with the tile number 5, which is the decoding subject tile, in the enhancement layer from input position information. The extracted coded data is output to the enhancement-layer decoding unit 1010. Also, its tile position information is input to the base-layer independent-decoding-tile judging unit 1006.

In step S1112, the enhancement-layer independent-decoding-tile judging unit 1016 compares the tile number of the tile of the decoding subject with the tile number of the independent-decoding-tile position information, like step S1106. If the tile numbers match, the process goes to step S1113. If the tile numbers do not match, the process goes to step S1118. In this case, the independent-decoding-tile position information is 5. This matches the tile number of the tile of the decoding subject. Hence, it is judged that the decoding subject tile in the enhancement layer is the tile of the independent decoding tile set, and the process goes to step S1113.

In step S1113, the enhancement-layer independent-decoding-tile judging unit 1016 compares the tile number of the tile of the decoding subject with the tile number of the base-layer independent-decoding-tile position information. If the tile numbers match, the process goes to step S1114. If the tile numbers do not match, the process goes to step S1116. In this case, since there is not the independent-decoding-tile position information of the base layer, the tile number of the decoding subject tile does not match the independent decoding tile number of the base layer. Hence, it is judged that the decoding subject tile in the enhancement layer is the tile of the independent decoding tile set but the tile at the relatively equivalent position in the base layer is not the independent decoding tile, and the process goes to step S1116.

In step S1114, the tile of the decoding subject is the independent decoding tile, and the tile at the relatively equivalent position in the base layer is the independent decoding tile. The enlarging unit 1009 receives an input of only decoded image data of the tile at the relatively equivalent position from the reconfigured image data of the base layer stored in the frame memory 1008. The enlarging unit 1009 performs enlarging by, for example, filtering, by using only the input decoded image data of the independent decoding tile, and generates enlarged image data. The enlarged image data is input to the enhancement-layer decoding unit 1010.

In step S1115, the enhancement-layer decoding unit 1010 decodes enhancement-layer coded data of the tile of the decoding subject input from the separating unit 1004. The decoded image data is reconfigured with reference to the enlarged image data generated in step S1114 input from the enlarging unit 1009, the decoded image data of the enhancement layer decoded and stored in the frame memory 1011, and the coded pixel data of the decoding subject tile. That is, the enhancement-layer decoding unit 1010 performs inter-layer prediction with reference to the enlarged image data of the base layer generated in step S1114. Also, the enhancement-layer decoding unit 1010 performs inter-frame prediction with reference to the decoded image data in the same independent decoding tile set of the enhancement layer stored in the frame memory 1011. The same independent decoding tile set has the same MCTS_id code. Further, the enhancement-layer decoding unit 1010 performs infra-prediction with reference to the decoded image data in the tile of the decoding subject tile.

In step S1116, the tile of the decoding subject is the independent decoding tile, however the tile at the relatively equivalent position in the base layer is not the independent decoding tile. The enlarging unit 1009 receives an input of the decoded image data of the tile at the relatively equivalent position and the decoded image data of its periphery from the reconfigured image data of the base layer stored in the frame memory 1008. The enlarging unit 1009 performs enlarging by, for example, filtering, by using the input decoded image data of the independent decoding tile and the decoded image data of its periphery, and generates enlarged image data. The enlarged image data is input to the enhancement-layer decoding unit 1010.

In step S1117, the enhancement-layer decoding unit 1010 decodes the enhancement-layer coded data of the tile of the decoding subject input from the separating unit 1004. The decoded image data is reconfigured with reference to the enlarged image data generated in step S1116 input from the enlarging unit 1009, the decoded image data of the enhancement layer decoded and stored in the frame memory 1011, and the decoded pixel data of the decoding subject tile. That is, the enhancement-layer decoding unit 1010 performs inter-layer prediction with reference to the enlarged image data of the base layer generated in step S1116. Also, the enhancement-layer decoding unit 1010 performs inter-frame prediction with reference to the decoded image data in the same independent decoding tile set of the enhancement layer stored in the frame memory 1011. Further, the enhancement-layer decoding unit 1010 performs infra-prediction with reference to the decoded image data in the tile of the decoding subject tile. A state of reference for decoding is described with reference to FIG. 2. When decoding for the tile number 5 in the frame 206 is performed, decoding is performed with reference to the enlarged image data of the frame 202 (frame 204), the decoded image data of the tile number 5 of the decoded frame 205, and the decoded pixels of the tile number 5 of the frame 206. The decoded image data of the tile in the decoded enhancement layer is output to and held in the frame memory 1011.

Hereinafter, decoding for coded data of the tile with the tile number 6 in the enhancement layer is described. In step S1111, the coded data of the tile with the tile number 6 in the enhancement layer is extracted. In step S1112, the base-layer independent-decoding-tile judging unit 1006 compares the tile number of the tile of the decoding subject with the tile number of the independent-decoding-tile position information, and the process goes to step S1118.

In step S1118, the tile of the coding subject is not the independent decoding tile. The enlarging unit 1009 receives an input of the decoded image data of the tile at the relatively equivalent position and the decoded image data of its periphery from the reconfigured image data of the base layer stored in the frame memory 1008. The enlarging unit 1009 performs enlarging by, for example, filtering, by using the input decoded image data of the independent decoding tile and the decoded image data of its periphery, and generates enlarged image data. The enlarged image data is input to the enhancement-layer decoding unit 1010.

In step S1119, the enhancement-layer decoding unit 1010 decodes enhancement-layer coded data of the tile of the decoding subject input from the separating unit 1004. The decoded image data is reconfigured with reference to the enlarged image data generated in step S1118 input from the enlarging unit 1009, the decoded image data of the enhancement layer decoded and stored in the frame memory 1011, and the decoded image data of the decoding subject tile. That is, the enhancement-layer decoding unit 1010 performs inter-layer prediction with reference to the enlarged image data of the base layer generated in step S1118. Also, the enhancement-layer decoding unit 1010 performs inter-frame prediction with reference to the decoded image data (entire image data being subject) of the enhancement layer stored in the frame memory 1011. Further, the enhancement-layer decoding unit 1010 performs infra-prediction with reference to the decoded image data in the tile of the decoding subject tile. To be specific, when decoding for the tile number 6 in the frame 206 is performed, decoding is performed with reference to the enlarged image data of the frame 202 (frame 204), the decoded image data of the decoded frame 205, and the decoded pixels of the tile with the tile number 6 of the frame 206. The decoded image data of the tile in the decoded enhancement layer is output to and held in the frame memory 1011.

In step S1120, since the coded data of all tiles in the enhancement layer corresponding to the displaying portion has been decoded, the process goes to step S1121.

In step S1121, since the decoded enhancement layer is the hierarchical layer to be displayed, the decoded image is sent to the display unit 906 in FIG. 9 through the terminal 1013, and is displayed.

In step S1122, the enhancement-layer decoding unit 1010 judges whether or not the decoding processing of the coded data corresponding to the displaying portion for all frames included in the sequence input from the terminal 101 is completed. If there is a frame before the decoding processing, the process goes to step S1105, and performs the processing on the next frame. If there is not a frame before the decoding processing, the decoding processing is ended.

With the above-described configuration, the bit stream, in which the independent decoding tile is independently set on a layer basis and coded, can be decoded by a method suitable for displaying. The independent decoding tile is not set in a higher layer which has a low resolution and which does not need setting of the independent decoding tile, and the independent decoding tile can be set in a lower layer with a high resolution. Accordingly, decoding can be performed at high speed on the entire image data with the bit stream in which an increase in code amount because of setting of the independent decoding tile is restricted in the layer with the low resolution. The image data can be entirely recognized. In particular, when a plurality of images are simultaneously decoded and displayed, this embodiment is effective. Also, in the high-resolution layer, for easier access on a tile basis, the required portion can be read at high speed and decoded with high precision.

In this embodiment, the example is given in which only a temporarily previous frame is decoded as a reference frame as shown in FIG. 2. However, it is not limited thereto. When decoding is performed with reference to a plurality of frames, reference is similarly made. This is easily understood from the above description.

Also, the enlarging unit 1009 may not be used, or an enlargement ratio may be 1, so that a quantization parameter decoded by the base-layer decoding unit 1007 is smaller than a quantization parameter decoded by the enhancement-layer decoding unit 1010. Accordingly, decoding of data after SNR hierarchical coding can be performed.

Also, in this embodiment, the example is given in which coded data of all hierarchical layers is included in coded data of one frame. However, it is not limited thereto. Coded data may be input on a layer basis. For example, data may be grouped on a layer basis and stored in the storage unit 902, coded data may be extracted and read as required for the enhancement layer from the storage unit 902.

Also, the example is described, in which the base layer and the single enhancement layer are provided. However, it is not limited thereto. The enhancement-layer decoding unit 1010, the frame memory 1011, and the enlarging unit 1009 may form a set, and sets may be additionally provided by the number of hierarchical layers. Accordingly, more hierarchical layers can be handled.

Also, since the enhancement-layer decoding unit, the frame memory, and the enlarging unit have the same internal processing, these units may be integrated and may perform decoding of the respective hierarchical layers. FIG. 12 shows a block diagram of a decoding device in this case. In FIG. 12, the same number is applied to a unit that has the same function as that in the block of the image decoding device in FIG. 10, and the description thereof is omitted. Reference sign 1208 is a frame memory that holds decoded image data reconfigured by the base-layer decoding unit 1007. The frame memory 1208 differs from the frame memory 1008 in FIG. 10 in that the frame memory 1208 additionally has a function of making an output to a selector 1220. Reference sign 1209 is an enlarging unit. The enlarging unit 1209 differs from the enlarging unit 1009 in FIG. 10 in that the enlarging unit 1209 can selectively receive one of an input from a frame memory 1211 and an input from the frame memory 1208. Reference sign 1211 is the frame memory. The frame memory 1211 differs from the frame memory 1011 in FIG. 10 in that the frame memory 1211 has a function of outputting coded data of a desirable tile to the enlarging unit 1209 and the selector 1220. Reference sign 1220 is the selector that selects desirable decoded image data from the frame memory 1208 or the frame memory 1211, receives an input of the desirable decoded image data, and outputs the desirable decoded image data to a terminal 1212. Reference sign 1210 is an enhancement-layer decoding unit that decodes each hierarchical layer of the enhancement layer. The enhancement-layer decoding unit 1210 differs from the enhancement-layer decoding unit 1010 in FIG. 10 in that the enhancement-layer decoding unit 1210 judges whether or not the decoded hierarchical layer matches the hierarchical layer to be displayed, and performs decoding of the enhancement layer. Reference sign 1212 is the terminal that outputs the decoded image data to the outside.

FIGS. 13A and 13B show a decoding method of the image decoding device in FIG. 12. In the same drawing, the same number as that in FIGS. 11A and 11B is applied to a step that has the same function as that in FIGS. 11A and 11B, and the description thereof is omitted. In this embodiment, description is given for, for example, decoding of a bit stream, in which the number of hierarchical layers generated by the coding method in FIGS. 7A and 7B by the image coding device in FIG. 5 according to the first embodiment is 3.

In step S1101 to step S1104 in FIG. 13A, as described above, header coded data is decoded by the header decoding unit 1005. Herein, the vps_max_layers_minus1 code is 2.

First, a case, in which the layer of the decoding subject is only the base layer, is described. A user (not shown) instructs start of decoding and displaying of the entire base layer from the display control unit 903 by using the bit stream input from the interface 901. Like the case of displaying only the base layer, decoding for one frame of the base layer is completed in step S1105 to step S1109 in FIG. 11A. However, this case differs from the above-described case in that all decoded image data generated by the base-layer decoding unit 1007 is stored in the frame memory 1208. In this description, since the independent decoding tile is not present in the base layer, for decoding of all tiles in the base layer, step S1108 is selected in step S1106.

In step S1310, the base-layer decoding unit 1007 or the enhancement-layer decoding unit 1210 compares the number of decoded hierarchical layers with the number of hierarchical layers to be displayed, instructed by the display control unit 903, and judges whether the hierarchical layer is the hierarchical layer to be displayed or not. If the number of hierarchical layers reaches the number of hierarchical layers to be displayed, the process goes to step S1321, and if not, the process goes to step S1330. In this case, according to the display control signal input from the terminal 1002, the hierarchical layer to be displayed is only the base layer. Hence, it is judged that the process has reached the hierarchical layer to be displayed, and the process goes to step S1321.

In step S1321, the selector 1220 selects the decoded image data of the hierarchical layer instructed so as to display the decoded hierarchical layer. In this case, since the lowermost hierarchical layer is the base layer, the selector 1220 reads the decoded image data from the frame memory 1208, and outputs the decoded image data to the display unit 906 in FIG. 9 from the terminal 1212. Referring back to FIG. 9, the display unit 906 receives an instruction for displaying the image data of the base layer from the display control unit 903. In response to this instruction, the display unit 906 displays the entire decoded image of the base layer.

Then, a case, in which the layer of the decoding subject is the enhancement layer, is described. Described below is a case in which the user makes an instruction on the display control unit 903 for decoding and partially displaying of the enhancement layer by using the bit stream input from the interface 901. Description is given for an example, in which the hierarchical layer to be displayed is the enhancement second hierarchical layer (the number of hierarchical layers is 3). In this embodiment, for easier description, the tile included in the region to be displayed is the tile with the tile number 5 and the tile with the tile number 6 in FIG. 2. The decoding operation is described based on the flowchart shown in FIGS. 13A and 13B like the case of decoding and displaying for only the base layer. Also, the same operation part as that of decoding for only the base layer is only briefly described.

In step S1106, the base-layer independent-decoding-tile judging unit 1006 compares the tile number of the tile of the decoding subject with the tile number of the independent-decoding-tile position information. Since the decoding subject tile in the base layer is not the independent decoding tile, the process goes to step S1108. In step S1108, the base-layer decoding unit 1007 decodes the tile in the base layer and stores the decoded image data in the frame memory 1208. In step S1109, the base-layer decoding unit 1007 judges whether or not the coded data of all tiles in the base layer corresponding to the displaying portion input from the separating unit 1004 has been decoded.

In step S1310, the selector 1220 compares the number of decoded hierarchical layers with the number of hierarchical layers to be displayed, instructed by the display control unit 903, and judges whether the hierarchical layer is the hierarchical layer to be displayed or not. In this case, according to the display control signal input from the terminal 1002, the hierarchical layer to be displayed is the enhancement second hierarchical layer. Hence, the selector 1220 judges that the process has not reached the hierarchical layer to be displayed, the separating unit 1004 is caused to output coded data of the next hierarchical layer, and then the process goes to step S1330.

In step S1330, the enhancement-layer decoding unit 1210 sets the base layer decoded in step S1107 or step S1108 or the enhancement layer of the hierarchical layer decoded in step S1315, step S1317, or step S1319 (described later), as a higher layer. Further, the enhancement-layer decoding unit 1210 sets the enhancement layer of the successive decoding subject, as a lower layer. Since either of the higher layers (base layer) is not the independent decoding tile, the base layer coded in step S1108 serves as the higher layer, and the enhancement first hierarchical layer is serves as the lower layer.

In step S1311, the separating unit 1004 receives an input of position information of tiles corresponding to a displaying portion input from the terminal 1002. In this description, the positions of tiles to be displayed are the tile numbers 5 and 6. Coded data of the tile with the tile number 5, which is the decoding subject tile, in the lower layer (enhancement first hierarchical layer) is extracted from the input position information. The extracted coded data is output to the enhancement-layer decoding unit 1210. Also, its tile position information is input to the base-layer independent-decoding-tile judging unit 1006.

In step S1312, the enhancement-layer independent-decoding-tile judging unit 1016 compares the tile number of the tile of the decoding subject in the lower layer (enhancement first hierarchical layer) with the tile number of the independent-decoding-tile position information of the lower layer (enhancement first hierarchical layer). If the tile numbers match, the process goes to step S1313. If the tile numbers do not match, the process goes to step S1318. In this case, the independent-decoding-tile position information of the lower layer (enhancement first hierarchical layer) is 5. The tile matches the tile number of the tile of the decoding subject. Hence, it is judged that the decoding subject tile in the lower layer (enhancement first hierarchical layer) is the tile of the independent decoding tile set, and the process goes to step S1313.

In step S1313, the enhancement-layer independent-decoding-tile judging unit 1016 compares the tile number of the tile of the decoding subject in the lower layer (enhancement first hierarchical layer) with the tile number of the independent-decoding-tile position information of the higher layer (base layer). If the tile numbers match, the process goes to step S1314. If the tile numbers do not match, the process goes to step S1316. In this case, since there is not the independent-decoding-tile position information of the higher layer (base layer), the tile number of the decoding subject tile does not match the independent decoding tile number of the lower layer (enhancement first hierarchical layer). Hence, it is judged that the decoding subject tile in the lower layer (enhancement first hierarchical layer) is the tile of the independent decoding tile set but the tile at the relatively equivalent position in the higher layer (base layer) is not the independent decoding tile, and the process goes to step S1316.

In step S1316, the tile of the decoding subject is the independent decoding tile, however the tile at the relatively equivalent position in the base layer is not the independent decoding tile. The enlarging unit 1209 receives an input of the decoded image data of the tile at the relatively equivalent position and the decoded image data of its periphery from the reconfigured image data of the base layer stored in the frame memory 1208. The enlarging unit 1209 performs enlarging by, for example, filtering, by using the input decoded image data of the independent decoding tile and the decoded image data of its periphery, and generates enlarged image data. The enlarged image data is input to the enhancement-layer decoding unit 1210.

In step S1317, the enhancement-layer decoding unit 1210 decodes enhancement-layer coded data of the tile of the decoding subject input from the separating unit 1004. For decoding, inter-layer prediction is performed with reference to the enlarged image data generated in step S1316 input from the enlarging unit 1209. Also, inter-frame prediction is performed with reference to the decoded image data of the lower layer (enhancement first hierarchical layer) decoded and stored in the frame memory 1211. Further, intra-prediction is performed with reference to pixel data of the decoded block of the decoding subject tile in the lower layer (enhancement first hierarchical layer), and decoded image data is reconfigured. That is, the enhancement-layer decoding unit 1210 performs inter-layer prediction with reference to the enlarged image data of the higher layer (base layer) generated in step S1316. Also, inter-frame prediction is performed with reference to decoded image data in an independent decoding tile set in other decoded frame of the lower layer (enhancement first hierarchical layer) at the relatively equivalent position of the lower layer (enhancement first hierarchical layer) stored in the frame memory 1211. Further, intra-prediction is performed with reference to the decoded image data in the tile of the decoding subject tile in the lower layer (enhancement first hierarchical layer). A state of reference for decoding is described with reference to FIG. 2. When decoding for the tile number 5 in the frame 206 is performed, decoding is performed with reference to the enlarged image data of the frame 202 (frame 204), the decoded image data of the tile number 5 of the decoded frame 205, and the decoded pixels of the tile number 5 of the frame 206. The decoded image data of the tile in the decoded enhancement layer is output to and held in the frame memory 1011.

In step S1120, the enhancement-layer decoding unit 1210 judges whether or not the coded data of all tiles in the lower layer (enhancement first hierarchical layer) corresponding to the displaying portion input from the separating unit 1004 has been decoded. In this case, since decoding of the coded data of the tile with the tile number 6 in the enhancement layer is not completed, the process returns to step S1330, and decoding of the coded data of the tile with the tile number 6 in the lower layer (enhancement first hierarchical layer) is performed.

Hereinafter, decoding for coded data of the tile with the tile number 6 in the lower layer (enhancement first hierarchical layer) is described. In step S1311, the coded data of the tile with the tile number 6 in the lower layer (enhancement first hierarchical layer) is extracted. In step S1312, the enhancement-layer independent-decoding-tile judging unit 1016 compares the tile number of the tile of the decoding subject in the lower layer (enhancement first hierarchical layer) with the tile number of the independent-decoding-tile position information of the hierarchical layer of the decoding subject. In this case, since the tile with the tile number 6 is not the independent decoding tile in the lower layer (enhancement first hierarchical layer), the process goes to step S1318.

In step S1318, enlarged image data is generated by using the input decoded image data of the higher layer (base layer). That is, the enlarging unit 1209 receives an input of the decoded image data from the frame memory 1208, and enlarges the decoded image data. To be specific, the tile number 6 of the frame 204, which is the enlarged image data, is generated by using the decoded image data of the tile with the tile number 6 in the frame 202 and the decoded image data of its periphery.

In step S1319, the enhancement-layer decoding unit 1210 decodes enhancement-layer coded data of the tile of the decoding subject in the lower layer (enhancement first hierarchical layer) input from the separating unit 1004. The decoded image data is reconfigured with reference to the enlarged image data generated in step S1318 input from the enlarging unit 1009, the decoded image data of the enhancement layer decoded and stored in the frame memory 1211, and the decoded image data of the decoding subject tile. That is, the enhancement-layer decoding unit 1210 performs inter-layer prediction with reference to the enlarged image data of the higher layer (base layer) generated in step S1318. Also, inter-frame prediction is performed with reference to the decoded image data (entire image data being subject) of the lower layer (enhancement first hierarchical layer) stored in the frame memory 1011. Further, intra-prediction is performed with reference to the decoded image data in the tile of the decoding subject tile in the lower layer (enhancement first hierarchical layer). To be specific, when decoding for the tile number 5 in the frame 206 is performed, decoding is performed with reference to the enlarged image data of the frame 202 (frame 204), the entire decoded image data of the decoded frame 205, and the decoded pixels of the tile number 5 of the frame 206. The decoded image data of the tile in the decoded lower layer (enhancement first hierarchical layer) is output to and held in the frame memory 1211.

In step S1120, the enhancement-layer decoding unit 1210 judges whether or not the coded data of all tiles in the lower layer (enhancement first hierarchical layer) corresponding to the displaying portion, input from the separating unit 1004 has been decoded. In this case, since decoding for the coded data of all tiles in the lower layer (enhancement first hierarchical layer) is completed, the process goes to step S1320.

In step S1320, the enhancement-layer decoding unit 1210 judges whether or not decoding for all hierarchical layers indicated by the vps_max_layers_minus1 code is completed. If the decoding processing on tile data for all hierarchical layers is not completed, the process returns to step S1310, and judgment on displaying is made. If the decoding processing on image data of all tiles in the enhancement layer is completed, the process goes to S1321. In this case, since decoding of the enhancement second hierarchical layer is not completed, the process returns to step S1310.

In step S1310, according to the display control signal input from the terminal 1002, the hierarchical layer to be displayed is the enhancement second hierarchical layer. Hence, the enhancement-layer decoding unit 1210 judges that the process has not reached the hierarchical layer to be displayed, and the process goes to step S1330.

In step S1330, the enhancement-layer decoding unit 1210 sets the lower layer (enhancement first hierarchical layer) decoded in step S1315, step S1317, or step S1319 at a higher layer. Further, the enhancement-layer decoding unit 1210 sets the enhancement layer (enhancement second hierarchical layer) of the successive decoding subject at a lower layer.

In step S1311, the separating unit 1004 receives an input of position information of tiles corresponding to a displaying portion input from the terminal 1002. In this description, the positions of tiles to be displayed are the tile numbers 5 and 6. Coded data of the tile with the tile number 5, which is the decoding subject tile, in the lower layer (enhancement second hierarchical layer) is extracted from the input position information. Coded data of the tile number 5 in the extracted lower layer (enhancement second hierarchical layer) is output to the enhancement-layer decoding unit 1210. Also, its tile position information is input to the enhancement-layer independent-decoding-tile judging unit 1016.

In step S1312, the enhancement-layer independent-decoding-tile judging unit 1016 compares the tile number of the tile of the decoding subject in the lower layer (enhancement second hierarchical layer) with the tile number of the independent-decoding-tile position information of the lower layer (enhancement second hierarchical layer) of the decoding subject. If the tile numbers match, the process goes to S1313. If the tile numbers do not match, the process goes to step S1318. In this case, the independent-decoding-tile position information of the lower layer (enhancement first hierarchical layer) is 5. The tile number of the tile of the independent-decoding-tile position information matches the tile number of the tile in the lower layer (enhancement second hierarchical layer) of the decoding subject. Hence, it is judged that the decoding subject tile in the lower layer (enhancement second hierarchical layer) is the tile of the independent decoding tile set, and the process goes to step S1314.

In step S1313, the enhancement-layer independent-decoding-tile judging unit 1016 compares the tile number of the tile of the decoding subject in the lower layer (enhancement second hierarchical layer) with the tile number of the independent-decoding-tile position information of the higher layer (enhancement first hierarchical layer). If the tile numbers match, the process goes to S1314. If the tile numbers do not match, the process goes to step S1316. In this case, while the independent-decoding-tile position information of the higher layer (enhancement first hierarchical layer) is only 5, the number matches the independent decoding tile number 5 of the lower layer (enhancement second hierarchical layer). Hence, it is judged that the decoding subject tile in the lower layer (enhancement second hierarchical layer) is the tile of the independent decoding tile set and the tile at the relatively equivalent position in the higher layer (enhancement first hierarchical layer) is the independent decoding tile. The process goes to step S1314.

In step S1314, the tile of the decoding subject in the lower layer (enhancement second hierarchical layer) is the independent decoding tile, and the tile at the relatively equivalent position in the higher layer (enhancement first hierarchical layer) is also the independent decoding tile. The enlarging unit 1209 receives an input of only decoded image data of the tile at the relatively equivalent position from the reconfigured image data of the higher layer (enhancement first hierarchical layer) stored in the frame memory 1211. The enlarging unit 1209 performs enlarging by, for example, filtering, by using only the input decoded image data of the independent decoding tile, and generates enlarged image data. The enlarged image data is input to the enhancement-layer decoding unit 1210.

In step S1315, the enhancement-layer decoding unit 1210 decodes enhancement-layer coded data of the tile in the lower layer (enhancement second hierarchical layer) of the decoding subject input from the separating unit 1004. For decoding, inter-layer prediction is performed with reference to the enlarged image data generated in step S1314 input from the enlarging unit 1209. Also, inter-prediction is performed with reference to the decoded image data of the frame of the lower layer (enhancement second hierarchical layer) decoded and stored in the frame memory 1211. Further, intra-prediction is performed with reference to pixel data of the decoded block of the decoding subject tile in the lower layer (enhancement second hierarchical layer), and decoded image data is reconfigured. That is, the enhancement-layer decoding unit 1210 performs inter-layer prediction with reference to the enlarged image data of the higher layer (enhancement second hierarchical layer) generated in step S1314. Also, inter-frame prediction is performed with reference to the decoded image data of the independent decoding tile set of the lower layer (enhancement second hierarchical layer) at the relatively equivalent position of the lower layer (enhancement second hierarchical layer) stored in the frame memory 1211. Further, intra-prediction is performed with reference to the decoded image data in the tile of the decoding subject tile in the lower layer (enhancement second hierarchical layer). A state of reference for decoding is described with reference to FIG. 2. When decoding for the tile number 5 in the frame 210 is performed, decoding is performed with reference to the enlarged image data of the frame 206 (frame 208), the decoded image data of the tile number 5 of the decoded frame 209, and the decoded pixels of the tile number 5 of the frame 210. The decoded image data of the tile in the decoded enhancement layer is output to and held in the frame memory 1011.

In step S1120, the enhancement-layer decoding unit 1210 judges whether or not the coded data of all tiles in the lower layer (enhancement second hierarchical layer) corresponding to the displaying portion input from the separating unit 1004 has been decoded. In this case, since decoding of the coded data of the tile with the tile number 6 in the enhancement layer is not completed, the process returns to step S1311, and decoding of the coded data of the tile with the tile number 6 in the lower layer (enhancement second hierarchical layer) is performed.

In step S1311, the coded data of the tile with the tile number 6 in the lower layer (enhancement second hierarchical layer) is extracted. In step S1312, the enhancement-layer independent-decoding-tile judging unit 1016 compares the tile number of the tile of the decoding subject in the lower layer (enhancement second hierarchical layer) with the tile number of the independent-decoding-tile position information of the hierarchical layer of the decoding subject. In this case, since the tile with the tile number 6 is not the independent decoding tile in the lower layer (enhancement second hierarchical layer), the process goes to step S1313.

In step S1313, the enhancement-layer independent-decoding-tile judging unit 1016 compares the tile number of the tile of the decoding subject in the lower layer (enhancement second hierarchical layer) with the tile number of the independent-decoding-tile position information of the higher layer (enhancement first hierarchical layer). If the tile numbers match, the process goes to S1314. If the tile numbers do not match, the process goes to step S1316. In this case, while the independent-decoding-tile position information of the higher layer (enhancement first hierarchical layer) is only 5, and the number does not match the independent decoding tile number 6 of the lower layer (enhancement second hierarchical layer). Hence, it is judged that the decoding subject tile in the lower layer (enhancement second hierarchical layer) is the tile of the independent decoding tile set but the tile at the relatively equivalent position of the higher layer (enhancement first hierarchical layer) is not the independent decoding tile. The process goes to step S1316.

In step S1316, the tile of the decoding subject in the lower layer (enhancement second hierarchical layer) is the independent decoding tile but the tile at the relatively-equivalent position in the higher layer (enhancement first hierarchical layer) is not the independent decoding tile. The enlarging unit 1209 receives an input of decoded image data of the tile at the relatively equivalent position and an input of decoded image data of its periphery from the reconfigured image data of the higher layer (enhancement first hierarchical layer) stored in the frame memory 1211. The enlarging unit 1209 performs enlarging by, for example, filtering, by using the input decoded image data of the independent decoding tile and the input decoded image data of its periphery, and generates enlarged image data. The enlarged image data is input to the enhancement-layer decoding unit 1210.

In step S1317, the enhancement-layer decoding unit 1210 decodes enhancement-layer coded data of the tile of the decoding subject in the lower layer (enhancement second hierarchical layer) input from the separating unit 1004. Inter-layer prediction is performed with reference to the enlarged image data of the higher layer (enhancement first hierarchical layer) generated in step S1316 input from the enlarging unit 1209. Inter-prediction is performed with reference to the decoded image data of the frame of the lower layer (enhancement second hierarchical layer) decoded and stored in the frame memory 1211. Decoded image data is reconfigured with reference to pixel data of the decoded block of the decoding subject tile in the lower layer (enhancement second hierarchical layer). That is, the enhancement-layer decoding unit 1210 performs inter-layer prediction with reference to the enlarged image data of the higher layer (enhancement first hierarchical layer) generated in step S1316. Also, the enhancement-layer decoding unit 1210 performs inter-frame prediction with reference to the decoded image data in the independent decoding tile set in the lower layer (enhancement second hierarchical layer) at the relatively equivalent position of the lower layer (enhancement second hierarchical layer) stored in the frame memory 1211. Further, the enhancement-layer decoding unit 1210 performs intra-prediction with reference to the decoded image data in the tile of the decoding subject tile in the lower layer (enhancement second hierarchical layer). A state of reference for decoding is described with reference to FIG. 2. When decoding for the tile number 6 of the frame 210 is performed, decoding is performed with reference to the enlarged image data of the frame 206 (frame 208), the decoded image data of the tile number 6 of the decoded frame 209, and the decoded pixels of the tile number 6 of the frame 210. The decoded image data of the tile in the decoded enhancement layer is output to and held in the frame memory 1211.

In step S1120, the enhancement-layer decoding unit 1210 judges whether or not the coded data of all tiles in the lower layer (enhancement second hierarchical layer) corresponding to the displaying portion input from the separating unit 1004 has been decoded. In this case, since decoding for the coded data of all tiles in the lower layer (enhancement second hierarchical layer) is completed, the process goes to step S1320.

In step S1320, the enhancement-layer decoding unit 1210 judges whether or not decoding of all hierarchical layers indicated by the vps_max_layers_minus1 code is completed. Since the decoding processing on the tile data of all hierarchical layers is completed, the process goes to step S1321.

In step S1321, the selector 1220 selects decoded image data of the hierarchical layer instructed for displaying. In this case, since the lowermost hierarchical layer is the enhancement second hierarchical layer, the selector 1220 reads the decoded image data of the enhancement second hierarchical layer from the frame memory 1211, and outputs the decoded image data to the display unit 906 in FIG. 9 from the terminal 1212. Referring back to FIG. 9, the display unit 906 receives an instruction of displaying the tile with the tile number 5 and the tile with the tile number 6 in the image data of the enhancement layer from the display control unit 903. In response to this instruction, the display unit 906 displays the entire decoded image of the base layer.

If the tile of the displaying subject is not the independent decoding tile, in step S1106, the process goes to step S1108, and in step S1312, the process goes to step S1318. Step S1108 is described above, and hence the description thereof is omitted.

In step S1318, enlarged image data is generated by using the decoded image data of the input higher layer. That is, the enlarging unit 1209 receives an input of the decoded image data from the frame memory 1208 or the frame memory 1211, and is enlarged.

In step S1319, the enhancement-layer decoding unit 1210 decodes enhancement-layer coded data of the tile of the decoding subject in the lower layer input from the separating unit 1004. The decoded image data is reconfigured with reference to the enlarged image data generated in step S1318 input from the enlarging unit 1009, the decoded image data of the enhancement layer decoded and stored in the frame memory 1211, and the decoded pixel data of the decoding subject tile. That is, the enhancement-layer decoding unit 1210 performs inter-layer prediction with reference to the enlarged image data of the higher layer generated in step S1318. Also, the enhancement-layer decoding unit 1210 performs inter-frame prediction with reference to the decoded image data (entire image data being subject) of the lower layer stored in the frame memory 1211. Further, the enhancement-layer decoding unit 1210 performs intra-prediction with reference to the decoded image data in the tile of the decoding subject tile in the lower layer. To be specific, when decoding for the tile number 5 of the frame 206 is performed, decoding is performed with reference to the enlarged image data of the frame 202 (frame 204), the entire decoded image data of the decoded frame 205, and the decoded pixels of the tile with the tile number 5 in the frame 206. The decoded image data of the tile in the decoded lower layer (enhancement first hierarchical layer) is output to and held in the frame memory 1211.

The description has been given above such that the hierarchical layer to be displayed is the enhancement second hierarchical layer (the number of hierarchical layers is 3). However, if the hierarchical layer to be displayed is the enhancement first hierarchical layer (the number of hierarchical layers is 2), in step S1310, the process goes to step S1321 when decoding of the enhancement first hierarchical layer is completed. Therefore, the enhancement second hierarchical layer is not decoded.

As described above, if MCTSS SEI is present in the bit stream in addition of the effect of the image decoding device in FIG. 10, the tile_boundaries_aligned_flag code of vui_parameters, which is the tile-position alignment information, is set at 1. Hence, regarding vui_parameters, if MCTS SEI is present in the bit stream, the tile_boundaries_aligned_flag code, serving as coded data, is omitted; however, the value can become 1 at the decoding side without exception. If MCTSS SEI is not present, the tile_boundaries_aligned_flag code is decoded, and is referenced in decoding at the downstream side. Accordingly, decoding can be similarly performed even if the tile_boundaries_aligned_flag code is not present.

Also, MCTSS SEI coded data is not limited to the configuration in FIG. 4A. For example, coded data of the configuration shown in FIG. 4B may be decoded. The header decoding unit 1005 decodes the vps_max_layers_minus1 code, and decodes 2 set in the first embodiment. That is, the number of hierarchical layers becomes 3. The value 0 of the variable k represents the base layer, the value 1 represents the enhancement first hierarchical layer, and the value 2 represents the enhancement second hierarchical layer. First, the lowest_layer_MCTSS code is decoded, and the value 1 is obtained. Hence, a successive loop starts from k=1. When k=1, information of the independent decoding tile in the enhancement layer (enhancement first hierarchical layer) is coded. When the num_sets_in_message_minus1[1] code is decoded, the value 0 is obtained. Hence, one independent decoding tile set is present in the enhancement first hierarchical layer. Then, the mcts_id[1][0] code is decoded, and it is obtained that the ID of the included independent decoding tile set is 0. Further, the num_tile_rects_in_set_minus1[1] code is decoded, and it is obtained that the block of the rectangular region of the independent decoding tile belonging to the independent decoding tile set is one. The top_left_tile_index[1][0][0] code and the bottom_right_tile_index[1][0][0] code are decoded, and the value 5 is obtained. That is, it is obtained that one independent decoding tile set is present in the enhancement first hierarchical layer and the tile number is 5. Then, when k=2, information of the independent decoding tile in the enhancement layer (enhancement second hierarchical layer) is decoded. When the num_sets_in_message_minus1[2] code is decoded, the value 1 is obtained. Hence, two independent decoding tile sets are present in the enhancement second hierarchical layer. Then, the mcts_id[2][0] code is decoded, and it is obtained that the ID of the first included independent decoding tile set is 0. Further, the num_tile_rects_in_set_minus1[2][0] code is decoded, and it is obtained that the block of the rectangular region of the independent decoding tile belonging to the first independent decoding tile set is one. The top_left_tile_index[2][0][0] code and the bottom_right_tile_index[2] [0][0] code are decoded, and the value 5 is obtained. Further, the mcts_id[2][1] code is decoded, and it is obtained that the ID of the included first independent decoding tile set is 1. Further, the num_tile_rects_in_set_minus1[2][1] code is decoded, and it is obtained that the block of the rectangular region of the independent decoding tile belonging to the second independent decoding tile set is one. The top_left_tile_index[2][1][0] code and the bottom_right_tile_index[2][1][0] code are decoded, and the value 6 is obtained. That is, it is found that two independent decoding tile sets are present in the enhancement first hierarchical layer and the two independent decoding tile sets include an independent decoding tile set including the tile with the tile number 5 and an independent decoding tile set including the tile with the tile number 6.

By decoding the MCTSS SEI coded data formed as described above, as compared with the codes shown in FIG. 4A, a code is not input for a hierarchical layer without the independent decoding tile. Accordingly, the cost of the decoding processing is decreased.

For example, coded data of the configuration shown in FIG. 6 may be decoded. That is, in each layer, coded data individually set in each hierarchical layer by motion-constrained_tile_sets_scalability(nuh_layer_id) can be decoded. As described in the first embodiment, nuh_layer_id represents a hierarchical layer having dependence. In FIG. 6A, the nuh_layer_id code is additionally decoded. A hierarchical layer corresponding to the nuh_layer_id code is decoded. In this embodiment, it is assumed that three hierarchical layers are provided like FIG. 4B. That is, the value 0 of the nuh_layer_id code represents the base layer, the value 1 thereof represents the enhancement first hierarchical layer, and the value 2 thereof represents the enhancement second hierarchical layer. First, when nuh_layer_id=0, information of the independent decoding tile in the base layer is decoded. The num_sets_in_message[0] code is decoded, and the value 0 is obtained. The value 0 represents that the base layer does not include the independent decoding tile set. Hence, a successive code is not present for the base layer.

When nuh_layer_id=1, information of the independent decoding tile in the enhancement layer (enhancement first hierarchical layer) is decoded. The num_sets_in_message[1] code is decoded, and the value 1 is obtained. The value 1 represents that the enhancement first hierarchical layer includes one independent decoding tile set. The mcts_id[1] [0] code is decoded, and the value 0 is obtained. That is, it is obtained that the ID of the included independent decoding tile set is 0. The num_tile_rects_in_set_minus1[1][0] code is decoded, and the value 0 is obtained. Hence, one independent decoding tile set is present in the enhancement first hierarchical layer. Then, the mcts_id[1][0][0] code is decoded, and it is obtained that the ID of the included independent decoding tile set is 0. Further, the num_tile_rects_in_set_minus1[1] code is decoded, and it is obtained that the block of the rectangular region of the independent decoding tile belonging to the independent decoding tile set is one. The top_left_tile_index[1][0][0] code and the bottom_right_tile_index[1][0][0] code are decoded, and the value 5 is obtained. That is, it is obtained that one independent decoding tile set is present in the enhancement first hierarchical layer and the tile number is 5.

When nuh_layer_id=2, information of the independent decoding tile in the enhancement layer (enhancement second hierarchical layer) is decoded. The num_sets_in_message[2] code is decoded, and the value 2 is obtained. The value 2 represents that the enhancement second hierarchical layer includes two independent decoding tile sets. The num_id[2] [0] code is decoded, and the value 0 is obtained. That is, it is obtained that the ID of the included first independent decoding tile set is 0. The num_tile_rects_in_set_minus1[1] [0] code is decoded, and the value 0 is obtained. Hence, one block of the rectangular region of the independent decoding tile is present in the first independent decoding tile set of the enhancement second hierarchical layer. Then, the mcts_id [2][0] code is decoded, and it is obtained that the ID of the included independent decoding tile set is 0. Further, the num_tile_rects_in_set_minus1 [2][0] code is decoded, and it is obtained that the block of the rectangular region of the independent decoding tile belonging to the independent decoding tile set is one. The top_left_tile_index[1][0][0] code and the bottom_right_tile_index[1][0][0] code are decoded, and the value 5 is obtained. That is, it is obtained that two independent decoding tile sets are present in the enhancement second hierarchical layer and the tile number is 5. Further, the num_tile_rects_in_set_minus1[2][1] code is decoded, and it is obtained that the block of the rectangular region of the independent decoding tile belonging to the second independent decoding tile set is one. The top_left_tile_index[2][1][0] code and the bottom_right_tile_index[2][1][0] code are decoded, and the value 6 is obtained. That is, it is found that two independent decoding tile sets are present in the enhancement first hierarchical layer and the two independent decoding tile sets includes an independent decoding tile set including the tile with the tile number 5 and an independent decoding tile set including the tile with the tile number 6.

The MCTSS SEI coded data configured as described above corresponds to the coded data of each hierarchical layer and the independent-decoding-tile position information of each hierarchical layer is coded. Accordingly, coding of a layer basis becomes easy. For example, independent-decoding-tile position information of a hierarchical layer which is not required to be decoded is not decoded. Accordingly, the cost of the decoding processing is decreased.

Further, coded data of a configuration shown in FIG. 6B may be decoded. That is, setting can be made in each hierarchical layer by motion-constrained_tile_sets_scalability (vps_max_layers_minus1). The vps_max_layers_minus1 code indicates the number of hierarchical layers. If 0, it represents that only the base layer is present. In FIG. 6B, at first, it is judged whether or not vps_max_layers_minus1 is 0. If 0, hierarchical coding is not made, and hence normal MCTS SEI code can be decoded by line 3 to line 12. If a value is other than 0, hierarchical coding is made, and hence line 15 to line 26 are formed of the same code as MCTSS SEI in FIG. 4A. Information of the independent decoding tile can be acquired by the above-described decoding.

Third Embodiment

The respective processing units shown in FIGS. 1, 5, 10, and 12 are described in this embodiment such that the respective processing units are formed of hardware. However, the processing performed by the respective processing units shown in these figures may be formed of a computer program.

FIG. 14 is a block diagram showing a configuration example of hardware of a computer that can be applied to the image coding device and the image decoding device according to any of the above-described embodiments.

A CPU 1401 controls the entire computer by using a computer program, and data stored in a RAM 1402 and a ROM 1403, and executes the above-described processing so that the image coding device and the image decoding device according to the above-described embodiments perform the processing. That, is, the CPU 1401 functions as the respective processing units shown in FIGS. 1, 5, 10, and 12.

The RAM 1402 has an area for temporarily storing, for example, a computer program and data loaded from an external storage device 1406, and data acquired from the outside through an interface (I/F) 1407. Further, the RAM 1402 has a work area used when the CPU 1401 executes various processing. That is, the RAM 1402 is assigned as, for example, a frame memory, or can properly provide other various areas.

The ROM 1403 stores, for example, setting data and a boot program of this computer. An operation unit 1404 is formed of, for example, a keyboard and a mouse. When a user of this computer operates the operation unit 1404, the operation unit 1404 can input various instructions to the CPU 1401. A display unit 1405 displays the processing result by the CPU 1401. Also, the display unit 1405 is formed of, for example, a liquid crystal display.

The external storage device 1406 is a large-capacity information storage device represented by a hard disk drive. The external storage device 1406 stores an operating system (OS), and a computer program for causing the CPU 1401 to execute functions of the respective units shown in FIGS. 1 and 7. Further, the external storage device 1406 may store image data as a processing subject.

The computer program and data stored in the external storage device 1406 are properly loaded to the RAM 1402 under the control by the CPU 1401, and becomes a processing subject by the CPU 1401. A network, such as LAN or the Internet, and other device, such as a projecting device or a displaying device, can be connected with the I/F 1407. This computer can acquire and transmit various information through the I/F 1407. Reference sign 1408 is a bus that connects the respective units with each other.

Regarding the operation with the above-described configuration, the CPU 1401 mainly controls the operations described with reference to the flowchart.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146312, filed Jul. 12, 2013, which is hereby incorporated by reference herein in its entirety.

The invention claimed is:

1. An image coding device that performs hierarchical coding on an images for a plurality of hierarchical layers, comprising:
    a coding unit configured to code at least one of a first image corresponding to a first hierarchical layer, a second image corresponding to a second hierarchical layer different from the first hierarchical layer, and a third image corresponding to a third hierarchical layer different from the first and second hierarchical layers; and
    a determination unit configured to determine whether or not the third image includes an independent region, wherein the independent region is constrained so as not to refer to a region in the second image which is outside of a corresponding region corresponding to the independent region,
    wherein the corresponding region in the second image is coded with reference to a corresponding region in the first image corresponding to the independent region and a region in the first image which is outside of the corresponding region, even if the determination unit determines that the third image includes the independent region.

2. The image coding device according to claim 1, wherein the second image corresponding to the second hierarchical layer is an image having a higher resolution or a higher image quality than a resolution or an image quality of the first image corresponding to the first hierarchical layer,
    wherein, if the coding unit executes coding while using the second hierarchical layer as a hierarchical layer of a coding subject and the second image as an image of a coding subject, the coding unit uses the first hierarchical layer as a hierarchical layer of a reference subject and the first image as an image of a reference subject,
    wherein the third image corresponding to the third hierarchical layer is an image having a higher resolution or a higher image quality than the resolution or the image quality of the second image corresponding to the second hierarchical layer, and
    wherein, if the coding unit executes coding while using the third hierarchical layer as a hierarchical layer of a coding subject and the third image as an image of a coding subject, the coding unit uses the second hierarchical layer as a hierarchical layer of a reference subject and the second image as an image of a reference subject.

3. The image coding device according to claim 1, further comprising a second coding unit configured to code information indicative of a hierarchical layer having the independent region and having a lowest resolution or a lowest image quality among the plurality of hierarchical layers.

4. The image coding device according to claim 1, further comprising an output unit configured to, if the determination unit determines that the third image includes the independent region, output coded data, in which information indicative of a position corresponding to the independent region of the coding subject is coded.

5. The image coding device according to claim 1, further comprising:
an acquiring unit configured to, if the determination unit determines that the third image includes the independent region, acquire at least one of a flag indicative of that the independent region is present in the third image of the coding subject, and information relating to a position corresponding to the independent region,
wherein the acquiring unit acquires the flag on a sequence basis.

6. The image coding device according to claim 1, further comprising:
a local decoding unit configured to reproduce a decoded image by using coded data generated by the coding unit; and
an enlarging unit configured to enlarge the decoded image reproduced by the local decoding unit,
wherein the enlarging unit enlarges only a region that is in an image of a hierarchical layer having a lower spatial resolution than a spatial resolution of a hierarchical layer of an image of a coding subject and that is at a relatively equivalent position to the independent region in the third image of the coding subject, in the decoded image reproduced by the local decoding unit.

7. The image coding device according to claim 1, wherein the coding unit is configured to code the first image and the second image having different spatial resolutions from the image, and configured to code the first image obtained by reducing the second image.

8. An image decoding device that decodes coded data obtained by performing hierarchical coding on images for a plurality of hierarchical layers, comprising:
a decoding unit configured to decode coded data which corresponds to at least one of a first image corresponding to a first hierarchical layer, a second image corresponding to a second hierarchical layer different from the first hierarchical layer, and a third image corresponding to a third hierarchical layer different from the first and second hierarchical layers; and
a determination unit configured to determine whether or not the third image includes an independent region, wherein the independent region is constrained so as not to refer to a region in the second image which is outside of a corresponding region corresponding to the independent region,
wherein the corresponding region in the second image is decoded with reference to a corresponding region in the first image corresponding to the independent region and a region in the first image which is outside of the corresponding region, even if the determination unit determines that the third image includes the independent region.

9. The image decoding device according to claim 8,
wherein the second image corresponding to the second hierarchical layer is an image having a higher resolution or a higher image quality than a resolution or an image quality of the first image corresponding to the first hierarchical layer,
wherein, if the decoding unit executes decoding while using coded data of the second hierarchical layer as coded data of a hierarchical layer of a decoding subject and coded data of the second image as coded data of an image of a decoding subject, the decoding unit uses the first hierarchical layer as a hierarchical layer of a reference subject and the first image as an image of a reference subject,
wherein the third image corresponding to the third hierarchical layer is an image having a higher resolution or a higher image quality than the resolution or the image quality of the second image corresponding to the second hierarchical layer, and
wherein, if the decoding unit executes decoding while using coded data of the third hierarchical layer as coded data of a hierarchical layer of a decoding subject and coded data of the third image as coded data of an image of a decoding subject, the decoding unit uses the second hierarchical layer as a hierarchical layer of a reference subject and the second image as an image of a reference subject.

10. An image coding device that performs hierarchical coding on an image, which forms a movie, for a plurality of hierarchical layers, comprising:
a first acquiring unit configured to acquire at least one of a first image corresponding to a first hierarchical layer of the image, a second image corresponding to a second hierarchical layer different from the first hierarchical layer and being coded with reference to the first image, and a third image corresponding to a third hierarchical layer different from the first and second hierarchical layers and being coded with reference to the second image; and
a coding unit configured to code at least one of the first image, the second image, and the third image,
wherein the coding unit codes a predetermined region in the second image with reference to a region in the first image corresponding to the predetermined region in the second image and/or a region in the first image other than the region in the first image corresponding to the predetermined region in the second image,
wherein the coding unit codes a region in the third image corresponding to the predetermined region in the second image with reference to the predetermined region in the second image without reference to a region other than the predetermined region in the second image, and
wherein the image decoding device further comprises:
a first determination unit configured to, based on information relating to whether or not an image of at least one of the plurality of hierarchical layers includes an independent region, which is decoded without reference to other region in a reference image, information relating to a hierarchical layer of a decoding subject among the plurality of hierarchical layers, and information relating to a region of a decoding subject in an image of the hierarchical layer of the decoding subject, determine whether or not the region of the decoding subject is included in the independent region wherein, if the first determination unit determines that the region of the decoding subject is included in the independent region, based on whether or not the independent region is set at a position corresponding to the region of the decoding subject in a hierarchical layer of a reference subject for decoding the hierarchical layer of the decoding subject, the decoding unit determines a region of a reference subject in an image of the hierarchical layer of the reference subject, and decodes the coded data acquired by the first acquiring unit by using the region of the reference subject.

11. The image decoding device according to claim 10,
wherein the determining unit is configured to, if the first determination unit determines that the region of the decoding subject is included in the independent region, determine the region of the reference subject in the image of the hierarchical layer of the reference subject, based on whether or not the independent region is set at a position corresponding to the region of the decoding subject in the hierarchical layer of the reference subject, wherein the decoding unit decodes the coded data acquired by the first acquiring unit, by using the region of the reference subject determined by the determining unit.

12. The image decoding device according to claim 11, further comprising:

a second determination unit configured to, if the first determination unit determines that the region of the decoding subject is included in the independent region, determine whether or not the independent region is set at a position corresponding to the region of the decoding subject in the hierarchical layer of the reference subject, wherein the determining unit determines the region of the reference subject so that a range of a reference region if the second determination unit determines that the independent region is not set at the position is smaller than a range of a reference region if the second determination unit determines that the independent region is set at the position.

13. The image decoding device according to claim 12, wherein the determining unit determines the reference region in the range corresponding to the region of the decoding subject in the hierarchical layer of the reference subject if the second determination unit determines that the independent region is set at the position, and determines the reference region in an entire range of an image corresponding to the hierarchical layer of the reference subject if the second determination unit determines that the independent region is not set at the position.

14. The image decoding device according to claim 8, further comprising a second decoding unit configured to decode coded data of information indicative of a hierarchical layer having a lowest resolution or a lowest image quality and having the independent region among the plurality of hierarchical layers.

15. The image decoding device according to claim 8, further comprising an acquiring unit configured to, if the determination unit determines that the third image includes the independent region acquire at least one of a flag indicative of that the independent region is present in the third image of the decoding subject, and information relating to a position corresponding to the independent region.

16. The image decoding device according to claim 8, further comprising:

an enlarging unit configured to enlarge a decoded image decoded by the decoding unit, wherein the enlarging unit enlarges only a region that is in a region in an image of a hierarchical layer having a lower spatial resolution than a spatial resolution of a hierarchical layer of an image of a decoding subject and that is at a relatively equivalent position to the independent region in the third image of the decoding subject, in the decoded image decoded by the decoding unit.

17. The image decoding device according to claim 8, wherein the first image and the second image are images having different spatial resolutions, and the first image is an image obtained by reducing the second image.

18. An image coding method that performs hierarchical coding on images for a plurality of hierarchical layers, comprising:

a coding step of coding at least one of a first image corresponding to a first hierarchical layer, a second image corresponding to a second hierarchical layer different from the first hierarchical layer, and a third image corresponding to a third hierarchical layer different from the first and second hierarchical layers; and a determining step of determining whether or not the third image includes an independent region, wherein the independent region is constrained so as not to refer to a region in the second image which is outside of a corresponding region corresponding to the independent region, wherein the corresponding region in the second image is decoded with reference to a corresponding region in the first image corresponding to the independent region and a region in the first image which is outside of the corresponding region, even if the determining step determines that the third image includes the independent region.

19. An image decoding method that decodes coded data obtained by performing hierarchical coding on images for a plurality of hierarchical layers, comprising:

a decoding step of decoding coded data which corresponds to at least one of a first image corresponding to a first hierarchical layer, a second image corresponding to a second hierarchical layer different from the first hierarchical layer, and a third image corresponding to a third hierarchical layer different from the first and second hierarchical layers; and a determining step for determining whether or not the third image includes an independent region, wherein the independent region is constrained so as not to refer to a region in the second image which is outside of a corresponding region corresponding to the independent region, wherein the corresponding region in the second image is decoded with reference to a corresponding region in the first image corresponding to the independent region and a region in the first image which is outside of the corresponding region, even if the determination unit determines that the third image includes the independent region.

20. A non-transitory computer-readable storage medium storing a program for causing a computer to execute coding, the program comprising:

computer-executable instructions that perform hierarchical coding on images for a plurality of hierarchical layers;

computer-executable instructions that code at least one of a first image corresponding to a first hierarchical layer, a second image corresponding to a second hierarchical layer different from the first hierarchical layer, and a third image corresponding to a third hierarchical layer different from the first and second hierarchical layers; and computer-executable instructions that determine whether or not the third image includes an independent region, wherein the independent region is constrained so as not to refer to a region in the second image which is outside of a corresponding region corresponding to the independent region, wherein the corresponding region in the second image is coded with reference to a corresponding region in the first image corresponding to the independent region and a region in the first image which is outside of the corresponding region, even if it is determined that the third image includes the independent region.

21. A non-transitory computer-readable storage medium storing a program for causing a computer to execute decoding, the program comprising:
   computer-executable instructions that decode coded data obtained by performing hierarchical coding on images for a plurality of hierarchical layers;
   computer-executable instructions that decode coded data which corresponds to at least one of a first image corresponding to a first hierarchical layer, a second image corresponding to a second hierarchical layer different from the first hierarchical layer, and a third image corresponding to a third hierarchical layer different from the first and second hierarchical layers; and
   computer-executable instructions that determine whether or not the third image includes an independent region, wherein the independent region is constrained so as not to refer to a region in the second image which is outside of a corresponding region corresponding to the independent region,
   wherein the corresponding region in the second image is decoded with reference to a corresponding region in the first image corresponding to the independent region and a region in the first image which is outside of the corresponding region, even if it is determined that the third image includes the independent region.

22. An image coding method that performs hierarchical coding on an image, which forms a movie, for a plurality of hierarchical layers, comprising:
   acquiring at least one of a first image corresponding to a first hierarchical layer of the image, a second image corresponding to a second hierarchical layer different from the first hierarchical layer and being coded with reference to the first image, and a third image corresponding to a third hierarchical layer different from the first and second hierarchical layers and being coded with reference to the second image;
   coding at least one of the first image, the second image, and the third image;
   coding a predetermined region in the second image with reference to a region in the first image corresponding to the predetermined region in the second image and/or a region in the first image other than the region in the first image corresponding to the predetermined region in the second image; and
   coding a region in the third image corresponding to the predetermined region in the second image with reference to the predetermined region in the second image without reference to a region other than the predetermined region in the second image,
   determining, based on information relating to whether or not an image of at least one of the plurality of hierarchical layers includes an independent region, which is decoded without reference to other region in a reference image, information relating to a hierarchical layer of a decoding subject among the plurality of hierarchical layers, and information relating to a region of a decoding subject in an image of the hierarchical layer of the decoding subject, determine whether or not the region of the decoding subject is included in the independent region wherein, if it is determined that the region of the decoding subject is included in the independent region, based on whether or not the independent region is set at a position corresponding to the region of the decoding subject in a hierarchical layer of a reference subject for decoding the hierarchical layer of the decoding subject, determining a region of a reference subject in an image of the hierarchical layer of the reference subject, and decodes the coded data acquired by using the region of the reference subject.

23. A non-transitory computer-readable storage medium storing a program for causing a computer to execute an image coding method that performs hierarchical coding on an image, which forms a movie, for a plurality of hierarchical layers, comprising:
   acquiring at least one of a first image corresponding to a first hierarchical layer of the image, a second image corresponding to a second hierarchical layer different from the first hierarchical layer and being coded with reference to the first image, and a third image corresponding to a third hierarchical layer different from the first and second hierarchical layers and being coded with reference to the second image;
   coding at least one of the first image, the second image, and the third image;
   coding a predetermined region in the second image with reference to a region in the first image corresponding to the predetermined region in the second image and/or a region in the first image other than the region in the first image corresponding to the predetermined region in the second image; and
   coding a region in the third image corresponding to the predetermined region in the second image with reference to the predetermined region in the second image without reference to a region other than the predetermined region in the second image,
   determining, based on information relating to whether or not an image of at least one of the plurality of hierarchical layers includes an independent region, which is decoded without reference to other region in a reference image, information relating to a hierarchical layer of a decoding subject among the plurality of hierarchical layers, and information relating to a region of a decoding subject in an image of the hierarchical layer of the decoding subject, determine whether or not the region of the decoding subject is included in the independent region wherein, if it is determined that the region of the decoding subject is included in the independent region, based on whether or not the independent region is set at a position corresponding to the region of the decoding subject in a hierarchical layer of a reference subject for decoding the hierarchical layer of the decoding subject, determining a region of a reference subject in an image of the hierarchical layer of the reference subject, and decodes the coded data acquired by using the region of the reference subject.

* * * * *